(12) United States Patent
Mueck et al.

(10) Patent No.: US 12,302,391 B2
(45) Date of Patent: May 13, 2025

(54) INTELLIGENT TRANSPORT SYSTEM CO-CHANNEL COEXISTENCE FRAME STRUCTURE WITH ASYMMETRIC GAP DURATIONS

(71) Applicant: Intel Corporation, Santa Clara, CA (US)

(72) Inventors: Markus Dominik Mueck, Unterhaching BY (DE); Leonardo Gomes Baltar, Munich (DE); John M. Roman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 418 days.

(21) Appl. No.: 17/411,943

(22) Filed: Aug. 25, 2021

(65) Prior Publication Data
US 2021/0385865 A1    Dec. 9, 2021

Related U.S. Application Data

(60) Provisional application No. 63/130,124, filed on Dec. 23, 2020, provisional application No. 63/074,383, filed on Sep. 3, 2020.

(51) Int. Cl.
*H04W 74/0816* (2024.01)
*H04W 4/40* (2018.01)
(Continued)

(52) U.S. Cl.
CPC ......... *H04W 74/0816* (2013.01); *H04W 4/40* (2018.02); *H04W 74/006* (2013.01);
(Continued)

(58) Field of Classification Search
None
See application file for complete search history.

(56) References Cited

U.S. PATENT DOCUMENTS

2010/0182986 A1    7/2010  Okuike
2019/0104548 A1    4/2019  Fan et al.
(Continued)

FOREIGN PATENT DOCUMENTS

EP    3094124 A1    11/2016
EP    3681221 A1    7/2020

OTHER PUBLICATIONS

3GPP, "3rd Generation Partnership Project; Technical Specification Group Services and System Aspects; Application layer support for Vehicle-to-Everything (V2X) services; Functional architecture and information flows; (Release 16)", Mar. 2020, 64 pages, 3GPP TS 23.286 V16.3.0, Valbonne, France.
(Continued)

*Primary Examiner* — Walter J Divito
(74) *Attorney, Agent, or Firm* — Schwabe, Williamson & Wyatt, P.C.

(57) ABSTRACT

The present disclosure describes co-channel coexistence mechanisms for mitigating interference between multiple radio access technologies (RATS) that operate in the same or neighbouring channels, frequency bands, and/or bandwidths. The co-channel coexistence mechanisms include variable transmission intervals including variable gaps or guard periods, and utilizing network allocation vectors (NAV). Other embodiments may be described and/or claimed.

29 Claims, 28 Drawing Sheets

(51) Int. Cl.
    H04W 74/00    (2009.01)
    H04W 74/08    (2024.01)
    H04W 80/02    (2009.01)
    H04W 84/12    (2009.01)
    H04W 92/18    (2009.01)
(52) U.S. Cl.
    CPC ... *H04W 74/0875* (2013.01); *H04W 74/0891* (2013.01); *H04W 80/02* (2013.01); *H04W 84/12* (2013.01); *H04W 92/18* (2013.01)

(56) References Cited

U.S. PATENT DOCUMENTS

| | | | | |
|---|---|---|---|---|
| 2021/0084635 | A1* | 3/2021 | Oteri | H04B 7/0695 |
| 2022/0053564 | A1* | 2/2022 | Malladi | H04W 16/28 |
| 2022/0086854 | A1* | 3/2022 | He | H04W 4/40 |

OTHER PUBLICATIONS

3GPP, "3rd Generation Partnership Project; Technical Specification Group Services and System Aspects; Architecture enhancements for 5G System (5GS) to support Vehicle-to-Everything (V2X) services (Release 16)", Jul. 2020, 57 pages, 3GPP TS 23.287 V16.3.0, Valbonne, France.

3GPP, "3rd Generation Partnership Project; Technical Specification Group Radio Access Network; Overall description of Radio Access Network (RAN) aspects for Vehicle-to-everything (V2X) based on LTE and NR (Release 16)", Jun. 2020, 35 pages, 3GPP TR 37.985 V16.0.0, Valbonne, France.

3GPP, "3rd Generation Partnership Project; Technical Specification Group Radio Access Network; NR; Physical layer procedures for data (Release 16)", Jun. 2020, 163 pages, 3GPP TS 38.214 V16.2.0, Valbonne, France.

3GPP, "3rd Generation Partnership Project; Technical Specification Group Radio Access Network; NR; Study on NR Vehicle-to-Everything (V2X) (Release 16)", Mar. 2019, 122 pages, 3GPP TR 38.885 V16.0.0, Valbonne, France.

ETSI, "Intelligent Transport Systems (ITS); Congestion Control Mechanisms for the C-V2X PC5 interface; Access layer part", Nov. 2018, 12 pages, ETSI TS 103 574 V1.1.1, France.

ETSI, "Intelligent Transport Systems (ITS); Access layer specification for Intelligent Transport Systems using LTE Vehicle to everything communication in the 5,9 GHz frequency band", Nov. 2018, 18 pages, ETSI TS 103 613 V1.1.1, France.

Jung-Hyun Bang et al., "Collision Avoidance Method Using Vector-Based Mobility Model in TDMA-Based Vehicular Ad Hoc Networks", May 12, 2020, 17 pages, School of Electrical and Electronics Engineering, Chung-Ang University, 84 Heukseok-ro, Dongjak-gu, Seoul, Korea.

Fouzi Boukhalfa et al., "An active signaling mechanism to reduce access collisions in a distributed TDMA based MAC protocol for vehicular networks", Jul. 9, 2019, 15 pages.

Fouzi Boukhalfa et al., "An Analytical Model for Performance Analysis of an Active Signaling-based TDMA MAC Protocol for Vehicular Networks", Jul. 10, 2019, 8 pages.

Mario H. Castaneda Garcia et al., "A Tutorial on 5G NR V2X Communications", Jun. 17, 2020, 55 pages, IEEE Communications Surveys & Tutorials journal. Citation information: DOI 10.1109/COMST.2021.3057017.

Mohamed Hadded et al., "An Infrastructure-Free Slot Assignment Algorithm for eliable Broadcast of Periodic Messages in Vehicular Ad hoc Networks", Oct. 11, 2016, 8 pages.

Mehdi Harounabadi et al., "V2X in 3GPP Standardization: NR Sidelink in Rel-16 and Beyond", Apr. 22, 2021, 10 pages, arXiv:2104.11135v1 [cs.NI].

Gaurang Naik et al., "IEEE 802.11bd & 5G NR V2X: Evolution of Radio Access Technologies for V2X Communications", 2019, 14 pages.

Qiao Qu et al., "Survey and performance evaluation of the upcoming next generation WLANs standard-IEEE 802.11ax", Mobile Networks and Applications, vol. 24, No. 5, pp. 1461-1474 (Oct. 24, 2019).

IEEE, "Part 11: Wireless LAN Medium Access Control (MAC) and Physical Layer (PHY) Specifications", 2016, 3534 pages, IEEE Std 802.11.

3GPP, "3rd Generation Partnership Project; Technical Specification Group Radio Access Network; Evolved Universal Terrestrial Radio Access (E-UTRA); User Equipment (UE) radio transmission and reception (Release 16)", Jun. 2020, 31 pages, 3GPP TS 36.101 V16.6.0, Valbonne, France.

3GPP, "3rd Generation Partnership Project; Technical Specification Group Radio Access Network; Evolved Universal Terrestrial Radio Access (E-UTRA); Requirements for support of radio resource management (Release 16)", Jun. 2020, 88 pages, 3GPP TS 36.133 V16.6.0, Valbonne, France.

3GPP, "3rd Generation Partnership Project; Technical Specification Group Radio Access Network; Evolved Universal Terrestrial Radio Access (E-UTRA); Physical layer procedures (Release 16)", Jun. 2020, 7 pages, 3GPP TS 36.213 V16.2.0, Valbonne, France.

Extended European Search Report mailed Jan. 27, 2022 for European Patent Application No. 21193750.3, 10 pages.

Office Action mailed Feb. 2, 2024 for European Patent Application No. 21193750.3, 7 pages.

* cited by examiner

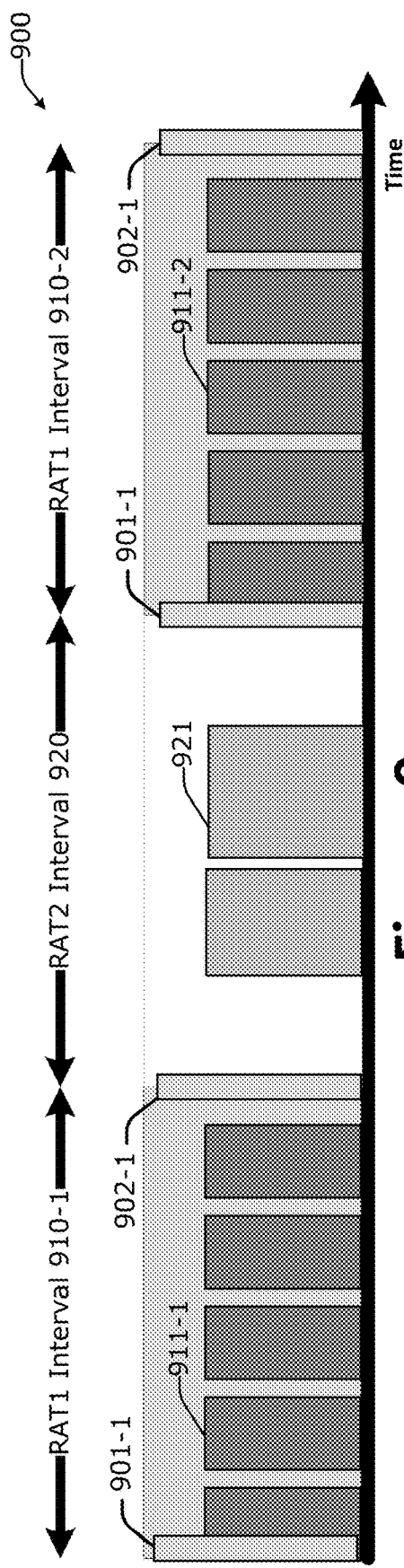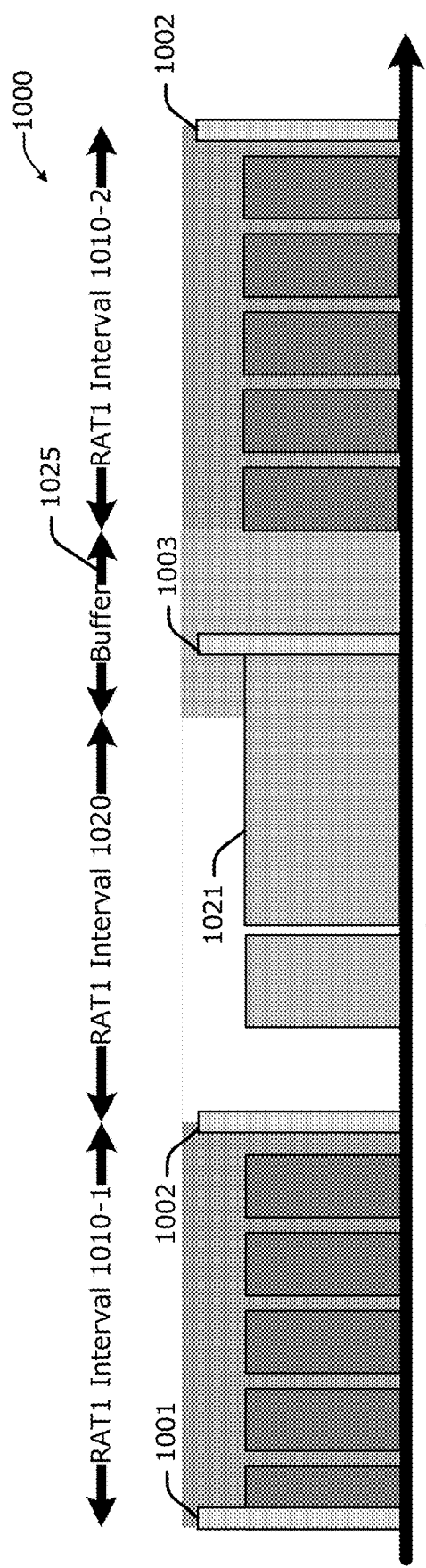

INTELLIGENT TRANSPORT SYSTEM CO-CHANNEL COEXISTENCE FRAME STRUCTURE WITH ASYMMETRIC GAP DURATIONS

RELATED APPLICATIONS

The present application claims priority to U.S. Provisional App. No. 63/074,383 filed Sep. 3, 2020 and U.S. Provisional App. No. 63/130,124 filed Dec. 23, 2020, the contents of each of which are hereby incorporated by reference in their entireties.

TECHNICAL FIELD

Embodiments described herein generally relate to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Existing RATs do not have mechanisms to coexist with one another and are usually not interoperable with one another.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 9 and 10 illustrate example NAV operations.

DETAILED DESCRIPTION

Figure 1:
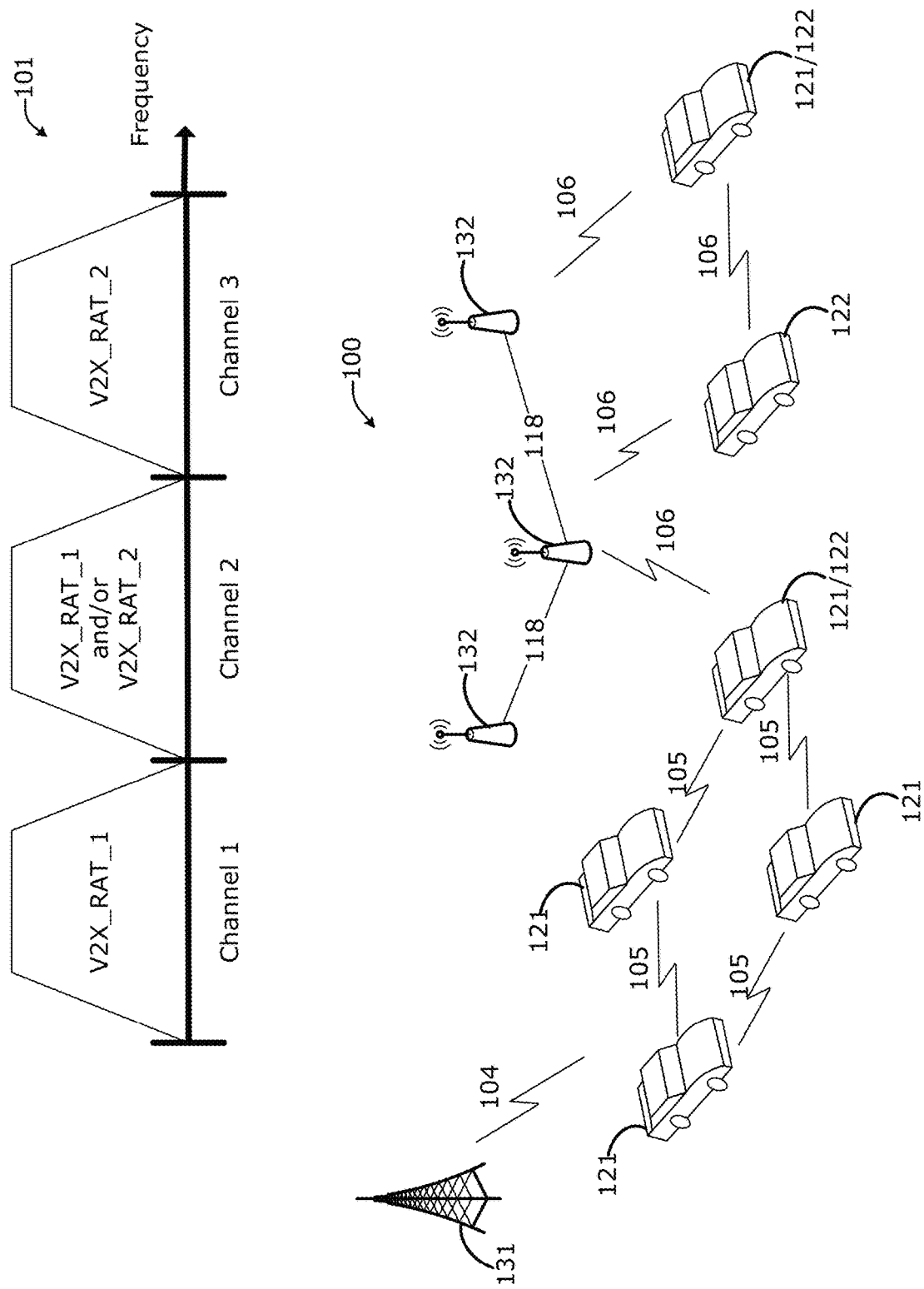
FIG. 1 illustrates an example Vehicle-to-Everything (V2X) arrangement.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

1. V2X Radio Access Technology Co-Channel Co-Existence

The Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X applications can use co-operative awareness to provide more intelligent services for end-users. This means that entities, such as stations (STAs) or user equipment (UEs) including, for example, CA/AD vehicles, roadside infrastructure or roadside units (RSUs), application servers, and mobile devices (e.g., smartphones, tablets, etc.), collect knowledge of their local environment (e.g., information received from other STAs/UEs or sensor equipment in proximity) to process and share that knowledge in order to provide more intelligent services, such as cooperative perception, maneuver coordination, and the like, which are used for collision warning systems, autonomous driving, and/or the like. One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, etc.). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since the present embodiments are applicable to any number of different RATs (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using ultra high frequency (UHF) and very high frequency (VHF) systems, Global System for Mobile Communications (GSM), and/or other wireless communication technologies. These systems do not have mechanisms to coexist with one another and are usually not interoperable with one another. Although many examples discussed herein discuss coexistence between C-V2X and W-V2X RATs, the embodiments herein may be applied to alternative and/or additional RATs such as short range RATs (e.g., ZigBee, etc.), visible light communication (VLC) RATs, and/or any other RAT(s) such as those discussed herein.

"Interoperability" at least in some embodiments refers to the ability of vehicle ITS-Ss (V-ITS-Ss) (also referred to as vehicle UEs (vUEs)) and roadside ITS-Ss (R-ITS-Ss) (also referred to as roadside equipment or Road Side Units (RSUs)) utilizing one vehicular communication system to communicate with vUEs and roadside equipment utilizing the other vehicular communication system. "Coexistence" at least in some embodiments refers to sharing or allocating radiofrequency resources among vUEs and roadside equipment using either vehicular communication system. One coexistence approach is the "preferred channel" approach, which involves dynamically allocating channels to be used exclusively by one system or exclusively by the other system. Another coexistence approach is the "co-channel existence" approach, which involves allocating both systems to a channel during different time slots. Examples are shown and described infra.

FIG. 1 illustrates an example arrangement 100 having multiple channels 101 available for V2X communications. This arrangement 100 involves V-ITS-Ss 121 and 122, which may be the same or similar as the in-vehicle system (IVS) 1701 of FIG. 17 and/or the ITS architecture 1800 of FIG. 18 (discussed infra) that may communicate with one another over direct links 105, 106 and/or with RAN nodes 131 and/or R-ITS-Ss 132 via links 104, 106. The RAN nodes 131 and/or R-ITS-Ss 132 may be the same or similar as the NAN 1730 of FIG. 17 (discussed infra).

The present disclosure addresses co-existence issues related to multiple V2X RATs operating in a same service area or region. In the example of FIG. 1, at least two distinct V2X RATs may need to coexist in the available channels 101. Although FIG. 1 shows three V2X channels 101, any applicable number of channels may be used for any number of V2X RATs. In an example, the at least two distinct V2X RATs include IEEE based V2X technologies or Wireless Local Area Network (WLAN) V2X (hereinafter "W-V2X") RATs (e.g., DSRC for the U.S. and ITS-G5 for Europe) and 3GPP C-V2X RATs (e.g., LTE-V2X or 5G/NR-V2X). The distinct V2X RATs may include more than one C-V2X RAT (e.g., LTE-V2X RATs and 5G/NR-V2X RATs) and/or more than one W-V2X RAT (e.g., DSRC RATs, ITS-G5 RATs, and/or IEEE 802.11bd RATs). For purposes of the present disclosure, the term "C-V2X" may refer to any 3GPP cellular-based V2X technology (e.g., LTE-V2X, 5G/NR-V2X, and the like) and the term "W-V2X" may refer to any IEEE-based V2X technology including, for example, DSRC, ITS-G5, IEEE 802.11bd, WiMAX, IEEE variants such as Vehicular Ad Hoc Network (VANET) technologies, Vehicular Ad Hoc Network MAC (VeMAC), distributed and infrastructure free TDMA based MAC protocol (DTMAC), Active Signaling-DTMAC (AS-DTMAC), prediction-based TDMA MAC (PTMAC), and/or the like.

In the example of FIG. 1, the V-ITS-Ss 121 may operate according to C-V2X and the V-ITS-Ss 122 may operate according to w-V2X. These V2X technologies are not designed for interacting and coexisting with each other. Further, the RAN node 131 (e.g., an eNB, ng-eNB, gNB, en-gNB, etc.) is configured to provide 3GPP communication services, and may provide (or assist in providing) C-V2X services, while the R-ITS-Ss 132 are equipped to provide network connectivity for the vUEs 122 employing the W-V2X RAT.

ITS-G5 usually involves peer-to-peer (P2P) technology with direct links 106 between the V-ITS-Ss 122, and WLAN links 106 for communications with a wider network (e.g., the Internet). In the example of FIG. 1, the direct links 106 utilize the same protocol/network as the WLAN links 106. However, in other implementations, the WLAN links 106 may utilize a different protocol than the direct links 106. The access layer for the ITS-G5 interface is outlined in [EN302663] and describes the access layer of the ITS-S reference architecture (see e.g., FIG. 18 discussed infra). The ITS-G5 access layer comprises the [IEEE80211] and [IEEE8022] protocols. Additionally or alternatively, the ITS-G5 access layer may be based on the forthcoming IEEE 802.11bd protocol. [IEEE80211] outlines the physical layer (PHY) and the medium access control (MAC) protocol used for vehicular ad hoc networking in ITS-G5. The PHY is based on orthogonal frequency division multiplexing (OFDM) and the MAC layer uses Enhanced Distributed Channel Access (EDCA) functionality.

The [IEEE80211] standard contains two basic network topologies: the infrastructure Basic Service Set (BSS) and the independent BSS (IBSS). The former contains an access point (AP) (e.g., R-ITS-S 132) and data traffic usually takes a detour through the AP even though two nodes are closely co-located. The IBSS is a set of nodes communicating directly with each other and this is also called ad hoc or peer-to-peer network. Both these topologies are aimed for nomadic devices and synchronization is required between nodes performed via beacons. Further, they are identified with a unique BSSID. Association and authentication are required in infrastructure BSS whereas in IBSS association is not used and communication can take place in an unauthenticated mode. IEEE 802.11p, which is part of [IEEE80211], introduced the capability to communicate outside the context of a BSS (see e.g., clause 4.3.17 of [IEEE80211]). The communication outside of a BSS is enabled by setting the Management Information Base (MIB) variable dot11OCBActivated to true. In this mode authentication, association and security between nodes are disabled at the MAC sublayer. This implies that active and passive scanning of BSS and IBSS are disabled. The scanning on frequency channels for the node to join an existing network is no longer enabled. Therefore, the implementation when the MIB variable is set to dot11OCBActivated true in the vehicular environment requires predetermined frequency channels to be set in the management.

The PHY of ITS-G5 uses 52 orthogonal subcarriers in a channel bandwidth of 10 MHz, where 48 subcarriers are used for data and 4 are pilot carriers. The OFDM PHY of ITS-G5 can support eight different transfer rates by using different modulation schemes and coding rates. The support of 3 Mbit/s, 6 Mbit/s, and 12 Mbit/s is mandatory. The duration of an OFDM symbol is fixed to 8 µs, and consequently for different transfer rates the number of data bits per OFDM symbol varies. Table 1 outlines the different transfer rates together with coding and modulation schemes and data bits per OFDM symbol.

TABLE 1

Transfer rates, modulation schemes and coding rates used by ITS-G5

| Transfer rate (Mbit/s) | Modulation scheme | Coding rate | Data bits per OFDM symbol | Coded bits per OFDM symbol |
|---|---|---|---|---|
| 3 | BPSK | 1/2 | 24 | 48 |
| 4,5 | BPSK | 3/4 | 36 | 48 |
| 6 | QPSK | 1/2 | 48 | 96 |
| 9 | QPSK | 3/4 | 72 | 96 |
| 12 | 16-QAM | 1/2 | 96 | 192 |
| 18 | 16-QAM | 3/4 | 144 | 192 |
| 24 | 64-QAM | 2/3 | 192 | 288 |
| 27 | 64-QAM | 3/4 | 216 | 288 |

Figure 2:
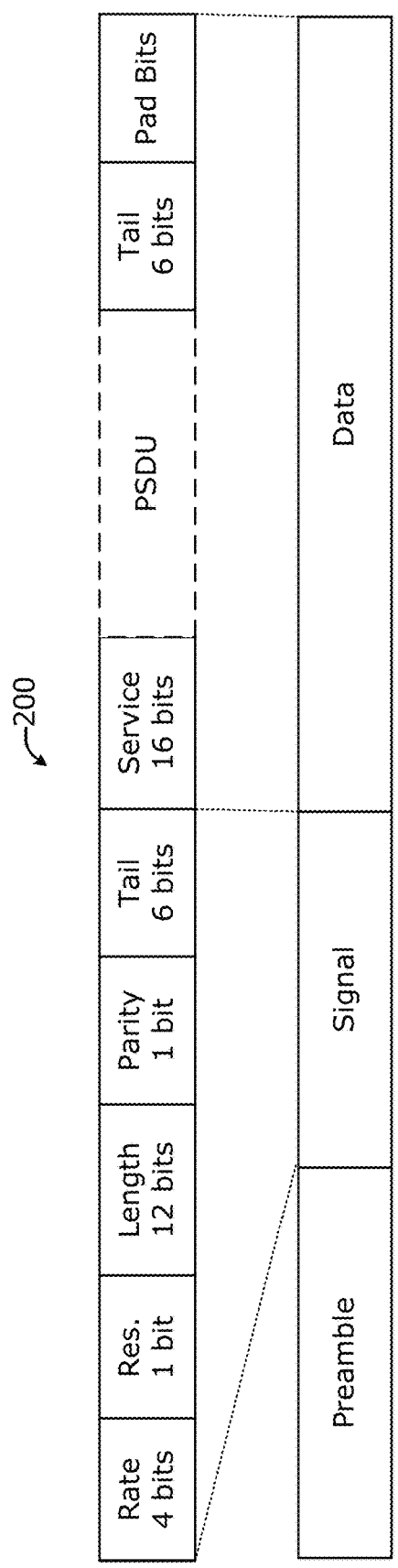
FIG. 2 illustrates an example Physical layer Protocol Data Unit (PPDU) format.

FIG. 2 shows the format of a transmitted ITS-G5 packet, which is the physical layer convergence procedure (PLCP) protocol data unit (PPDU) 200. A PHY frame or PPDU 200 is a unit of data exchanged between PHY entities to provide the PHY data service. The PLCP service data unit (PSDU) contains the data from the MAC layer including MAC header and trailer (collectively referred to as a MAC protocol data unit (MPDU)). The preamble is used for synchronizing the receiver (Rx). The signal field contains information about packet length and data rate of the data field. It has a length of 24 bits and is transmitted in one OFDM symbol using binary phase-shift keying (BPSK) with a coding rate of ½ (3 Mbit/s). Table 2 shows details the ITS-G5 PHY packet format 200 (see e.g., clause 17 of [IEEE80211]).

TABLE 2

Explanation of the different fields of the PPDU

| Field | Subfield | Description | Duration |
|---|---|---|---|
| Preamble | N/A | Consists of a short and a long training sequence. | 32 µs |
| Signal | Rate | Transfer rate at which the data field in the PPDU will be transmitted. | 8 µs |
|  | Reserved | For future use. |  |
|  | Length | Length of the packet. |  |
|  | Parity | Parity bit. |  |
|  | Tail | Used to facilitate decoding and for calculation of rate and length subfields. |  |
| Data | Service | Used for synchronizing the descrambler at Rx. | variable |
|  | PSDU | The data from the MAC layer including header and trailer, i.e. MPDU. |  |
|  | Tail | Used for putting the convolutional encoder to zero state. |  |
|  | Pad bits | Bits added to fill up the last OFDM symbol of the packet. |  |

In ITS-G5, the MAC layer decides when in time a STA is allowed to transmit based on the current channel status. The MAC schedules transmission to minimize the interference in the system to increase the packet reception probability. The MAC deployed by [IEEE80211] is (or includes) EDCA and is based on the basic distributed coordination function (DCF) but adds QoS attributes. DCF is a carrier sense multiple access with collision avoidance (CSMA/CA) algorithm. In CSMA/CA, a node starts to listen to the channel before transmission and if the channel is perceived as idle for a predetermined listening period the node can start to transmit directly. If the channel becomes occupied during the listening period the node will perform a backoff procedure, wherein the node defers its access according to a randomized time period. In [IEEE80211], the predetermined listening period is called either arbitration interframe space (AIFS) or distributed interframe space (DIFS) depending upon the mode of operation (e.g., EDCA or DCF). The former listening period is used when there is support for QoS.

Additionally or alternatively, enhancements to the legacy waveform (retransmissions), as well as new optimized waveform that includes low density parity check (LDPC) encoding and midambles, support for 20 MHz channels and vehicle positioning, etc., may be included for ITS-G5 systems. More details on IEEE 802.11bd can be found in Naik et al., "IEEE 802.11bd & 5G NR V2X: Evolution of Radio Access Technologies for V2X Communications," *IEEE Access*, pp. 70169-70184 (27 May 2019) ("[Naik]"), which is hereby incorporated by reference in its entirety. Furthermore, IEEE 802.11bd will include an update of the access layer standard ITS-G5.

The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G new radio (NR)-V2X is outlined in, inter alia, 3GPP TR 23.786 v16.1.0 (2019-06), 3GPP TR 38.885 v16.0.0 (2019-03), 3GPP TS 23.287 v16.3.0 (2020-07-09) ("[TS23287]"), 3GPP TS 38.300 v16.2.0 (2020-07-24) ("[TS38300]"), 3GPP TS 23.285 v16.3.0 (2020-07-09) ("[TS23285]"), and 3GPP TS 23.304 v1.0.0 (2021-06-04) ("[TS23304]"). 3GPP C-V2X involves, inter alia, V2X sidelink communication. V2X sidelink communication refers to access stratum (AS) functionality enabling V2X sidelink communication as defined in [TS23285] between nearby UEs 121, 122 using Evolved Universal Terrestrial Radio Access (E-UTRA) technology and/or 5G/NR RAT that does not traversing any network node. 3GPP C-V2X includes several communication modes. One mode involves communications taking place over a cellular link ("Uu interface") 104 between an individual vUE 121 and the Radio Access Network (RAN) node 131, where a transmitting vUE 121 sends data to the RAN node 131 over the Uu interface 104, and the RAN node 131 sends that data to a receiving (Rx) vUE 121 over another Uu interface 104. Another mode involves vUEs 121, 122 communicating data with one another using a direct link ("PC5 interface") 105 between the vUEs 121 independently from the control of cellular network and/or without assistance from the RAN node 131. Another mode is a combination of the first and second modes, where control signalling takes place over the Uu interface 104 and data exchange takes place over the PC5 interface 105. In this example, the PC5 interface 105 and the ITS-G5 interface 107 may utilize license-exempt V2X communication channels 101 in the 5.9 GHz band, for example, three 10 MHz channels for safety related applications and the like. When the vUEs 121 are in cellular network coverage, the network decides how to configure the V2X channel and informs the vUEs 121 about V2X configurable parameters through the Uu interface 104. The message includes the carrier frequency of the V2X channel, the V2X resource pool, synchronization references, the sub-channelization scheme, the number of sub-channels per subframe, and the number of resource blocks (RBs) per sub-channel, among other information.

LTE-V2X uses single-carrier frequency-division multiple access (SC-FDMA), and supports 10- and 20-MHz channels. Each channel is divided into sub-frames (also referred to as transmission time intervals (TTIs)), RBs, and sub-channels. Subframes are 1 millisecond (ms) long. An RB is the smallest unit of frequency resource that can be allocated to a user; it is 180 kHz wide in the frequency domain and contains 12 subcarriers, which are 15 kHz each. C-V2X defines sub-channels as a group of RBs in the same sub-frame, where the number of RBs per sub-channel can vary. Sub-channels are used to transmit data and control information. For the direct links 105, each full data packet (e.g., a beacon or cooperative awareness message) is transmitted in a transport block (TB) over Physical Sidelink Shared Channels (PSSCH), and the Sidelink Control Information (SCI) messages are transmitted over Physical Sidelink Control Channels (PSCCH). The PSSCH and PSCCH are transmitted on the same sub-frame, but the PSSCH and PSCCH may or may not be adjacent in the occupied RBs. A node intending to transmit a TB also transmits an associated SCI (also referred to as a scheduling assignment). The SCI includes information used by a receiving (Rx) node to decode the received data packet, such as the modulation and coding scheme (MCS) used for transmitting the TB, the RBs it uses, and the resource reservation interval for semi-persistent scheduling (SPS).

NR-V2X communication involves, inter alia, using NR sidelink communication. NR sidelink communication refers to AS functionality enabling at least V2X communication as defined in [TS23287] between two or more nearby UEs 121, 122 using NR technology. NR-V2X complements LTE-V2X and it supports advanced use cases and higher automation levels whereas LTE V2X supports basic active safety and traffic management (see e.g., [Garcia]). 5G-NR V2X supports two modes of operation like LTE-V2X using the PC5 interface 105; (i) decentralized communication (mode 2), and (ii) supported by the Uu interface 104 inside the coverage by a base station 131 (mode 1). 5G-NR V2X has a new physical layer compared to LTE-V2X whereas the scheduling of transmissions for sidelink operation is similar for both technologies based on a synchronous network, while scheduling parameters allow for more flexibility. The additional flexibility and the support of a new feedback channel, enabling HARQ and CSI feedback as well as power control, might cause the NR V2X sidelink transmissions to behave significantly different from those of LTE-V2X sidelink. The 5G-NR V2X will be included in an update of the access layer standard LTE-V2X. Additional aspects of 5G/NR-V2X are discussed in [Naik], Garcia et al., "A Tutorial on 5G NR V2X Communications," IEEE Communications Surveys & Tutorials (2021) ("[Garcia]"), which is hereby incorporated by reference in its entirety, and Harounabadi et al., "V2X in 3GPP Standardization: NR Sidelink in Release-16 and Beyond", IEEE Communications Standards Magazine, vol. 5, no. 1, pp. 12-21 (22 Apr. 2021), which is hereby incorporated by reference in its entirety.

Referring back to FIG. 1, when configured to communicate over direct links 105 without network oversight, the vUEs 121 select their sub-channels by using a sensing-based SPS scheme where a vUE 121 measures received energy that meet predefined or configured latency requirements, ranks resources based on the measured received energy, and selects one of the lowest energy resources for transmission. A vUE 121 reserves the selected sub-channel(s) for a few consecutive reselection packet-counter transmissions, which is randomly set between 5 and 15. The vUE 121 includes its reselection packet-counter value in the SCI. After each transmission, the reselection counter is decremented by one. When the counter reaches (or is equal to) 0, additional resources are selected and reserved with probability (1−P), where P can be set between 0 and 0.8. Additional resources also need to be reserved if the packet to be transmitted does not fit in the sub-channel(s) previously reserved. The reselection counter is randomly chosen every time additional resources are to be reserved. Packets can be transmitted every 100 subframes (e.g., 10 packets per second (pps)) or in multiples of 100 subframes (e.g., up to a minimum of 1 pps). Each vUE 121 includes its packet transmission interval in the resource reservation field of its SCI. The semi-persistent reservation of resources and the inclusion of the reselection counter and packet transmission interval in the SCI allows other vUE 121 to estimate which sub-channels are free when making their own reservation, which reduces packet collisions.

As shown by FIG. 1, some vUEs 121 are equipped to communicate according to a first V2X RAT (e.g., C-V2X), and some vUEs 122 are equipped to communicate according to a second V2X RAT (e.g., ITS-G5), While some vUEs 121/122 are equipped to communicate according to both the first and second V2X RATs (labelled as "vUEs 121/122" in FIG. 1), this is not the usual case, as most vehicle vendors do not want to implement both technologies because of the added costs. Therefore, coexistence techniques may be needed to allow the multiple, different V2X RATs to operate in a same area or region.

One coexistence approach is the "preferred channel" approach, which involves dynamically allocating a first channel (e.g., Channel 1 in FIG. 1) to be used exclusively by a first V2X RAT (e.g., C-V2X) and allocating a second channel (e.g., Channel 3 in FIG. 1) to be used exclusively by another V2X RAT (e.g., ITS-G5). This approach is also referred to as "frequency separation" where each RAT operates in its own frequency domain. However, the preferred channel approach does not take locally observed RAT penetration levels into account and may lead to an inefficient sharing of the radio resource between the competing V2X RATs. This means that radio resources may go unused at certain times of the day and/or in certain locations.

Another coexistence approach is the "co-channel existence" approach, which involves allocating both systems to a shared channel (e.g., Channel 2 in FIG. 1) during different time slots, for example, allocating the shared channel to be used by the first V2X RAT (e.g., C-V2X) during a first time period and allocating the shared channel to be used by the second V2X RAT (e.g., ITS-G5) during a second time period. However, operation of the at least two V2X RATs in the same channel (co-channel coexistence) has been shown to be highly inefficient. Furthermore, the need of spectral resources for any of the V2X RATs may vary considerably over a geographic area and time. For instance, some countries may introduce a particular V2X RAT earlier than others, or in some areas vehicles are equipped with one V2X RAT and other vehicles are equipped with a different V2X RAT.

As context for the applicable regulation and standardization, three safety channels of 10 megahertz (MHz) each are allocated in the 5.9 GHz ITS band. The 5G Automotive Association (SGAA) has suggested a so-called safe-harbour approach in which one channel is allocated to ITS-G5 and one channel to C-V2X in a fixed way (upper/lower channels). The middle channel should remain unused in the short-term. This proposal has been rejected by the Conference of Postal and Telecommunications Administrations (CEPT) Electronic Communication Committee (ECC), "SRDMG(17)136 ITS Background—Short Prel Action Plan and Background as well as reporting from ECC #46" ("SRDMG"), since regulation needs to be technology neutral. SRDMG has instead stated that the preferred channels approach may be viable. Instead of a fixed allocation of channels to individual RATs, such an allocation may be negotiated dynamically between the concerned systems. Further, although it is possible to have V2X RAT coexisting in the same channel (e.g., Listen Before Talk (LBT) based channel access) due to the different nature of the channel access protocols of ITS-G5 and C-V2X, this approach is considered to be highly inefficient.

Figure 3:
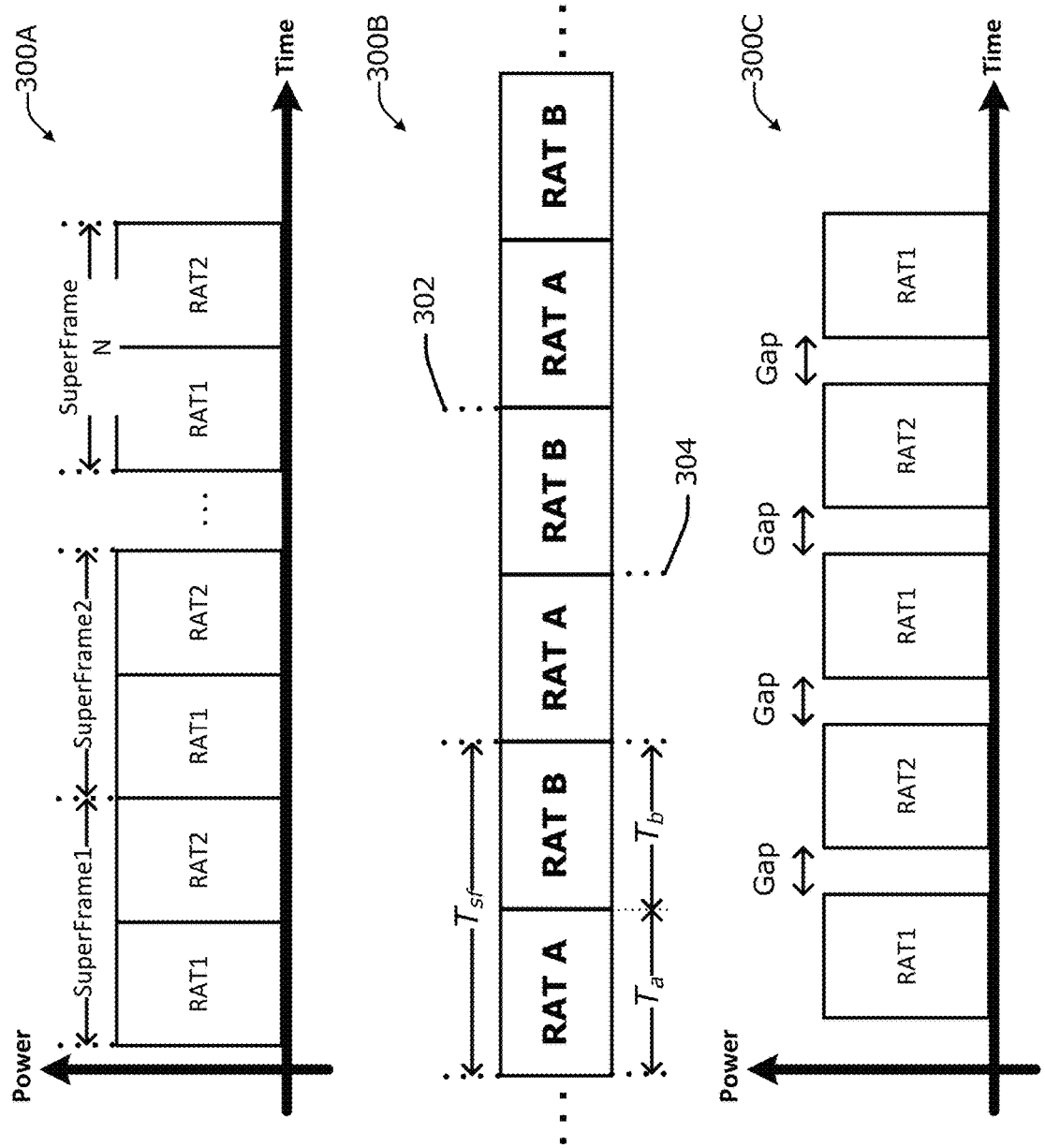
FIG. 3 illustrates example Time Division Multiplex (TDM) approaches to co-channel coexistence, and an example superframe.

FIG. 3 illustrates a Time Division Multiplexing (TDM) co-existence approach 300A for ensuring coexistence between different RATs such as V2X RATs (e.g., C-V2X and W-V2X RATs), and a superframe structure 300B. The TDM approach 300A to co-channel coexistence includes allocation of resources for a first RAT ("RAT1" in FIG. 3) and resources for a second RAT ("RAT2" in FIG. 3), where the resources are allocated to the shared channel at different times. For the classical TDM approach 300A, a time domain partition is used to assign resources to the two RATs a priori. The TDM approach 300A involves defining a superframe length (e.g., $T_{sf}$ in superframe 300B) with deterministic start and end times that is known (or configured) by both RATs. Each superframe 300B is divided in two or more slots (e.g., $T_a$ and $T_b$ in superframe 300B), where each slot is occupied by a respective RAT.

Depending on if/how often the partitions of time between the RATs are updated, different implementations are possible including: static, semi-static, and dynamic implementations.

The static implementation for TDM approach 300A would be a fixed TDM pattern in which the two RATs equally share the medium in the time domain. In this case, the time slot boundary 304 between the two RATs is fixed and the partition of the resources does not change over time. Within each time slot, one or multiple users within the same technology group (or same RAT system/circuitry) may access the medium for transmission according to the RAT's intrinsic access method. Static TDM implementations usually lead to channel underutilization when the traffic load distribution between RATs changes.

The semi-static implementation for TDM approach 300A would be that the time slot boundary 304 between the two RATs can be periodically updated based on some mechanism. The update could be triggered based on different conditions (e.g., traffic conditions in a specific area) and with a different periodicity. In any case, the time scale of the update is much longer compared to a dynamic scheme. Furthermore, the semi-static method usually requires an external entity to update the TDM configuration.

In the dynamic implementation for TDM approach 300A, the technologies/RATs adapt the time slot boundary based on the current equipment rate. In a dynamic TDM implementation, each STA uses local measurements to determine which technology is used in each subframe. In contrast to other dynamic approaches, in this method all STAs need to derive the TDM pattern to be followed.

Using any of the aforementioned TDM implementations requires that (a) both RATs have a common time reference, which can be provided by Global Navigation Satellite System (GNSS) or the like; (b) an overall frame structure (e.g., superframe) is known to both RATs; (c) a contiguous portion of the superframe timing is allocated to each RAT (T) where each RAT is allowed to transmit only in its allocated partition; (d) the TDM configuration (pattern) is repeated in every superframe; and (e) the slots which are dedicated to one technology are contiguous. Additionally, guard intervals at the end of each partition (e.g., the gaps in approach 300C of FIG. 3) can be introduced to account for synchronization inaccuracies. Moreover, the TDM approach 300A assumes that 50% of the traffic belongs to RAT1 and 50% of the traffic belongs to RAT2 for a given geographic location and at a given time. In such a case, each of the two systems/RATs will have 50% of the time resources reserved for their respective transmissions. However, this 50% split between the two RATs does not account for the actual capacity allocated to a given technology, which depends on the locally observed penetration.

FIG. 3 also depicts an example superframe structure 300B with two time slots, one for each RAT. The superframe structure 300B includes a time slot for RAT A and a time slot for RAT B, which may correspond to RAT1 and RAT2 in approach 300A, respectively, or vice versa. Additionally or alternatively, other and/or additional RATs may be included in the superframe 300B and/or other and/or additional RATs may be included in additional superframes 300B. Each superframe 300B has a superframe boundary 302 that contains two slots, and each slot includes a time slot boundary 304 (one for each RAT). Each slot has a length expressed in a unit of time, and the superframe 300B is a combination of these two slots. Here, $T_a$ is the length of the period RAT A is allowed to use the channel for transmission, and RAT B is not allowed to access the channel during this time. Additionally, $T_b$ is the length of the period RAT B is allowed to use the channel for transmission, and RAT A is not allowed to access the channel during this time. $T_a$ and/or $T_b$ can vary depending on the method and/or RAT implementation. The length of the superframe 300B is expressed as $T_{sf}$, where $T_a+T_b=T_{sf}$. The slot boundary 6.304 may vary depending on, for example, equipment rate or the like. A guard time might be included in the beginning of $T_a$ and/or a guard time might be included in the beginning of $T_b$. The guard time is not depicted in FIG. 3. Alternatively, guard times of each RAT may be used or inherent to provide a sufficient guard (e.g., AIFS for ITS-G5 or "guard period" in C-V2X).

One question to be resolved is how all involved STAs (e.g., ITS-Ss) are to agree on a reasonable split of the respective capacity depending on the locally observed penetration of the multiple different RATs in a given geographic or coverage area. The present disclosure provides mechanisms that determine the locally observed penetration level of multiple different RATs, and mechanisms to decide and implement a fair share of the resources between competing RATs depending on the observed penetration levels.

Another question to be resolved involves the gap durations that should be used between the different RAT intervals. The TDM approach 300C in FIG. 3 shows gap durations between the different RAT transmission periods. These gap durations depend on the time synchronization accuracy of the respective RATs and the respective accuracies can be dramatically different, which leads to an asymmetric gap duration requirements.

In the present disclosure, methods, configurations, and related apparatuses are disclosed for the management of coexistence and interoperability between multiple RATs (or standards), including preferred channel allocations between multiple radio communication technologies in connection with Edge Computing services and communication architectures. Although the embodiments herein are discussed in the context of automotive vehicles, the embodiments may also apply to other types of vehicles including, aircraft, watercraft, and/or the like.

The present disclosure introduces an approach to use Edge Network entities in support of the preferred channels approach and the dynamic allocation of channels among multiple V2X RATs. The technical approach discussed herein is acceptable by regulation administrations (they allow for a dynamic allocation, called "preferred channels" approach) and leads to a highly efficient overall solution, that is much more efficient than both systems existing in the same channel. Further, offering a solution that considers the inclusion of these two alternative technologies (e.g., the so-called technology neutral approach), will provide better interoperability in the V2X ecosystem, and the possibility to offer V2X/ITS services across wider deployments.

For illustrative purposes, the present disclosure is described for deployment scenarios including vehicles (including computer-assisted and/or autonomous vehicles) in a two dimensional (2D) freeway/highway/roadway environment wherein the vehicles are automobiles. However, the embodiments described herein are also applicable to other types of vehicles, such as trucks, busses, motorboats, motorcycles, electric personal transporters, and/or any other motorized devices capable of transporting people or goods. The embodiments described herein are also applicable to three dimensional (3D) deployment scenarios where some or all of the vehicles are implemented as flying objects, such as aircraft, drones, unmanned aerial vehicles (UAVs), and/or to any other like motorized devices. The embodiments described herein are also applicable to other RAT coexistence use cases, deployments, and implementations, such as IoT and/or wireless sensor networks (WSNs), and/or the like. Moreover, the embodiments described herein are also applicable to RAT coexistence use cases, deployments, and implementations that involve V2X and non-V2X deployment scenarios.

Furthermore, the present disclosure provides a detailed discussion of these techniques within MEC systems and services, applicable to the larger context of Internet of Things (IoT) and fog network deployments. It will be understood that the disclosed MEC system and service deployment examples provide one illustrative example of a fog device or fog system, but that many other combinations and layouts of devices located at the edge of a network may be provided. Further, the techniques disclosed herein may relate to other IoT standards and configurations, and other intermediate processing entities and architectures. The present techniques and configurations may provide significant benefits to MEC architectures and other IoT device network architectures involving any number of edge computing devices or fog computing platforms.

1.1. Co-Channel Coexistence Frame Structure with Asymmetric Gap Durations

The present disclosure includes an asymmetric gap allocation between respective RAT transmit intervals, depending on the respective time synchronization accuracies. This will lead to the minimum required gap duration between the various RAT transmission intervals. As a result, spectral efficiency will be dramatically increased compared to existing solutions.

Previous contributions to ETSI standardization suggest a TDM approach for ensuring coexistence between the various RATs as illustrated by FIG. 3. The actual capacity allocated to a given technology will depend on the locally observed penetration. The TDM approaches 300A and 300C in FIG. 3 assume a 50/50 split between RAT1 and RAT2. However, there is the question which gap durations should be used between the RAT1 (e.g., C-V2X) and RAT2 (e.g., W-V2X) intervals. As mentioned previously, these gap durations depend on the time synchronization accuracy of the respective systems and the respective accuracies can be dramatically different, thus, leading to an asymmetric gap duration requirements. In previous solutions, the superframe structure 300B presented in FIG. 3 uses either no gap duration between the transmit intervals or identical gap durations between all RAT transmit intervals. Both solutions are inefficient in terms of radio and/or computational resource usage.

The time synchronization accuracies of the various systems under debate for V2X and/or ITS systems include 3GPP TS 36.101 v16.6.0 (2020-07-16) ("[TS36101]") for C-V2X, which specifies frequency synchronization accuracy to meet 0.1 parts per million (ppm) jitter (that is, ±600 Hertz (Hz)), and 3GPP TS 36.133 v16.6.0 (2020-07-17) ("[TS36133]"), which specifies the time synchronization accuracy to meet a maximum±0.39 microseconds (µs). ITS-G5 has less stringent time synchronization requirements, because it is based on an asynchronous approach in contrast to the synchronous approach for LTE C-V2X. The [IEEE16094] standard specifies a channel switching mechanism, where W-V2X STAs have a sync tolerance of 2 ms, and the time error can be as large as SyncTolerance/2/3=±0.33 ms.

In some implementations, a static allocation of the respective transmit intervals may be used. This has several consequences. For example, it is predictable when the next interval(s) for RAT1 (e.g., C-V2X) and RAT2 (e.g., W-V2X) transmissions respectively will start. Therefore, the time synchronization can be improved over time, exploiting the synchronization symbols which are transmitted in each transmission interval of the respective technology. Further, without a new STA entering the group of currently active STAs, the time synchronization accuracy can be constantly improved (down to a reasonable optimum level) and thus the gap time can be (optionally) reduced over time; for reasons of simplicity is proposed to introduce a limited number of gap values, for example 4 different values for each of the technology intervals (e.g., 4 values for the gap prior to the RAT1 transmit periods and 4 values for the gap prior to the W-V2X interval). When a new STA is coming into a coverage/service area, the gap duration should be reset to the maximum duration level because new STAs need to improve their time synchronization accuracy over several frames.

Figure 4:
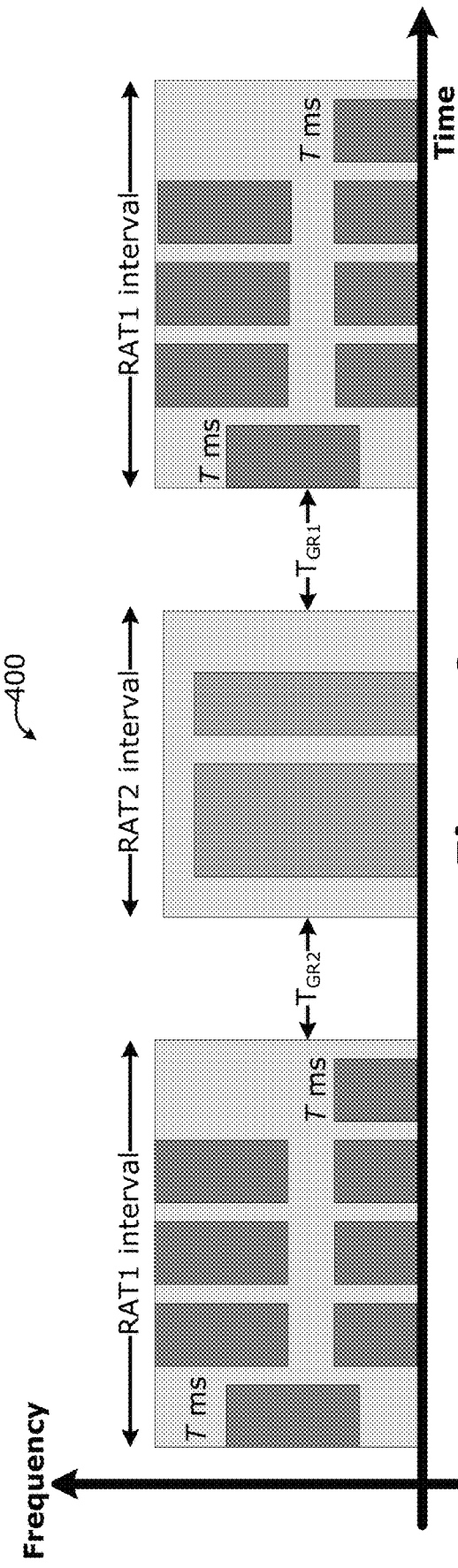
FIG. 4 illustrates an example TDM gap scheme for Radio Access Technology (RAT) co-existence.

FIG. 4 shows an example gap scheme 400 including variable interval durations and variable gap durations between transmission intervals for RAT1 (e.g., C-V2X) and RAT2 (e.g., W-V2X). Sharing in the time domain implies that the available time is divided into time slots, where one RAT will occupy the whole bandwidth for a certain period of time (e.g., a time slot) as was discussed previously with respect to superframe structure 300B of FIG. 3. FIG. 4 illustrates this concept where the resources are used within each time slot interval is decided by the MAC scheduling for each RAT. RAT2 (e.g., W-V2X) always uses the whole bandwidth, and depending on payload, the packet transmission duration is variable. RAT1 (e.g., C-V2X) uses T milliseconds (ms) chunks (where T is a number, such as 1) and can further divide this into the frequency domain as depicted in FIG. 4. The T ms chunks are referred to as subframes. Here, there is also a guard time when transitioning from one technology time slot to another.

The gap scheme 400 includes the following two gap duration variables: $T_{GAP, RAT2}$ ("$T_{GR2}$" in FIG. 4) which is the current gap duration prior to the RAT2 transmission interval; and ("$T_{GR1}$" in FIG. 4), which is the current gap duration prior to the RAT1 transmission interval. For $T_{GAP, RAT2}$, since the time synchronization accuracy must meet the requirement of ±0.39 µs, in various embodiments, $T_{GAP, RAT2}$=2*330 µs=660 µs, at least initially. In order to add some additional margin, in some embodiments, this value may be increased, for example to $T_{GAP, RAT2}$=800 µs. For $T_{GAP, RAT1}$, since the Time Error can be as large as SyncTolerance/2/3=±0.33 ms, in various embodiments, $T_{GAP, RAT1}$=2*0.39 µs=0.78 µs, at least initially. In order to add some additional margin, in some implementations, this value may be increased, for example to $T_{GAP, RAT2}$=1 µs.

In various implementations, the time gap between the various transmission intervals of the respective RATs can be reduced in a step-by-step approach (or step-wise approach), in case that no new STAs enter a coverage/service area and participate to the transmissions. The reason is that the frame structure is quasi static (e.g., remains unchanged over a reasonably long period of time, typically, days/weeks/months until the market penetration of one/several/all of the technologies changes) and the time synchronization can be gradually improved when multiple transmission frames are being received for processing and further synchronization refinement.

For this reason, the gap duration is not fixed to the values indicated above, but rather one value among multiple predefined values. To give an example the following set of four working points for each of the gaps prior to the RATs (e.g., C-V2X and W-V2X) may include:

$T_{GAP, RAT2} \in \{800 \text{ µs}, 600 \text{ µs}, 400 \text{ µs}, 200 \text{ µs}\}$.

$T_{GAP, RAT1} \in \{1 \text{ µs}, 0.8 \text{ µs}, 0.6 \text{ µs}, 0.4 \text{ µs}\}$.

Figure 5:
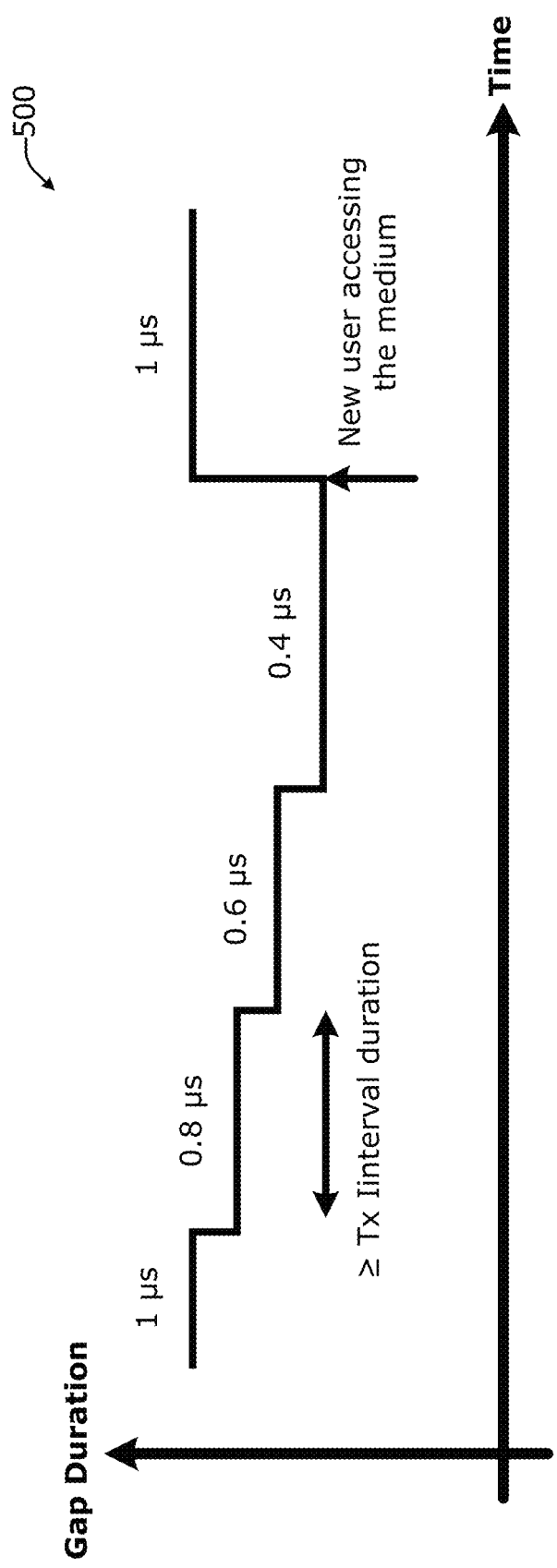
FIG. 5 illustrates an example dynamic adaptation of the gap duration.

In embodiments, a step function is applied to change one a higher gap duration to a lower gap duration while no new STA accesses to the medium. When a new ITS-S accesses the medium, the gap duration is reset to the highest level of the respective set of values, an example of which is shown by FIG. 5. FIG. 5 shows an example dynamic adaptation scheme 500 for adapting gap durations. In this example, the gap prior to the RAT1 (e.g., C-V2X) transmission, the same applies for RAT2 (e.g., W-V2X) with the respective value set $T_{GAP, RAT2} \in \{800 \text{ µs}, 600 \text{ µs}, 400 \text{ µs}, 200 \text{ µs}\}$.

A gap duration change may occur after an integer multiple of a superframe duration. A superframe is the combination of the intervals of all RATs and related gaps. In various embodiments, either 1, 2 or 3 superframe durations before the gap duration is adapted.

If no dynamic adaptation of the gap duration is possible, then the maximum gap value for the respective RATs may be chosen. However, the respective management of the gap duration can be introduced for example through i) Network Access Node (NAN) (e.g., RSU, etc.) based observation and communication of the gap duration to all vehicles or ii) observations of the vehicles themselves and issuance of a signalling field indicating a new gap duration when it is considered (by the initiating vehicle) to be appropriate to change the gap duration. A new incoming vehicle would immediately issue a gap indicator resetting the gap duration to its initial (maximum value).

Figure 6:
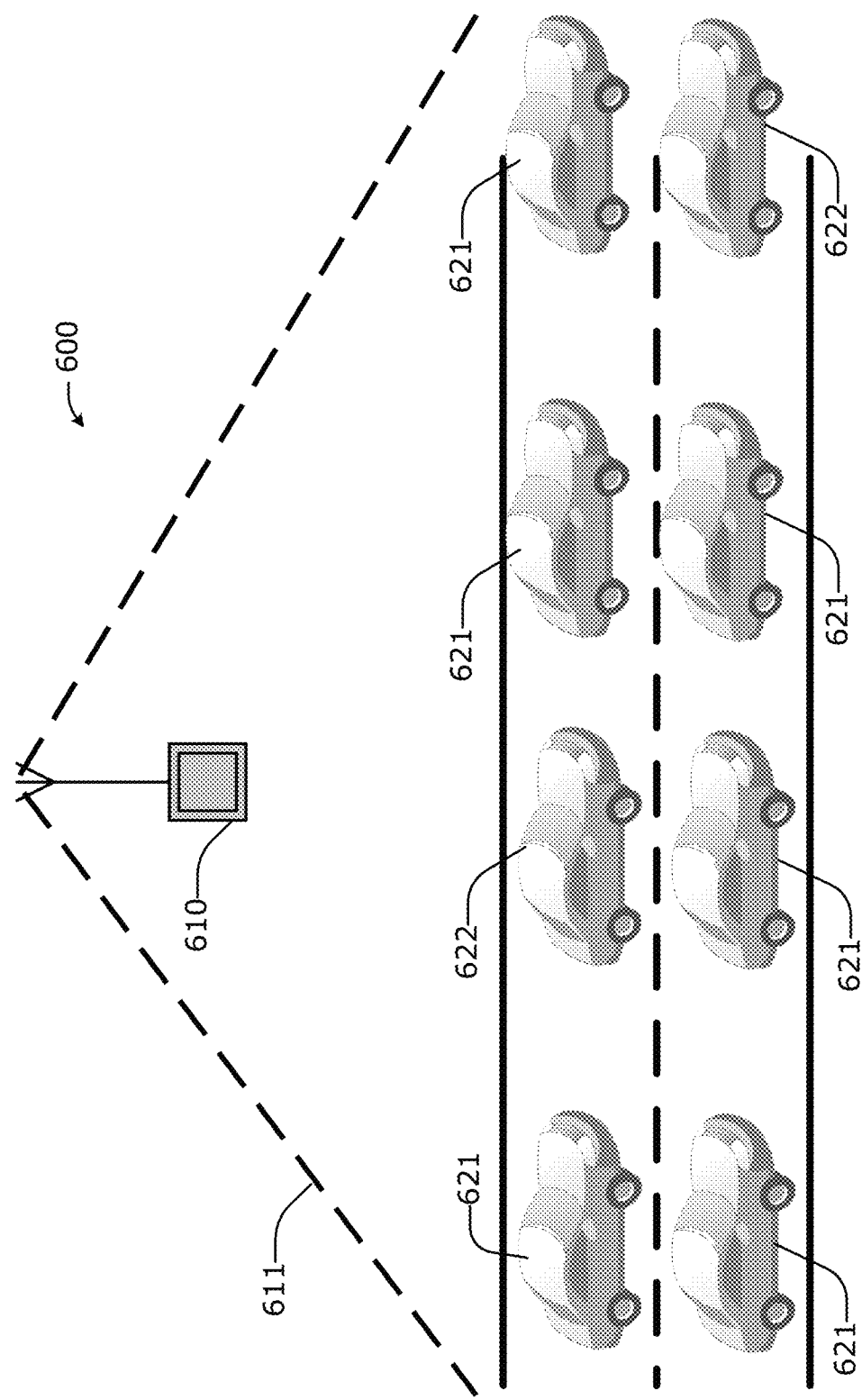
FIG. 6 illustrates a gap management example.

FIG. 6 shows an infrastructure driven management of gap duration in a V2X scenario 600. In this example, the NAN 610 (e.g., an RSU, R-ITS-S, gNB, eNB, etc.) can communicate/manage the decisions for one/several or all of the applied V2X RATs (e.g., LTE C-V2X, NR-V2X, ITS-G5, DSRC, etc.). The V-ITS-Ss 621, 622 may implement different V2X RATs, for example, V-ITS-Ss 621 and 622 may be the same or similar to the V-ITS-Ss 121 and 122, respectively.

In this example, the NAN 610 observes the local traffic (in terms of the amount of radiofrequency and/or signalling for each V2X RAT in service area 611) and informs all V-ITS-Ss 621, 622 in coverage area 611 about any change of the gap duration. Depending on the observation, a message is issued instructing V-ITS-Ss 621 employing V2X RAT1 and V-ITS-Ss 622 employing the second V2X RAT2 to operate according to the gap duration determined by the NAN 610. This message may be a resource allocation message that also includes timing allocations for each of the V2X RATs. Once the message content of the target resource allocations is identified, these messages are transmitted or broadcasted in a data format according to a first superframe or a second superframe.

The NAN 610 may be owned/operated by a suitable governmental agency, a mobile network operator, an ITS service provider, a regulatory body, a private enterprise, and/or the like. The centralized management embodiments may be implemented in a variety of different configurations and deployments.

In a first implementation, the NAN 610 is an RSU or R-ITS-S. In a second implementation, the central management entity 610 is a RAN or a base station (e.g., eNB, ng-eNB, gNB, or the like) within a RAN.

In a third implementation, the central management entity 610 is a gNB-Central Unit (CU) or ng-eNB-CU (see e.g., 3GPP TS 38.401 v16.2.0 (2020 Jul. 17)). The CU may be implemented as a Base Band Unit (BBU), Radio Equipment Controller (REC), Radio Cloud Center (RCC), centralized RAN (C-RAN), virtualized RAN (vRAN), and/or the like (although these terms may refer to different implementation concepts). In this implementation, the gNB-CU or ng-eNB-CU is communicatively coupled with one or more gNB-Distributed Units (DUs) and/or one or more ng-eNB-DUs, and each DU may be communicatively coupled with one or more Radio Units (RUs) (also referred to as Remote Radio Heads (RRHs), Remote Radio Units (RRUs), or the like). In some implementations, the one or more RUs may be RSUs.

In a fourth implementation, the central management entity 610 is an edge server or edge compute node co-located with one or more base stations (including the aforementioned CUs, DUs, and RUs). In one example, the edge server or edge compute node may be a Multi-access Edge Computing (MEC) host or any other edge compute node, such as those discussed herein. In this implementation, the edge compute node may operate or include the aforementioned CU, or may provide the central management service separate from the CU.

In a fifth implementation, the central management entity 610 is provided by a cloud computing service and/or one or more cloud compute nodes (collectively referred to as a "cloud" or the like). In one example, the central management entity 610 may run within virtual machine(s) (VMs) and/or software container(s) that are provided by the cloud's virtualization infrastructure. In this implementation, the cloud may operate or include the aforementioned CU, or may provide the central management entity 610 as a separate service than the CU. Additionally or alternatively, the cloud may operate a virtualized network switch (e.g., Open vSwitch or the like), to provide the central management entity 610 services.

In a sixth implementations, the central management entity 610 is a service provided by one or more network functions (NFs) in a cellular core network such as a 5G core network (5GC) or the like. In this implementation, one or more existing NFs may provide the central management entity 610, or a new NF may be defined to provide the central management entity 610.

In a seventh implementation, the central management entity 610 is a service provided by an individual or new NF in a cellular core network, in a data network, or the like.

In an eighth implementation, the central management entity 610 is a specified or selected V-ITS-S 602 (e.g., a "master" ITS-S, a cluster or platoon leader, etc.), which is authorized to negotiate on behalf of the other ITS-Ss 602, and/or the like.

In many of the aforementioned implementations, the central management entity 610 is communicatively coupled with multiple RSUs, multiple base stations, and/or the like where the service area 611 encompasses the some or all of the cells or service areas of each of the multiple RSUs and/or base stations.

1.2. Active Interference Mitigation Mechanisms

The present disclosure provides embodiments for coordinating the timing of all RATs (e.g., including C-V2X, W-V2X, etc.) operating in a given region, area, coverage area, geographic region/area, etc., in a distributed manner by exploiting the NAV mechanisms as defined in [IEEE80211] for WLAN (e.g., W-V2X) systems.

W-V2X and C-V2X systems need to synchronize on a single timing source, such as a Global Navigation Satellite System (GNSS) source. The synchronous timing is used to implement TDM for operating C-V2X and W-V2X in the same communication channel, for example, each V2X RAT has deterministic time slots for operation. In various embodiments, a first RAT station (e.g., a C-V2X RAT station (RAT-S)) coordinates the TDM split of a transmission duration, and determines when the first RAT-S and second RAT-S (e.g., W-V2X RAT-S) transmissions are scheduled. This leads to a highly efficient coexistence approach requiring minimum changes or adjustments to currently existing RATs such as C-V2X and W-V2X RATs.

When implementing NAV for co-channel coexistence scenarios (e.g., V2X communications), one issue is how to decide which RAT-S (or RAT type) should issue a suitable NAV setting signal in order to force a silence period for other RAT systems (or other RAT types). Embodiments herein use deterministic TDM time slots for STAs implementing one or more of multiple different RAT types. In various embodiments, a first RAT-S (e.g., C-V2X station) issues a NAV setting signal prior to a first RAT transmission (e.g., a C-V2X transmission) time slot, which forces second RAT-Ss (e.g., W-V2X RAT-Ss) to stay off the air during the duration of the first RAT transmission. In some embodiments, the NAV setting may be a MAC frame. Additionally or alternatively, the NAV setting signal may be an [IEEE80211] control frame such as an acknowledgment (Ack) frame, a beamforming report poll frame, a BlockAck frame, a clear-to-send (CTS) frame, a CTS-to-AP frame, a CTS-to-self frame, contention free (CF)-End frame, CF-End+CF-Ack frame, a directional multi-gigabit (DMG) CTS frame, a DMG Denial to Send (DTS) frame, a grant frame, a grant ack frame, a poll frame, a request to send (RTS) frame, a service period request (SPR) frame, a sector sweep feedback (SSW-Feedback) frame, very high throughput (VHT) null data packet (NDP) announcement frame, and/or some other control frame.

Another issue related to using NAV for V2X communication is how to manage which station should issue the NAV setting signal to set the NAV in a distributed setup/deployment. The present disclosure provides rules based on the STA's access to the previous frame for resolving this issue.

The technical approach discussed in Int'l App. No. PCT/US2019/035597 (WO2019/236714), filed on 5 Jun. 2019 (hereinafter "[PCT01]") does not provide a fixed allocation for two or more distinct V2X accessing the same band. Rather, edge network infrastructure (e.g., an edge server and/or edge compute node co-located with a base station, RSU, or the like) determines the required amount of spectrum for each vehicular communication system based on the number of vUEs using each type of V2X RAT, dynamically (or semi-statically) assigns a preferred channel allocation (depending on the local requirements), and forwards the allocation (or an indication of the allocation decision) to neighbouring infrastructure (e.g., one or more RSUs). Additionally, in [PCT01], vUEs may send requests for a specific V2X RAT, and the edge network infrastructure dynamically (or semi-statically) assigns resources based on the number of requests for each type of V2X RAT.

The technical approach discussed in Int'l App. No. PCT/US2020/039642, filed on 25 Jun. 2020 (hereinafter "[PCT02]") improves upon [PCT01] by providing the available time resources of a channel to be shared fairly between different V2X RATs depending on the relative traffic load which is observed in a given geographic location and at a given time using distributed management and centralized management mechanisms. A corresponding parameterization may vary over time and space depending on the locally observed share between each V2X RAT at a given point in time.

The present disclosure introduces a NAV setting signal by C-V2X RATs at the start of a C-V2X frame in order to force W-V2X RAT-Ss off the resource during the C-V2X RAT transmission interval. In some implementations, a C-V2X RAT-S among a multitude of C-V2X RAT-Ss available in a distributed system (e.g., a V2X scenario) issues a NAV setting signal to force W-V2X RAT-Ss off the resources (e.g., transmission medium) during a C-V2X RAT transmission interval. The present disclosure also provides the content of the CTS-to-self signal, including multiple RAT1 transmission interval durations to be pre-configured, and a specific MAC address choice. The present disclosure provides highly efficient transmitter (Tx) implementation schemes based on a look-up table storage of the CTS-to-self content for several alternatives on the possible RAT1 transmission interval durations and the selected MAC address. The present disclosure provides a frame structure, introducing guard intervals between the CTS-to-self transmission and the start of the RAT1 part. A protocol for negotiating the maximum transmission interval period for multiple different RATs such as C-V2X and W-V2X is also discussed herein. The various embodiments discussed herein enable to practical implementation of ensuring coexistence through protection of the RAT1 transmission period using CTS-to-self signalling, thereby reducing interference from neighbouring transmission bands.

1.2.1. Interference on V2X/ITS Systems

The Unlicensed National Information Infrastructure (U-NII) radio band is part of the radio frequency spectrum used by IEEE 802.11a devices and by many wireless ISPs. Some U-NII bands are licensed or allocated are allocated as licensed spectrum, and some U-NII bands are allocated as unlicensed spectrum. The U-NII bands are allocated or licensed by the U.S. Federal Communications Commission (FCC). The U-NII operates over four ranges including: U-NII Low (U-NII-1), U-NII Mid (U-NII-2A), U-NII-2B, U-NII Worldwide (U-NII-2C/U-NII-2e), U-NII Upper (U-NII-3), and DSRC/ITS (U-NII-4).

U-NII Low (U-NII-1) includes the 5.150-5.250 GHz band. U-NII-1 was originally limited to indoor use only. Regulations required use of an integrated antenna, with power limited to 50 mW. Rules changed in 2014 to permit outdoor operation, maximum fixed power 1 watt, maximum fixed effective isotropic radiated power (EIRP) 4 watts (+36 dBm) point-to-multipoint, 200 watts (+53 dBm) point-to-point. However, strict out-of-band emission rules limit practical point-to-point power to lower levels.

U-NII Mid (U-NII-2A) includes the 5.250-5.350 GHz band and can be used for both outdoor and indoor use, subject to Dynamic Frequency Selection (DFS) or radar avoidance. Regulations allow for a user-installable antenna. Power is limited to 250 mW.

U-NII-2B includes the 5.350-5.470 GHz band. Currently 120 MHz of spectrum is not allocated by the FCC for unlicensed use.

U-NII Worldwide (U-NII-2C/U-NII-2e) includes the 5.470-5.725 GHz band and can be used for both outdoor and indoor use, subject to DFS or radar avoidance. Power is limited to 250 mW. This spectrum was added by the FCC in 2003 to "align the frequency bands used by U-NII devices in the United States with bands in other parts of the world". The FCC currently has an interim limitation on operations on channels which overlap the 5600-5650 MHz band.

U-NII Upper (U-NII-3) includes the 5.725-5.850 GHz band. Sometimes referred to as U-NII/ISM due to overlap with the ISM band. Regulations allow for a user-installable antenna. Power limited to 1 W.

DSRC/ITS (U-NII-4) includes the 5.850-5.925 GHz band. At present U-NII-4 spectrum is being considered by the FCC for unlicensed use. U-NII-4 is presently only usable for DSRC and licensed amateur radio operators.

The FCC has recently approved the operation of unlicensed RATs (uRATs) such as, for example, WiFi, 3GPP NR-Unlicensed (NR-U), MuLTEfire, etc., in the lower 5.9 GHz band, which is in immediate proximity to V2X/ITS-G5 operation in the same band. Therefore, operations by these uRAT systems in this band may cause interference with the existing V2X/ITS-G5 operations. At the same time, uRAT system operation in 6 GHz also creates the possibility of substantial interference into the V2X portion of the 5.9 GHz band. For purposes of the present disclosure, channels in an unlicensed band or spectrum are referred to as "unlicensed channels," "uChannels," or "uRAT channels."

Figure 7:
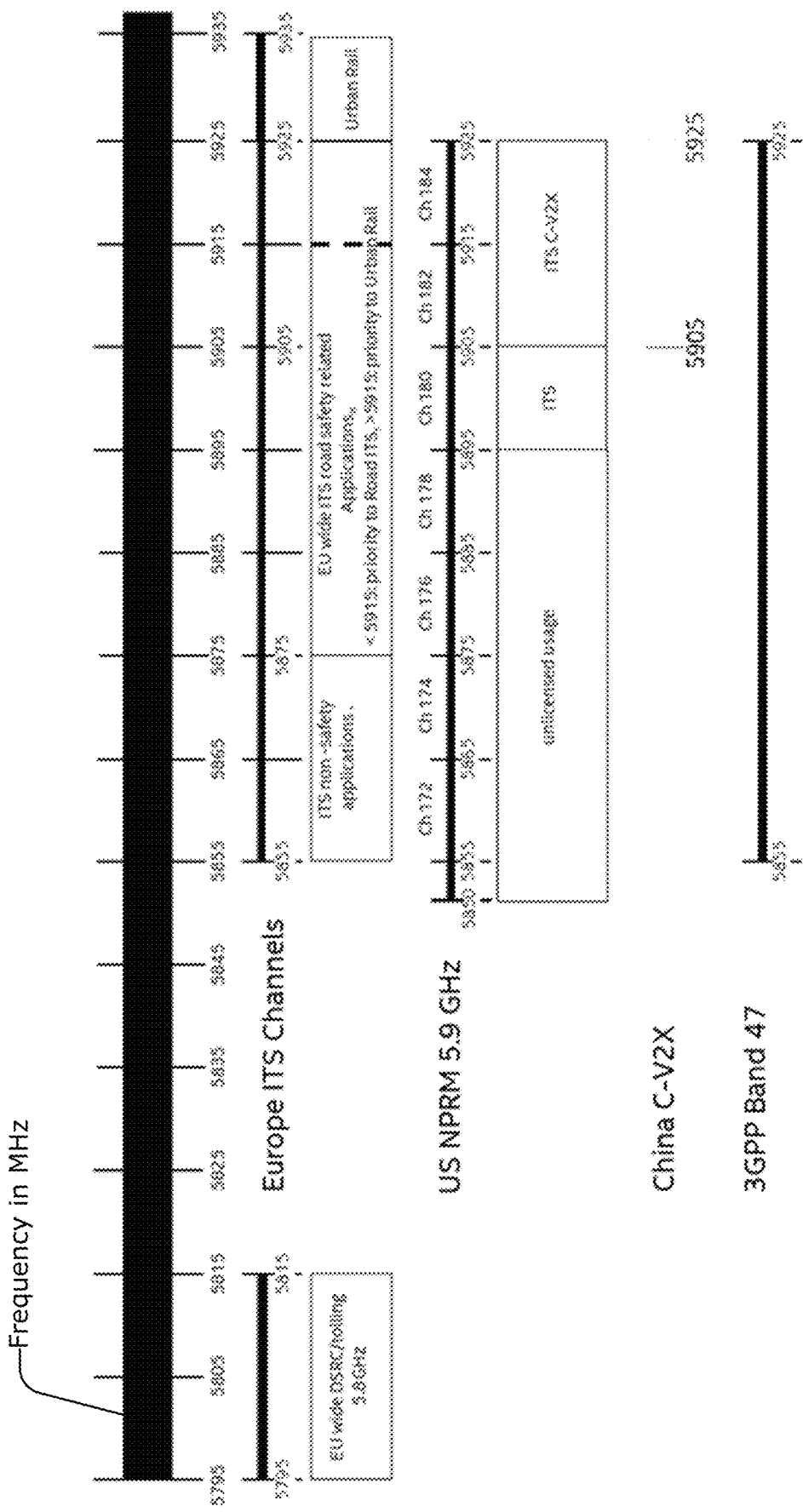
FIG. 7 illustrates the current ITS allocations and allocation discussions world-wide.

FIG. 7 shows the current V2X RAT/ITS allocations and allocation discussions world-wide. The spectrum mask requirements with respect to uRAT systems operated in the U-NII-5 band indicate that large bandwidth modes being operated in the immediate (upper) adjacent bands to 5.9 GHz will substantially affect the performance of ITS systems in 5.9 GHz. Specifically, uRAT operation in U-NII-3 and U-NII-5 creates problematic levels of interference onto 5.9 GHz ITS, but the potential operation in U-NII-4 (as currently considered by FCC) would be even more problematic since ITS is operated in directly adjacent bands.

In Europe, there is no operation of uRAT systems discussed in the lower part of 5.9 GHz, but the same interference issues are faced from uRAT system operation in 6 GHz, creating interference into the V2X portion of the 5.9 GHz band. Additionally, some propose co-channel operation in the 5.9 GHz band between C-V2X and W-V2X, a technology based on the same technology used in WiFi.

The present disclosure addresses issues related to protecting 5.9 GHz V2X communication systems against interference from uRAT systems. In the following discussion, it is assumed that uRAT systems operate in U-NII-3 (5 GHz), U-NII-4 (as recently approved by FCC), and/or U-NIT-5 (6 GHz) while maintaining the active protection burden on the ITS system (being transparent to uRAT systems).

Current/existing solutions involve switching the 5.9 GHz V2X RAT to a very robust Modulation and Coding Scheme (MCS) in order to cope with WiFi interference. The issue with these solutions is that the overall capacity and spectral efficiency for 5.9 GHz operation is reduced dramatically. This measure can reduce the effects of interference, but will still be impaired by the de-sensitization due to the wide band noise, which results in reduced reception (Rx) sensitivity, and thus, reduced range. Furthermore, an active protection mechanism was previously proposed, where the burden of achieving active protection of the ITS system is laid on the WiFi system (e.g., WiFi needs to scan for the ITS system and implement appropriate measures).

The present disclosure provides measures to be taken by STAs implementing a particular RAT such as a V2X RAT (e.g., 3GPP C-V2X (including LTE-V2X and NR-V2X) and W-V2X (including ITS-G5/DSRC)), which is transparent to other RAT systems (e.g., uRAT systems). This puts the burden onto the RAT system while being transparent for the other RATs (e.g., uRATs). In embodiments, prior to a transmission in a predefined WM or band (e.g., 5.9 GHz band or similar), a Network Allocation Vector (NAV) as defined by [IEEE80211] is set in neighbouring bands (e.g., unlicensed bands where uRATs may be operated). This NAV setting prevents transmissions in the neighbouring bands (e.g., by uRAT-Ss) during ongoing transmissions in the subject band/channels (e.g., during V2X RAT transmissions), and thus, the interference issue is resolved. This protects RAT systems (e.g., V2X RAT-Ss) from interference caused by other RAT systems (e.g., uRAT systems such as WiFi or the like) without requiring any change in the other RAT systems (e.g., uRAT systems). The FCC has indicated that a regulation change is unlikely (e.g., requiring a lowering of out of band emissions for uRAT systems). Therefore, active protection solutions may be required, and the present disclosure provides such active protective solutions.

1.2.2. NAV Setting Signal Aspects

There are many services specified by [IEEE80211] including: six services to support MAC service data unit (MSDU) delivery between STAs; three services are used to control [IEEE80211] LAN access and confidentiality; two services used to provide spectrum management; one service to support LAN applications with QoS requirements; one service to support higher layer timer synchronization; and one service used for radio measurement. Each of the services is supported by one or more MAC frame types.

A station (STA) is able to properly construct a subset of MAC frames for transmission and decode a (potentially different) subset of MAC frames upon validation following reception. The particular subset of these frames that the STA constructs and decodes is determined by the functions supported by that particular STA. The STA validates every received frame using the frame check sequence (FCS) and to interpret certain fields from the MAC headers of all frames. Each frame includes the following basic components: a MAC header including frame control, duration, address, optional sequence control information, optional QoS Control information (QoS Data frames only), and optional HT Control fields (+HTC frames only); a variable-length frame body, which contains information specific to the frame type and subtype; and an FCS, which contains a 32-bit CRC based on ITU-T Recommendation V.42, Error-correcting procedures for DCEs using asynchronous-to-synchronous conversion ITU-T V.42 ("[ITUTV42]").

The [IEEE80211] MAC sublayer uses four types of frames including: data frames, management frames, extension frames, and control frames. Data frames are handled by the MAC data plane; MAC management frames and MAC extension frames are handled via the MAC management plane; and MAC control frames are used to support the delivery of [IEEE80211] data frames, management frames, and extension frames. Some of the aforementioned services are supported by MAC management PDUs, which are transported in MAC management frames, and the MSDU delivery service is supported by MAC data frames.

All of these frames gain access to the WM via the [IEEE80211] MAC sublayer medium access method. The basic medium access protocol is (or includes) a distributed coordination function (DCF) that allows for automatic medium sharing between compatible PHYs through the use of carrier sense multiple access with collision avoidance (CSMA/CA) and a random backoff time following a busy medium condition. In addition, all individually addressed traffic uses immediate positive acknowledgment (Ack frame), in which retransmission is scheduled by the sender if no Ack frame is received.

CSMA/CA allows stations to determine whose turn it is to transmit a frame, how to avoid collisions, how to detect collisions, and how to gracefully recover from failed transmissions due to collisions and/or other errors, such as interference. The CSMA/CA protocol is designed to reduce the collision probability between multiple STAs accessing a medium, at the point where collisions would most likely occur. Just after the medium becomes idle following a busy medium (as indicated by the STA's carrier sensing (CS) function) is when the highest probability of a collision exists. This is because multiple STAs could have been waiting for the medium to become available again. This is the situation that necessitates a random backoff procedure to resolve medium contention conflicts.

The STA's CS function can include physical and virtual mechanisms. The physical CS mechanisms include Clear Channel Assessment (CCA), which involves stations listening to received energy on the radio interface. Virtual CS mechanisms are used to inform surrounding nodes/STAs of impending data transmission through broadcast signalling. Virtual CS is a logical abstraction, which limits the need for physical CS at the air interface in order to save power. The virtual CS mechanism is achieved by distributing reservation information announcing the impending use of the medium. The exchange of RTS and CTS frames prior to the actual data frame is one means of distribution of this medium reservation information. The RTS and CTS frames contain a duration field that defines the period of time that the medium is to be reserved to transmit the actual data frame and the returning Ack frame. A STA receiving either the RTS frame (sent by the originating STA) or the CTS frame (sent by the destination STA) processes the medium reservation. Thus, a STA might be unable to receive from the originating STA and yet still know about the impending use of the medium to transmit a data frame. Another means of distributing the medium reservation information is the Duration/ID field in individually addressed frames (see e.g., FIG. 12). This field gives the time that the medium is reserved, either to the end of the immediately following Ack frame, or in the case of a fragment sequence, to the end of the Ack frame following the next fragment.

The virtual CS mechanism provided by the MAC layer is referred to as the NAV. The NAV maintains a prediction of future traffic on the medium based on duration information that is announced in RTS/CTS frames by non-DMG STAB and RTS/DMG CTS frames by DMG STAB prior to the actual exchange of data. A DMG STA is a STA whose radio Tx/Rx is capable of transmitting and receiving DMG PHY PDUs (PPDUs). For example, a DMG STA may include a DMG antenna, which is a phased array, a single element antenna, or a set of switched beam antennas covered by a quasi-omni antenna pattern.

Setting and resetting of the NAV for non-DMG STAB and DMG STAB that support a single NAV may be performed as follows: a STA that receives at least one valid frame in a PSDU can update its NAV with the information from any valid duration field in the PSDU. When the received frame's RA is equal to the STA's own MAC address, the STA does not update its NAV. Further, when the received frame is a DMG CTS frame and its TA is equal to the STA's own MAC address, the STA does not update its NAV. For all other received frames the STA updates its NAV when the received duration is greater than the STA's current NAV value. Upon receipt of a power save (PS)-Poll frame, a STA updates its NAV settings as appropriate under the data rate selection rules using a duration value equal to the time, in microseconds, required to transmit one Ack frame plus one short interframe space (SIFS), but only when the new NAV value is greater than the current NAV value. If the calculated duration includes a fractional microsecond, that value is rounded up to the next higher integer. Various additional conditions may set or reset the NAV, as described in 10.4.3.3. When the NAV is reset, a PHYCCARESET.request primitive is issued. This NAV update operation is performed when the PHYRXEND.indication primitive is received. Additional aspects of the mechanism for setting the NAV using RTS/CTS or RTS/DMG CTS in the DCF is described in section 10.3.2.4 of [IEEE80211]. Use of the NAV in the point coordination function (PCF) is described in section 10.4.3.3 of [IEEE80211], and use of the NAV in HCF is described in sections 10.22.2.2 and 10.22.3.4 of

[IEEE80211]. Additional details regarding NAV use appear in sections 10.3.2.5, 10.3.2.12, 10.36.10, and 10.26 of [IEEE80211].

In some implementations, the CS mechanism combines the NAV state and the STA's Tx status with physical CS to determine the busy/idle state of the medium. The NAV may be thought of as a counter, which counts down to 0 at a uniform rate. When the counter is 0, the virtual CS indication is that the medium is idle; when the counter is non-zero, the indication is busy. If a DMG STA supports multiple NAVs as defined in section 10.36.10 of [IEEE80211] and all counters are 0, the virtual CS indication is that the medium is idle; when at least one of the counters is non-zero, the indication is busy. The medium is also determined to be busy when the STA is transmitting.

1.2.3. NAV Setting Signal Interference Mitigation Mechanisms

As mentioned previously, NAV is a virtual CS mechanism used with wireless network protocols such as [IEEE80211] (e.g., WiFi) and [WiMAX]. Here, a STA sends a frame (e.g., a CTS frame or the like), and other STAs that receive the sent frame set their NAV and wait for that duration before accessing the wireless medium (WM). The NAV-based MAC frame headers contain a duration field that specifies the transmission time required for the frame during which the medium will be occupied. The STAs listening on the WM read the duration field and set their local NAV, which is used by each receiving STA to determine how long they should defer from accessing the medium.

In the [IEEE80211] and DSRC/ITS-G5 standards, the NAV indicator indicates the time period that a transmitting station intends to occupy the medium for transmitting data. The NAV may be considered to be a type of counter that counts down to zero at a uniform rate. When the counter is zero, the virtual CS indication indicates that the medium is idle. When the counter has a non-zero value, the virtual CS indication indicates that the medium is busy. The medium is also considered to be busy when the station is transmitting. In [IEEE80211], the NAV represents the number of microseconds (μs) the transmitting station intends to hold the medium busy with a maximum of 32,767 μs. When the transmitting station sends an RTS, the receiving station waits one SIFS before sending a CTS. Then, the transmitting station waits for another SIFS before transmitting data, and the receiving station waits an SIFS before sending an ACK. In this case, the NAV is the duration from the first SIFS to the ending of ACK, and during this time the medium is considered busy.

According to various embodiments, prior to a first RAT transmission (e.g., ITS/V2X transmission) by a first RAT-S (e.g., an ITS-S that implements any type of V2X RAT such as C-V2X and W-V2X RATs), the first RAT-S performs the following steps:

(1) The first RAT-S scans neighbouring channels allocated to second RAT systems (e.g., unlicensed RATs; in the US this includes the uppermost channels of U-NII-3 (5 GHz), the uppermost or all of channel (c) in U-NII-4 (as recently approved by FCC) and/or the lowermost channel of U-NII-5 (6 GHz)). For example, the first RAT-S can use the channel sensing and/or LBT mechanisms defined in [IEEE80211], and/or 3GPP sensing procedures (e.g., resource allocation mode 4) defined by, for example, 3GPP TR 37.985 v16.0.0 (2020-07-14).

(2) If the neighbouring second RAT channels are unused, the first RAT-S (e.g., the ITS-S) initiates setting the NAV by transmission of a suitable datagram in one, several, or all of the identified channels allocated to second RAT systems (e.g., uChannels). In some embodiments, the setting of the NAV is done using a suitable MAC frame such as an [IEEE80211] control frame. The [IEEE80211] control frame may be a CTS-to-self frame or some other control frame (such as those discussed herein). To set the NAV, the first RAT-S sets the duration field in the [IEEE80211] control frame to include a value that lasts until the end of the intended first RAT transmission. In this way, the NAV prohibits any second RAT transmissions until the end of the intended first RAT transmission.

(3) Additionally or alternatively, the first RAT-S observes the transmission of another NAV related settings by other first RAT-Ss in the neighbouring (unlicensed) bands. If the first RAT-S finds that the other NAV setting is sufficiently protecting its first RAT transmission, then the first RAT transmission can be initiated immediately (or at any suitable point in time).

(4) Additionally or alternatively, a hierarchical structure is used where one or more STAs with a highest priority handle the issuance of NAV setting signals in neighbouring RAT channels (e.g., uChannels), and STAs having a lower priority would then initiate their transmissions as soon as the NAV is set by the higher priority STA. Additionally or alternatively, the highest priority STA may communicate the setting of the NAV in its RAT band directly to other lower priority STAs.

(5) Additionally or alternatively, the NAV is not only set over the time of a single RAT transmission, but over multiple RAT transmissions.

(6) Additionally or alternatively, the unlicensed bands may be occupied by signals issued by one or more STAs. These signals would have improved out-of-band emission characteristics (e.g., better than required for [IEEE80211] systems) such that the interference into the first RAT (e.g., ITS/V2X) channels is minimized. By transmitting these signals in the second RAT (e.g., unlicensed) band, the access to other RAT systems (e.g., unlicensed systems including WiFi, etc.) is de-facto prevented and the interference into first RAT bands is minimized.

(7) Once the NAV is set in one, several, or all neighbouring second RAT channels, then the first RAT transmission can start in the first RAT channel(s).

Figure 8:
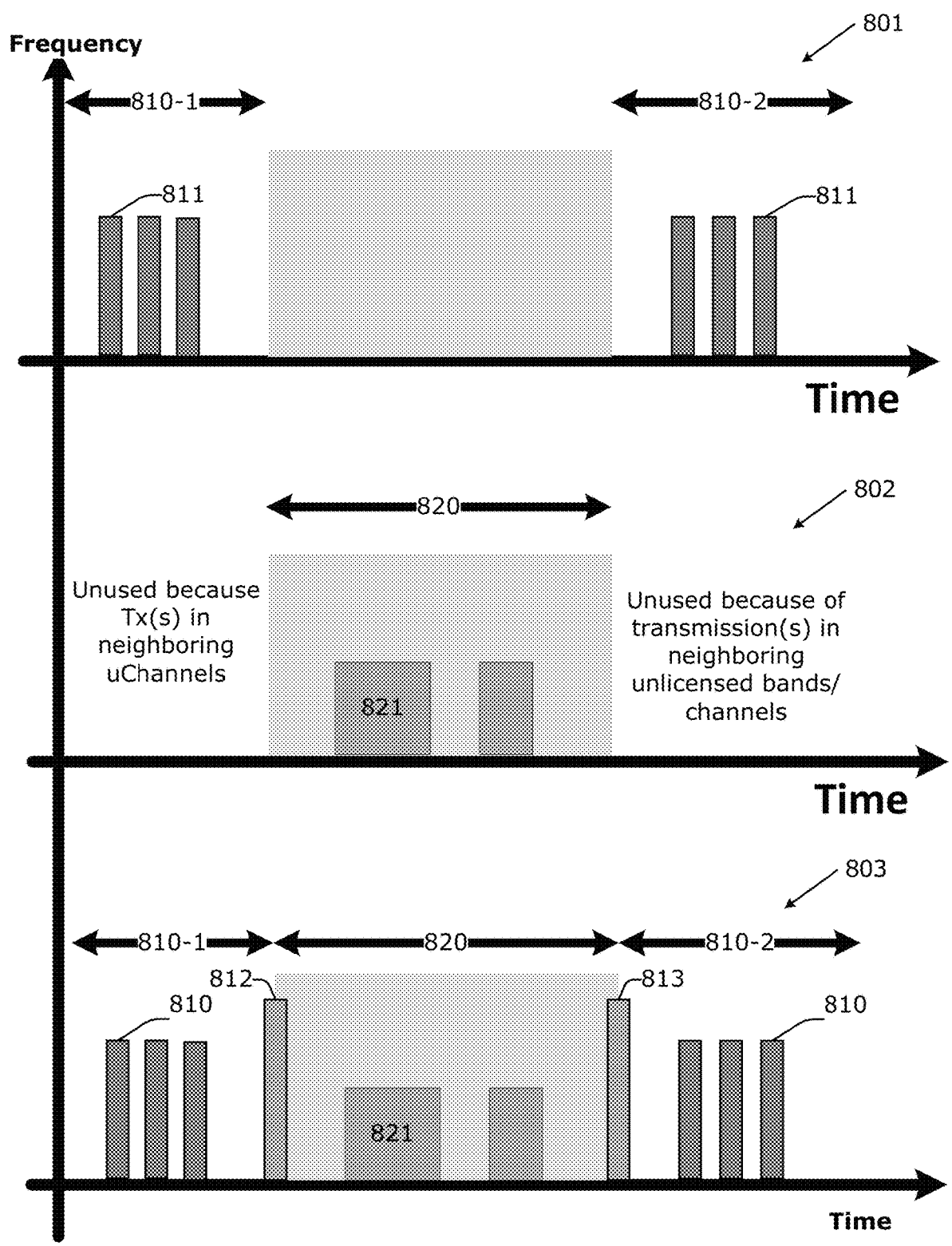
FIG. 8 illustrates allocation approach for different RATs protected by Network Allocation Vectors (NAVs).

FIG. 8 shows example intervals for RAT1 and RAT2 transmissions protected by NAV signalling. In FIG. 8, graph 801 shows uChannel transmission intervals 810-1 and 810-2 during which uChannel transmissions 811 take place (for the sake of clarity, not all transmissions 811 are labelled in FIG. 8), which may include one of RAT1 or RAT2 transmissions. Graph 802 shows a licensed transmission interval 820 during which licensed RAT transmissions 821 are transmitted (for the sake of clarity, not all transmissions 821 are labelled in FIG. 8). Graph 803 shows a NAV signal 812 being set by a first RAT STA in order to create protection for second RAT STA transmissions 821 from interference by the uChannel transmissions 811.

According to various embodiments, where RAT coexistence is based on deterministic timing, and static, semi-static and dynamic time slot configurations, a first RAT system ("RAT1 stations") takes over the overall timing management of all RATs including RAT1 stations and second RAT systems ("RAT2 stations"). This is achieved through the setting of the [IEEE80211] NAV, which is a virtual CS mechanism that limits the need for physical carrier-sensing at the air interface in order to improve power efficiency. The MAC layer frame headers contain a duration field that specifies the transmission time required for the frame (e.g., indicating the time for which the medium will be busy). In these embodiments, the RAT1 station sets the duration field in the MAC layer frame to specify the transmission time required for the data frame(s). The other ITS-Ss will listen on the WM to obtain the MAC layer frame. When the other stations obtain the MAC layer frame, they read the duration field and set their NAV indicator/counter with the value included in the duration field (e.g., indicating an amount of time the other stations must abstain from accessing the medium). For example, in the [IEEE80211] standard (and thus potentially also for ITS-G5), the NAV indicates the time period which is intended to be held by the ITS-S, and can be a maximum of 32.767 μs. In this way, the RAT2 stations will behave as "hidden terminals" during the RAT1 station transmissions and will refrain at accessing the channel. The total time a RAT2 station will defer access is the NAV time plus a configured AIFS time. In one example, the RAT1 stations are C-V2X RAT systems and the RAT2 stations are W-V2X RAT systems. In another example, the RAT1 stations are W-V2X RAT systems and the RAT2 stations are C-V2X RAT systems.

In conventional distributed CSMA/CA protocols, the process to resolve the hidden terminal problem is implemented as follows: The Tx sends an RTS, and the Rx waits one SIFS before sending a CTS signal. Alternatively, a CTS-to-self signal may be sent including the duration field, which will be used to set the NAV. Then, the Tx will wait for another SIFS before sending the payload data. Afterwards, the Rx will wait a SIFS before sending ACK. Following this reasoning, the NAV is the duration from the first SIFS to the ending of ACK. During this time the medium is considered busy. In various embodiments, a first RAT (RAT1) terminal broadcasts an [IEEE80211] sequence (e.g., an RTS frame, a CTS frame, a CTS-To-self frame, a CTS-to-AP frame, etc.), which will make the second RAT (RAT2) stations to set their NAV, in order to get protection during the RAT1 transmission period.

In some implementations, not all RAT1 stations issue the NAV setting signal and there are multiple possible rules to establish which station will issue the NAV signal, preventing all RAT2 stations from transmitting during the RAT1 time slot. For example, during a semi-persistent scheduling (SPS) procedure, the RAT1 station that allocated a specific resource in the available resource pool will be the station eligible to issue the NAV setting signal. Although not all RAT1 stations need to issue the NAV setting signal, all of them do need to know the RAT distribution or the time split between the various RATs in a given region or area. For static and semi-static superframe configurations, the timing updates are provided offline or externally by means of other entities in the system. For dynamic superframe configurations, the RAT1 station(s) could use the metrics described in section 1.2.9.5 (infra) to determine the RAT distribution metric(s), and then employ a mapping between RAT distribution and slot duration as presented in Table 6 and Table 7 (shown infra).

FIG. 9 shows an example 900 of how to achieve coexistence between different RATs (e.g., V2X RATs) through appropriate setting of the NAV by a RAT1 station. Prior to a RAT1 transmission 911-1, the RAT1 station issues a NAV setting request 901-1 applying the corresponding signalling as defined in [IEEE80211] as a mandatory feature. Consequently, the RAT1 time slot (e.g., RAT1 interval 910-1 in FIG. 9) will be protected from RAT2 transmissions 921 occurring at the same time (e.g., during the RAT1 interval 910-1). At the end of the RAT1 interval 910-1, the NAV is automatically released 902-1, no additional signalling is required. Then, the RAT2 stations will be able to access the medium for RAT2 transmissions 921 during the RAT2 interval 920 applying its standard protocol until the next NAV 901-2 is issued by a RAT1, which starts another C RAT1 interval 910-2 for RAT1 transmissions 911-2 (which is eventually released 902-2). Note that not all RAT1 transmission 911-1, 911-2 are not labelled in FIG. 9 for the sake of clarity. Here, the RAT1 station broadcasts an [IEEE80211] sequence (e.g., RTS, CTS, CTS-to-self, or the like) that includes the NAV setting request 901-1, 901-2, which cause the RAT2 stations to set their NAV indicators (counters) in order to get protection during the RAT1 transmission period. after setting the NAV, the RAT1 transmissions 911-1, 911-2 are protected from RAT2 and/or other uRAT interference.

In some cases, it is possible that RAT2 (e.g., W-V2X) transmissions exceed the boundaries of their respective slots. In this case, a NAV setting is to occur either early (within the RAT2 slot) or just after the final RAT2 transmission, which is practically introducing a buffer zone 1025 after the end of the RAT2 frame as illustrated by FIG. 10, which shows another example NAV operation 1000. In FIG. 10, the NAV setting signal 1001 is transmitted at the beginning of the first RAT1 interval 1010-1, and the NAV is released 1002 at the end of the first RAT1 interval 1010-1. Another NAV setting signal 1003 is set (or sent) after the last RAT2 transmission 1021 is finalized in the RAT2 interval 1020 (as part of a RAT1 buffer period 1025). The buffer period 1025 may be a separate interval, part of the RAT2 interval 1020 or part of the RAT1 interval 1010-2.

In embodiments, the set NAV signals 901, 1001, 1003 is/are implemented through a MAC control frame such as a CTS, RTS, CTS-to-self, etc. The release NAV indication 1002 is typically not a signal on the air, but simply an illustration that the originally set NAV will "expire" at the end of the V2X RAT1 interval. Then, the resource is again available for the RAT2 transmissions as shown by FIGS. 9 and 10.

In one example of the above implementations, the RAT1 station is a C-V2X station and the RAT2 station is a W-V2X station. In another example, the RAT1 station is a W-V2X station and the RAT2 station is a C-V2X station. In another example, the RAT1 station is a non-V2X station (i.e., a station that does not implement a V2X-specific RAT) and the RAT2 station is a C-V2X station or a W-V2X station.

Figure 11:
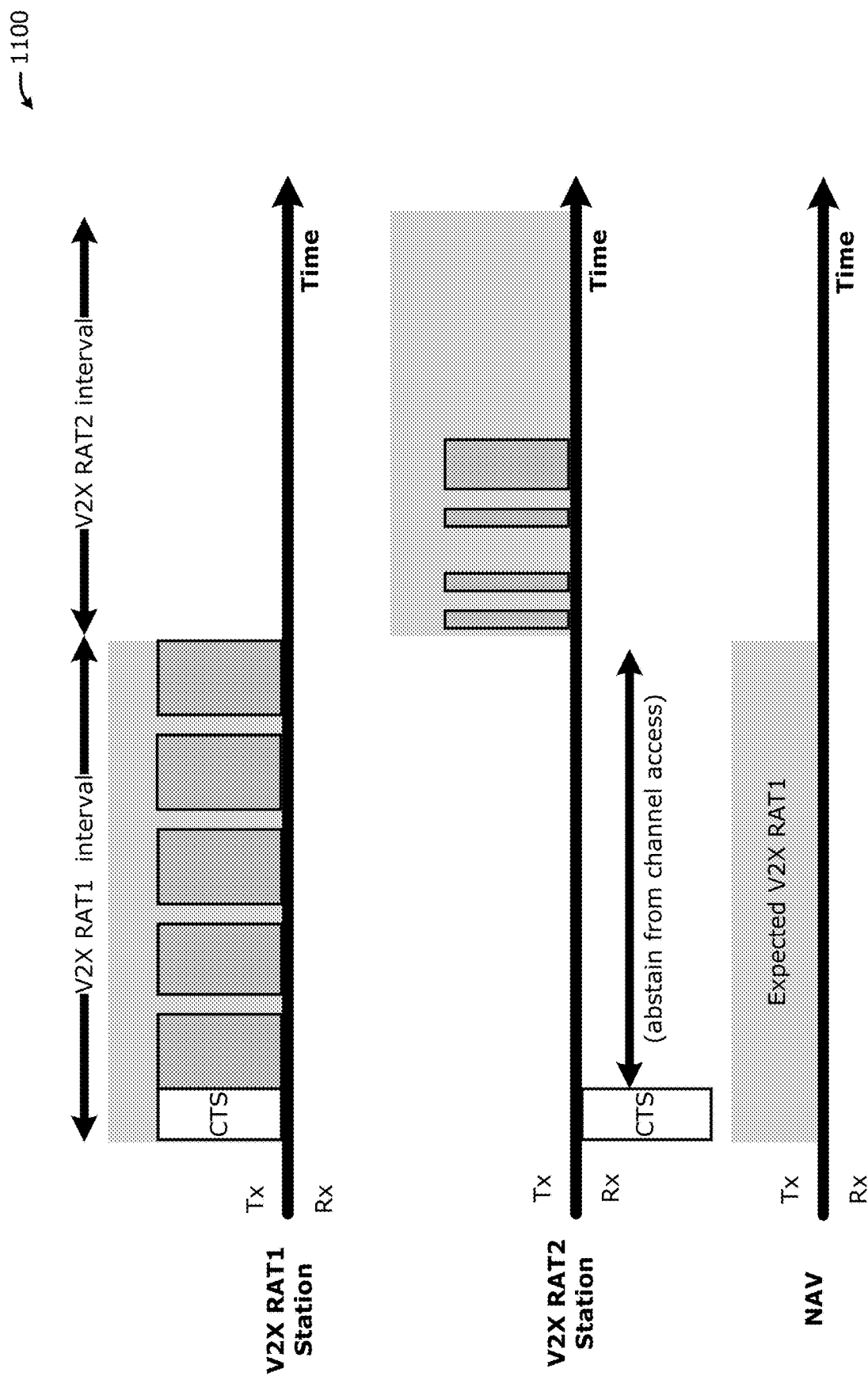
FIG. 11 shows an example of the basic operation of a Clear-to-Send (CTS)-To-Self signal protection mechanism.

FIG. 11 shows an example 1100 of the operation of the protection mechanism using the CTS-to-self signal. Here, the RAT1 station sends the CTS-to-self and some or all RAT2 stations in or around the vicinity of the RAT1 station, or in a particular coverage area, listen to CTS frames and update the NAV accordingly. In some implementations, the CTS frame is sent at the maximum speed at which it can be sent, using a modulation that can be received by most or all RAT2 stations.

Figure 12:
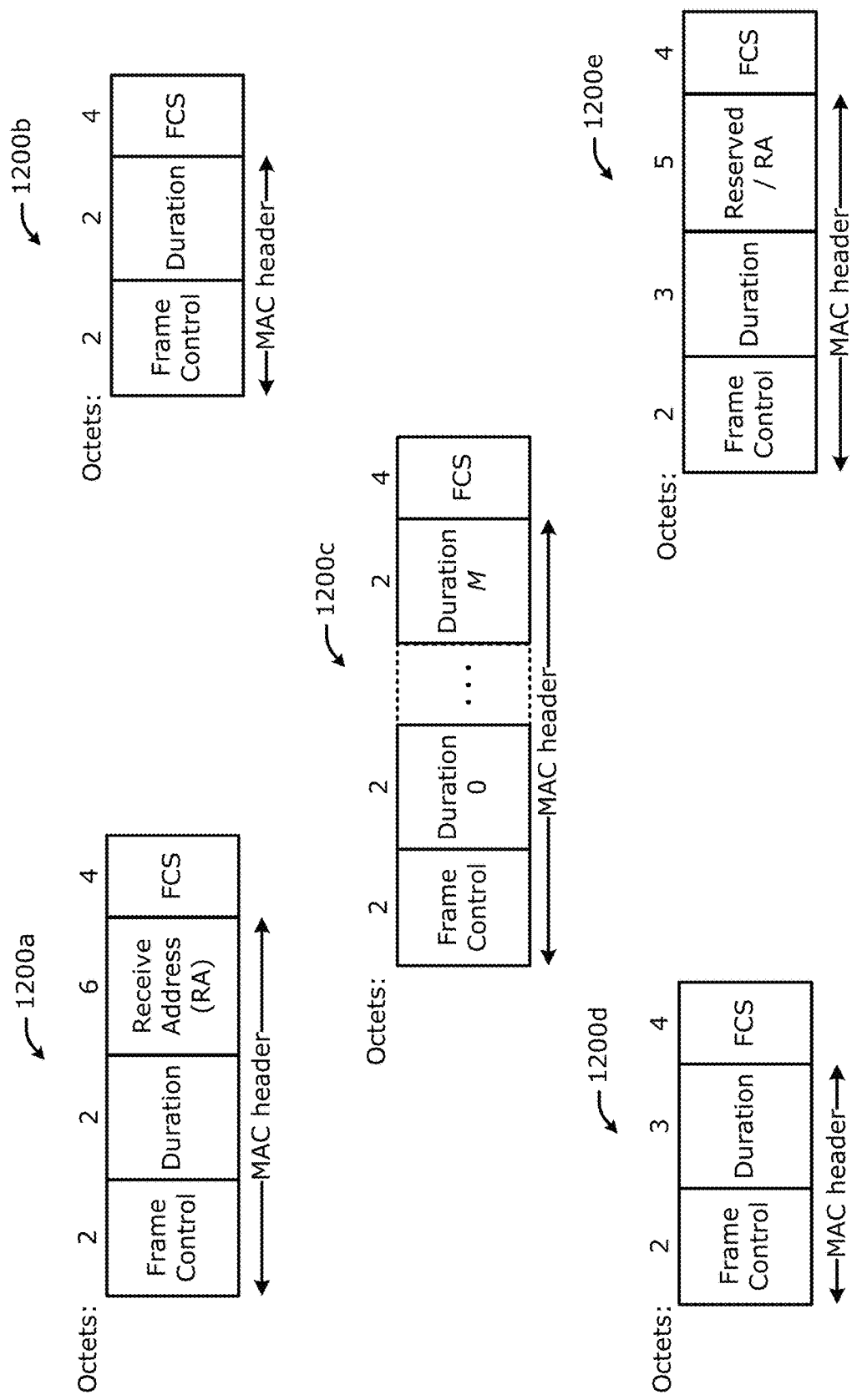
FIG. 12 illustrates example CTS-to-Self frames formats.

[IEEE80211] defines the CTS content on the MAC layer (e.g., MAC layer protocol data unity (MPDU)) (see e.g., [IEEE80211], "Section 9.3.1.3 CTS frame format"), and is also depicted in FIG. 12 as frame format 1200a.

1.2.4. NAV Setting Signal Content and Structure

FIG. 12 shows various frame formats 1200a-1200e (collectively referred to as "frame format 1200", "frame 1200", or the like) on the MAC layer (see e.g., Section 9.3.1.3 of [IEEE80211]). The frames 1200 are MAC layer frames, which are referred to as MAC protocol data unit (MPDU). An MPDU is a unit of data exchanged between two peer MAC entities using the services of the PHY. Each MAC frame format 1200 are control frames that comprise a set of fields that occur in a fixed order.

The frame formats 1200 of FIG. 12 are CTS frames. CTS is a control frame employed in the MAC layer protocol. Usually, a CTS frame is sent by the Rx after it gets the RTS frame prior to receiving of the actual data frame. When a STA needs to distribute NAV information, for instance, to reserve a medium for a transmission, the STA may first transmit a CTS frame with the RA field equal to its own MAC address if the node is a non-DMG STA. CTS frame with the RA field equal to its own MAC address is referred to as a "CTS-to-self" frame. Additionally or alternatively, CTS-to-AP frames can be used to distribute NAV information. A CTS-to-AP frame is a CTS frame that is not transmitted in response to an RTS frame and in which the RA field is equal to the MAC address of the AP with which the STA is associated. Sending a CTS-to-AP allows NAV protection to be established without causing the AP to update its NAV, as opposed to, for example, the sending of a CTS-to-self frame, which would potentially have caused the AP NAV to become set and then prevented it from responding to the subsequent RTS frame. The AP does not set a NAV in the CTS-to-AP case and is able to respond to the following RTS frame. The NAV at receiving STAs is not updated by the RTS frame because its duration does not exceed the duration of the preceding CTS frame, and subsequently, the NAV cannot be reset during CTS2.

Each of the frames 1200 include one or more of a frame control field, a duration field, a Receive Address (RA) field, and an FCS field, having the octet lengths as shown by FIG. 12. The first three subfields of the Frame Control field are Protocol Version, Type, and Subtype, and the remaining subfields of the Frame Control field depend on the setting of the Type and Subtype subfields. Aspects of these subfields are discussed in section 9.2.4.1 of [IEEE80211]. The RA field contains an IEEE MAC individual or group address that identifies the intended immediate recipient STA(s), on the WM, for the information contained in the frame body field. [IEEE80211] states that a CTS-to-SELF frame is a CTS frame in which the RA field is equal to the Tx's MAC address. In particular, when the CTS frame 1200a is a response to an RTS frame, the value of the RA field of the CTS frame 1200a is set to the address from the Tx address (TA) field of the RTS frame with the Individual/Group bit forced to the value 0; and when the CTS frame 1200a is the first frame in a frame exchange, the RA field is set to the MAC address of the Tx. The TA field contains a MAC address that identifies the STA that has transmitted, onto the WM, an MPDU contained in the frame body field. If the Individual/Group bit is 0, then the TA field is the individual address of the STA; otherwise, the TA field is a bandwidth signalling TA, indicating that the frame carries additional information in the scrambling sequence (see e.g., [IEEE80211] sections 9.3.1.2, 10.7.6.6, and 10.7.11).

For all CTS frames 1200 transmitted by a non-QoS STA in response to RTS frames, the duration value is the value obtained from the Duration field of the immediately previous RTS frame, minus the time, in microseconds ($\mu$s), required to transmit the CTS frame 1200 and its short interframe space (SIFS). If the calculated duration includes a fractional $\mu$s, that value is rounded up to the next higher integer. For all RTS frames sent by non-QoS STAB, the duration value is the time, in $\mu$s, required to transmit the pending Data or Management frame, plus one CTS frame 1200, plus one ACK frame, plus three SIFSs. If the calculated duration includes a fractional $\mu$s, that value is rounded up to the next higher integer. The SIFS period (e.g., "aSIFSTime") may be the nominal time (e.g., in $\mu$s) that the MAC and PHY require in order to receive the last symbol of a frame on the WM, process the frame, and respond with the first symbol on the WM of the earliest possible response frame (see e.g., section 10.3.7 in [IEEE80211]). In some implementations, the SIFS is 10 $\mu$s (see e.g., section 18.4.5 in [IEEE80211]).

At a non-QoS STA, if the CTS frame 1200 is the first frame in the exchange and the pending Data or Management frame requires ACK, the duration value is the time, in $\mu$s, required to transmit the pending Data or Management frame, plus two SIFSs plus one ACK frame. At a non-QoS STA, if the CTS frame 1200 is the first frame in the exchange and the pending Data or Management frame does not require acknowledgment, the duration value is the time, in $\mu$s, required to transmit the pending Data or Management frame, plus one SIFS. If the calculated duration includes a fractional $\mu$s, that value is rounded up to the next higher integer. For other CTS frame 1200 transmissions by a QoS STA, the duration value is set as defined in section 9.2.5 of [IEEE80211].

As alluded to previously, [IEEE80211] states that a "CTS-to-self frame is a CTS frame in which the RA field is equal to the Tx's MAC address." More details on employing the Tx's MAC address and potential solutions are discussed infra. The total CTS frame size is then 14 octets or 112 bits. In the PPDU (see e.g., PPDU 200 of FIG. 2), the overhead of service plus tail to the CTS frame (PSDU) are added and end up with 134 bits as "data" in the PPDU.

The symbol interval in IEEE 802.11p (see e.g., [IEEE80211]) is 8 $\mu$s (e.g., 6.4 $\mu$s symbol duration+1.6 $\mu$s guard interval) and the number of symbols necessary to transmit one CTS-to-Self depends on the choice of the transfer rates (e.g., modulation scheme and coding rate employed (MCS)).

Table 3 provides the supported transfer rates and MCS, as well as the corresponding total number of (uncoded and coded) bits per OFDM symbols and the corresponding necessary number of OFDM symbols $N_{NAV}$ to transmit the NAV setting signal (e.g., the CTS-to-Self frame in this case). The support of 3 Mbit/s, 6 Mbit/s, and 12 Mbit/s is mandatory for IEEE 802.11p and ITS-G5/DSRC. To ensure robustness of the reception of the NAV setting signal it is recommended that the default MCS is QPSK ½, corresponding to a data rate of 6 Mbit/s.

TABLE 3

Number of symbols necessary for transmitting the NAV setting

| Transfer rate (Mbit/s) | Modulation scheme | Coding rate | Data bits per OFDM symbol | Coded bits per OFDM symbol | Number of OFDM symbols for NAV ($N_{NAV}$) |
|---|---|---|---|---|---|
| 3 | BPSK | 1/2 | 24 | 48 | 6 |
| 4,5 | BPSK | 3/4 | 36 | 48 | 4 |
| 6 | QPSK | 1/2 | 48 | 96 | 3 |
| 9 | QPSK | 3/4 | 72 | 96 | 2 |
| 12 | 16-QAM | 1/2 | 96 | 192 | 2 |
| 18 | 16-QAM | 3/4 | 144 | 192 | 1 |
| 24 | 64-QAM | 2/3 | 192 | 288 | 1 |
| 27 | 64-QAM | 3/4 | 216 | 288 | 1 |

The duration of each component of the physical structure is outlined in Table 4

TABLE 4

The duration of the physical structure components

| PHY Preamble | Signaling information | MAC content |
|---|---|---|
| 32 µs (4 OFDM symbols) | 8 µs (1 OFDM symbol) | $N_{NAV}$*8 µs |

The total duration of the CTS-to-Self signal will in that case be 88 µs (or 72 µs), 64 µs, and 56 µs for the mandatory IEEE 802.11p MCS BPSK ½, QPSK ½ and 16-QAM ½, correspondingly.

The NAV setting time is given in the "Duration" Field of 16 bits specified in clause 9.2.4.2 ("Duration/ID field") in [IEEE80211], which indicates the duration of the RAT1 transmission interval plus suitable guard periods. For example, the intervals for RAT1 (e.g., C-V2X) and RAT2 (e.g., W-V2X) in FIG. 9 are protected by the NAV setting signal. In FIG. 9, after setting the NAV 901 in interval 910, the RAT1 (e.g., C-V2X) transmission is protected from RAT2 interference. In some implementations, the minimum value is 0 and the maximum 32,767 microseconds (µs). One example of a set of values for the duration can be employed according to the level of penetration of RAT1 equipped stations and/or according to the number of RAT1 stations in a specific geographical area as provided by Table 5.

TABLE 5

Example of set values for the duration

| | Percentage of C-V2X Stations | Duration of C-V2X Tx Interval ("Duration Field") | Duration of W-V2X Tx Interval |
|---|---|---|---|
| option 0 (implicit) | 0% (no C-V2X users; no CTS-to-Self) | 0 ms | 10 ms |
| option 1 | <15% | 1 ms | 9 ms |
| option 2 | [15-25[% | 2 ms | 8 ms |
| option 3 | [25-35[% | 3 ms | 7 ms |
| option 4 | [35-45[% | 4 ms | 6 ms |
| option 5 | [45-55[% | 5 ms | 5 ms |
| option 6 | [55-65[% | 6 ms | 4 ms |
| option 7 | [65-75[% | 7 ms | 3 ms |
| option 8 | [75-85]% | 8 ms | 2 ms |
| option 9 | >85% | 9 ms | 1 ms |
| Option 10 (implicit) | 100% (no W-V2X users; no CTS-to-self) | 10 ms | 0 ms |

Table 6 and Table 7 show additional or alternative examples of the time slot duration for each V2X RAT for different superframe durations. The "Duration" field in these examples is given by the duration of the LTE-V2X transmission interval. The ITS station, transmitting the NAV, will configure this field based on the local measurements of the technology distribution based on the metrics presented in section 1.2.9 infra (and in particular, section 1.2.9.5 infra) for the dynamic configuration. For the static and semi-static, the field can be configured offline or from information obtained from external entities.

TABLE 6

Time slot duration for each technology for a superframe of 25 ms
Superframe of 25 ms

| $Tech_{percentage}$ | C-V2X | W-V2X |
|---|---|---|
| [0:22[ % | 5 ms | 20 ms |
| [22:26[ % | 6 ms | 19 ms |
| [26:30[ % | 7 ms | 18 ms |
| [30:34[ % | 8 ms | 17 ms |
| [34:38[ % | 9 ms | 16 ms |
| [38:42[ % | 10 ms | 15 ms |
| [42:46[ % | 11 ms | 14 ms |
| [46:50[ % | 12 ms | 13 ms |
| [50:54[ % | 13 ms | 12 ms |
| [54:58[ % | 14 ms | 11 ms |
| [58:62[ % | 15 ms | 10 ms |
| [62:66[ % | 16 ms | 9 ms |
| [66:70[ % | 17 ms | 8 ms |
| [70:74[ % | 18 ms | 7 ms |
| [74:78[ % | 19 ms | 6 ms |
| [78-100] % | 20 ms | 5 ms |

TABLE 7

Time slot duration for each technology for a superframe of 50 ms
Superframe of 50 ms

| $Tech_{percentage}$ | C-V2X | W-V2X |
|---|---|---|
| [0:11[ % | 5 ms | 45 ms |
| [11:13[ % | 6 ms | 44 ms |
| [13:15[ % | 7 ms | 43 ms |
| [15:17[ % | 8 ms | 42 ms |
| [17:19[ % | 9 ms | 41 ms |
| [19:21[ % | 10 ms | 40 ms |
| [21:23[ % | 11 ms | 39 ms |
| [23:25[ % | 12 ms | 38 ms |
| [25:27[ % | 13 ms | 37 ms |
| [27:29[ % | 14 ms | 36 ms |
| [29:31[ % | 15 ms | 35 ms |
| [31:33[ % | 16 ms | 34 ms |
| [33:35[ % | 17 ms | 33 ms |
| [35:37[ % | 18 ms | 32 ms |
| [37:39[ % | 19 ms | 31 ms |
| [39:41[ % | 20 ms | 30 ms |
| [41:43[ % | 21 ms | 29 ms |
| [43:45[ % | 22 ms | 28 ms |
| [45:47[ % | 23 ms | 27 ms |
| [47:49[ % | 24 ms | 26 ms |
| [49:51[ % | 25 ms | 25 ms |
| [51:53[ % | 26 ms | 24 ms |
| [53:55[ % | 27 ms | 23 ms |
| [55:57[ % | 28 ms | 22 ms |
| [57:59[ % | 29 ms | 21 ms |
| [59:61[ % | 30 ms | 20 ms |
| [61:63[ % | 31 ms | 19 ms |
| [63:65[ % | 32 ms | 18 ms |
| [65:67[ % | 33 ms | 17 ms |
| [67:69[ % | 34 ms | 16 ms |
| [69:71[ % | 35 ms | 15 ms |
| [71:73[ % | 36 ms | 14 ms |
| [73:75[ % | 37 ms | 13 ms |
| [75:77[ % | 38 ms | 12 ms |
| [77:79[ % | 39 ms | 11 ms |
| [79:81[ % | 40 ms | 10 ms |
| [81:83[ % | 41 ms | 9 ms |
| [83:85[ % | 42 ms | 8 ms |
| [85:87[ % | 43 ms | 7 ms |
| [87:89[ % | 44 ms | 6 ms |
| [89-100] % | 45 ms | 5 ms |

In embodiments, the receiving RAT2 station (e.g., W-V2X station) should refrain from transmitting during the corresponding RAT1 transmission interval. Additionally or alternatively, RAT1 stations (e.g., C-V2X stations) should refrain from transmitting during the corresponding RAT2 transmission interval.

In order to protect the privacy of the CTS-to-self transmitting ITS-S (and/or for other reasons), the MAC address field should not be filled with its own MAC address, but rather with some general address that can be used by all ITS-Ss, such as all zeros, for example. Additionally or alternatively, since the MAC address is irrelevant for this specific use of the CTS-to-self as NAV setting signal, the RA field could be completely omitted since the main information conveyed is the duration of the NAV thereby shortening the CTS-to-self signal. In this modified shorter CTS-to-self signal, the modified CTS frame 1200b is shown by FIG. 12. For the modified CTS frame 1200b, the MAC address of the issuing station can be selected as follows:

A unique MAC address is provided to each RAT1 station where the unique MAC address is used for the corresponding field in the CTS-to-self frame.

Additionally or alternatively, an identical MAC address may be used for all RAT1 stations. This may be used to protect the privacy of the CTS-to-self transmitting station so that the MAC address field is not filled with its own MAC address. As examples, a general/generic address is used by all RAT1 stations, such as all zeros or all ones (1). In this implementation, the general/generic MAC address is used for the corresponding field in the CTS-to-SELF frame.

Additionally or alternatively, since the MAC address is irrelevant for this specific use of the CTS-to-Self as NAV setting signal, the RA field could be completely omitted (the main information conveyed is the duration of the NAV).

Additionally or alternatively, if the Tx RAT1 station also has a WiFi component/modem (e.g., not necessarily ITS-G5/DSRC, but commercial WiFi modem circuitry), the MAC address of the accompanying WiFi component/modem may be used. In either of these embodiments, this MAC address is used for the corresponding field in CTS-to-SELF.

Additionally or alternatively, the RA field could be omitted since the RA field may be irrelevant or nearly irrelevant for the envisioned application of the CTS-to-Self NAV setting signal, for example, in a broadcast mode without real interest or undesired to know the origin of the signal.

For the modified CTS frame 1200b, the total new CTS frame size is then 8 octets or 64 bits reducing the total number PHY data to 86 bits. The new total duration of the CTS-to-Self signal will in this case be 88 μs or 72 μs for BPSK ½, 56 μs for quadrature phase-shift keying (QPSK) ½, and 48 μs 16-state quadrature amplitude modulation (16-QAM) ½, correspondingly.

In another implementation where the RA field is omitted (or instead of omitting the RA field), the Duration field is extended by N_d more octets, where N_d=0, . . . , 6. With that modification the NAV setting would allow for longer transmission time of the RAT1 stations. By following a similar duration mapping, the maximum NAV duration (e.g., for N_d=6) would become 131,068 μs.

In another implementation where the RA field is omitted, 1 to M (where M is a number) additional durations (or duration fields) are included as is shown by frames 1200c in FIG. 12. With these additional NAV durations, the RAT1 stations can configure up to M (e.g., where M=4) transmission intervals that can be employed in successive transmission times, alternating with the corresponding RAT2 transmission time as defined in Table 5, Table 6, and/or Table 7. This would allow to refrain sending the NAV setting signal in those successive RAT1 transmission intervals.

Additionally or alternatively, instead of omitting the RA field, the Duration field is extended by N_d additional octets, where N_d=0, . . . , 6. With that modification the NAV setting would allow for longer time slots for the RAT1 stations than 32 ms. By following a similar mapping as the original one, the maximum NAV duration (e.g., for N_d=6), the Duration field would be 8 octets long and give an unrealistic time slot. N_d=0 corresponds to the modified short CTS-to-Self signal Type 1 as outlined by CTS frame 1200b in FIG. 12. For N_d=1, (e.g., one additional octet in the Duration field), a maximum time slot of more than 8 seconds is possible and it is denoted modified short CTS-to-Self signal Type 2, which is depicted by FIG. 12 as CTS frame 1200d. The total new CTS frame size is then 9 octets or 72 bits reducing the total number PHY data to 94 bits. The total duration of the short CTS-to-Self signal Type 2 will remain 72 μs, 56 μs and 48 μs equal to Type 1, for the mandatory MCS BPSK ½, QPSK ½ and 16-QAM ½. With the modified short CTS-to-Self signal Type 2 time slot durations up to 8 seconds are possible.

Based on the modified short CTS-to-Self signal Type 2 (e.g., CTS frame 1200d in FIG. 12), a third modification of the CTS-to-Self signal is possible. In this option, called modified CTS-to-Self Type 3 (which is depicted by FIG. 12 as CTS frame 1200e), the full CTS frame with 14 octets is transmitted. However, the Duration field is extended to three octets and the remaining 5 octets of the RA field are reserved for future use.

Additionally or alternatively to any of the above implementations, the MAC address of the issuing station (ego ITS-S) is selected according to one or more of the following implementations:

In a first implementation, a unique MAC address is provided to each ITS-S (this unique MAC address is used for the corresponding field in CTS-to-SELF frame). In a second implementation, an identical MAC address for all ITS stations, for example an all-zero or all-one MAC address (this unique MAC address is used for the corresponding field in CTS-to-SELF frame). In a third implementation, where C-V2X stations also have WLAN modem circuitry (not necessarily a W-V2X transceiver), the C-V2X stations use the MAC address of this accompanying WLAN component. In a fourth implementation, the RA field is omitted since the RA field is irrelevant or nearly irrelevant for the envisioned application of the CTS-to-SelfNAV setting signal (e.g., in a broadcast mode without real interest or undesired to know the origin of the signal).

1.2.5. Station Selection for Issuing NAV Setting Signal

In various embodiments, among all RAT1 stations within a given coverage area, only a single RAT1 station issues the NAV setting signal (e.g., through RTS/CTS or CTS-to-self). In these embodiments, a negotiation may take place to identify the RAT1 station that will be tasked with issuing the NAV setting signal among the multitude (e.g., possibly hundreds) of available RAT1 stations within a given coverage area.

Figure 13:
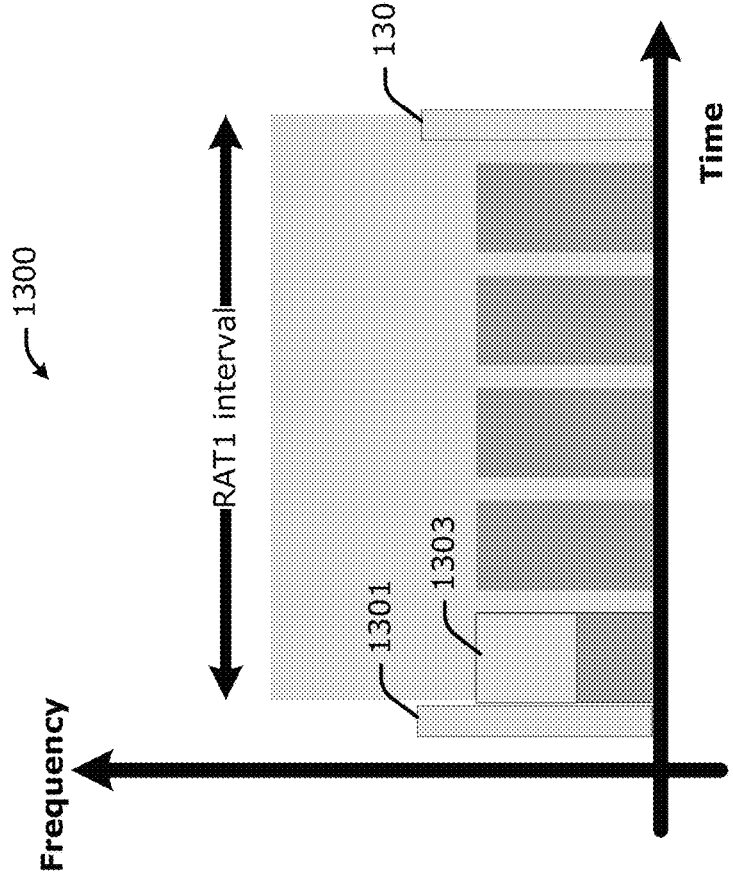

In some implementations, RAT1 stations share the available resource by allocating to themselves specific sub-channels at specific times using semi-persistent scheduling (SPS) as shown by FIG. 13. In FIG. 13, a sub-channel 1303 is taken by a specific (single) V2X RAT1 station. In such embodiments, the RAT1 station to issue the NAV setting signal 1301 (e.g., through an RTS, CTS, CTS-to-self, CTS-to-AP, or other like frame) will be selected as function of its sub-channel allocation in the previous RAT1 frame (or some RAT1 frame(s) that took place before the current RAT1 frame). The NAV is released 1302 in a same/similar manner as discussed previously.

The RAT1 station issuing the NAV setting signal will be selected as function of its sub-channel allocation in the previous RAT1 frame (or one of the previous RAT1 frames). In one example, the rule is that the RAT1 station is selected to issue the NAV setting signal at the beginning of the next RAT1 super frame, which has occupied the sub-channel in the "upmost left corner" (e.g., highest occupied frequency and earliest occupied time) of all occupied sub-channels.

Other rules may be used in other embodiments, for example, using the "lowest left corner" (e.g., lowest occupied frequency and earliest occupied time) of all occupied sub-channels, "upmost right corner" (e.g., highest occupied frequency and latest occupied time) of all occupied sub-channels, "lowest right corner" (e.g., lowest occupied frequency and latest occupied time) of all occupied sub-channels, and/or some other resources. In embodiments, the first occupied sub-channel is used for the selection rules. To give an example using the "lowest left corner" (e.g., lowest occupied frequency and earliest occupied time) rule, the corresponding sub-channel may relate to a transmission any time within the RAT1 transmission interval if previous resources remain unused as illustrated in FIG. 13.

In any of the aforementioned embodiments, the first occupied sub-channel is used for the above rules. To give an example using the "lowest left corner" (e.g., lowest occupied frequency and earliest occupied time) rule, the corresponding sub-channel may relate to a transmission any time within the RAT1 transmission interval if previous resources remain unused as illustrated by FIG. 14.

Figure 14:
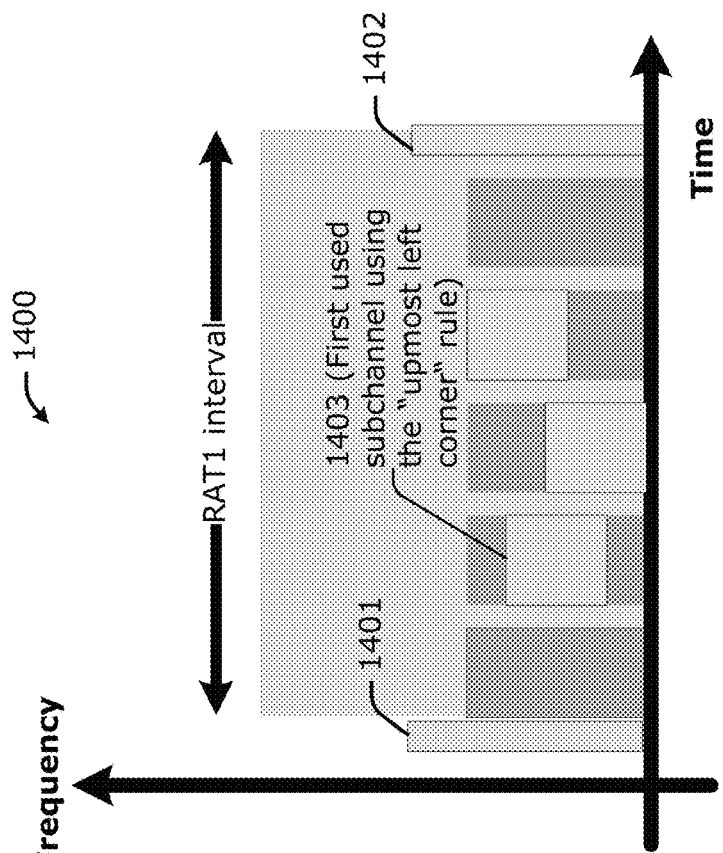
FIGS. 13 and 14 illustrate example of a V2X station resource allocation schemes.

In FIG. 14, a NAV setting signal 1401 is transmitted, and resource(s) 1404 is the first used sub-channel using the "uppermost left corner" rule. The RAT1 station performing the first transmission in the "upmost left corner" 1404 of the available resources is tasked to issue the NAV setting signal 1401 in the beginning of the next RAT1 interval (after the RAT1 interval shown by FIG. 14) to prevent RAT2 stations from accessing the channel. After the NAV release 1402 and a RAT2 interval (not shown), the V-ITS-Ss 121 occupying the "upmost left corner" resources 1404 will send the next NAV setting signal 1401 at the beginning of the next RAT1. The embodiments for selecting which RAT1 station will transmit a specific IEEE 802.11 signal can be applied to any type of header that is valid for the transmission of several RAT1 stations.

1.2.6. New Station Entering NAV Setting Range

Also, the case that new RAT2 stations may enter the coverage area of a specific transmission (of the NAV setting signal) needs to be addressed. In case that the new RAT2 stations arrive during the RAT1 transmission interval, it may not have received the NAV setting signal and may start transmitting during the RAT1 period as illustrated in FIG. 14 at 1403. In case a RAT2 station enters the coverage area at 1403, which is after the transmission of the NAV setting signal 1401, then the protection for RAT1 is not activated for this specific RAT2 station. Thus, the newly arrived RAT2 station may start transmitting during the RAT1 interval.

To address these scenarios, in various embodiments, the RAT2 station waits for the reception of a NAV setting signal before accessing the medium. In the example of FIG. 14, the RAT2 station will wait until the start of a new full RAT1 transmission interval (taking place after the interval shown by FIG. 14). The RAT2 station may only start transmitting in the shared channel when the new RAT2 interval starts.

However, in some cases, the new RAT2 station may not receive a NAV setting signal. This situation may occur if, for example, there are no RAT1 stations nearby or due to other sources of channel/radio interference. To address this issued, in some embodiments, the RAT2 station may transmit in the shared channel after waiting for a predetermined or configured number of intervals (e.g., 2 or 3 intervals) without reception of a NAV setting signal.

1.2.7. Frame and/or Signal Transmission

Figure 15:
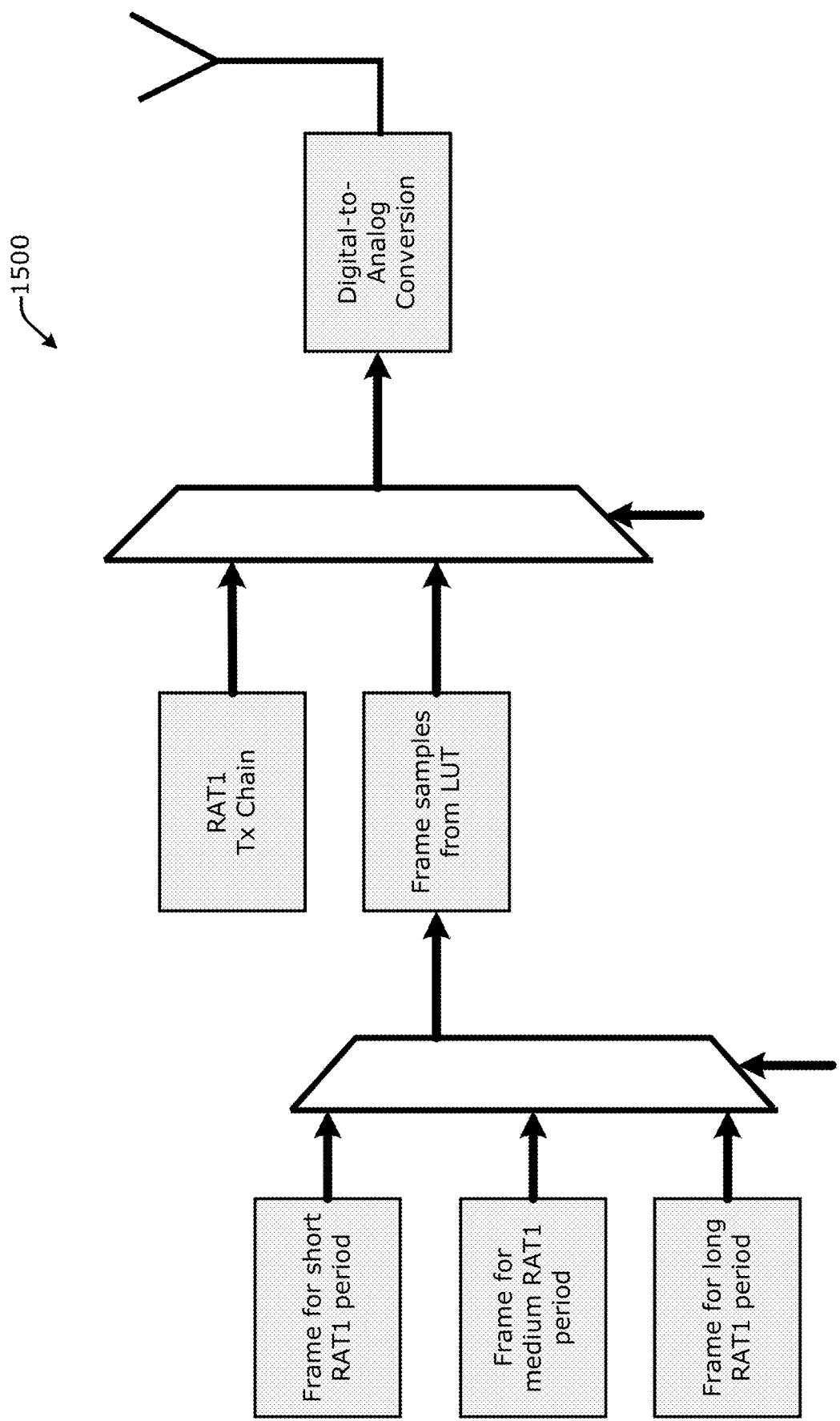
FIG. 15 shows an example implementation architecture.

FIG. 15 shows an example implementation architecture 1500. In various implementations, the transmission of the MAC frames (e.g., CTS-to-self signals) is implemented by storing pre-calculated or predefined vectors in a Look-up-Table (LUT) and adapting the MAC address field as well as the duration of the period to be protected as needed.

In addition to the CTS-to-self from [IEEE80211], the modified CTS-to-self signals for the NAV setting signal discussed previously can also be stored as an LUT. In some implementations, special multi-rate processing may be used to combine the NAV setting signal to the RAT1 signal. For example, where RAT1 is C-V2X, since the [IEEE80211] sample rate is not the same as the C-V2X sample rate(s), special multi-rate processing may be used to combine the NAV setting signal to the regular C-V2X signal. Additionally or alternatively, where the RAT1 (e.g., C-V2X) station also includes RAT2 (e.g., W-V2X) modem circuitry, the modem/baseband circuitry of the RAT1 station could trigger the RAT2 modem circuitry to send the NAV setting signal.

Additionally or alternatively, a frame transmission includes guard periods between the NAV setting signal (e.g., CTS-to-self frame or the like) and the subsequent RAT1 (e.g., C-V2X) transmission. Additionally or alternatively, a silence period (e.g., a guard or gap period 1603 in FIG. 16) is introduced between NAV sequence containing the NAV indicator. This gap allows suitable Tx switching between the NAV setting signal transmission and the RAT1 transmission. Additionally or alternatively, a same or similar silence period is introduced after the end of the RAT1 interval and the subsequent RAT2 interval.

Figure 16:
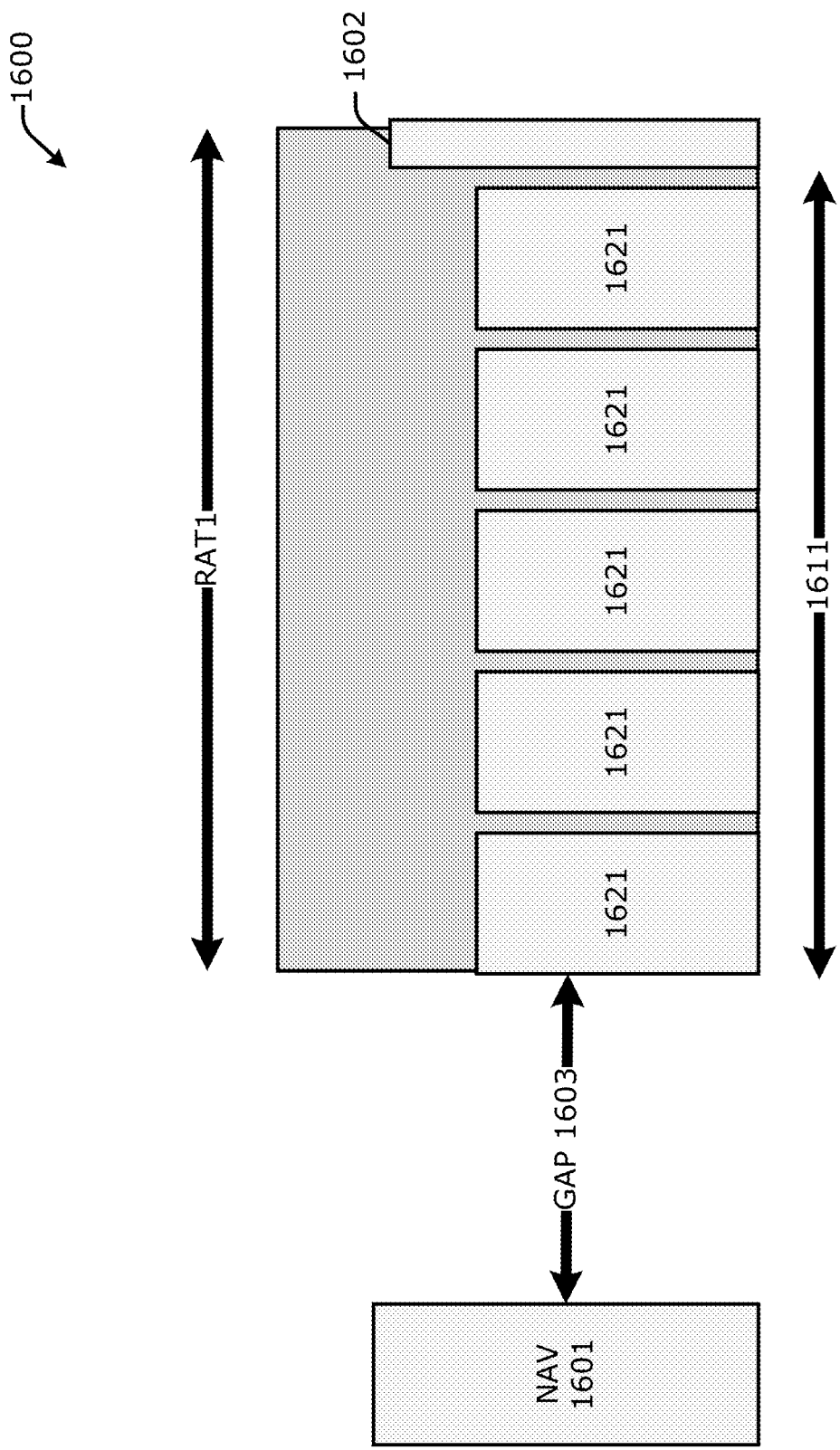
FIG. 16 shows an example guard period for CTS-to-SELF sequences containing NAV.

FIG. 16 shows an example where a guard period (gap 1603) is disposed between NAC setting signal 1601 (e.g., a CTS-to-self sequence or the like) and a RAT1 period. In FIG. 16, after setting the NAV 1601, the RAT1 transmissions 1621 are protected from RAT2 interference during RAT1 transmission interval 1611 and until the NAV release 1602. In some implementations, the gap 1603 may be the same or similar to the gaps discussed previously with respect to FIGS. 3-6.

In some implementations, no signals is/are transmitted during the duration of the gap 1603. Alternatively, the gap 1603 can be used, either partially or in its entirety, to transmit one or more signals. In these embodiments, the corresponding data can be encoded based on the RAT1 PHY design. The particular signal(s) that may be transmitted during the gap period 1603 may include any combination of the following example implementations.

In a first implementation, random data is/are used, which may be used to prevent the channel sensing/LBT based channel access mechanism to access the channel during the gap period 1603.

In a second implementation, (predefined) pilot symbols is/are used, which may be used to improve the estimation of the multipath propagation channel characteristics.

In a third implementation, one or more reference signals and/or synchronization signals may be transmitted during the guard period 1603. The reference signals may include, for example, cell-specific reference signals (CRS), channel state information reference signals (CSI-RS), demodulation reference signals (DMRS), and/or other reference signals defined by 3GPP/ETSI LTE and/or 5G standards. The synchronization signals (SS) may include primary SS, secondary SS, and/or Physical Broadcast Channel (PBCH) (e.g., an SS block in 5G/NR parlance).

In a fourth implementation, signalling information and/or user data is/are used. The duration of the gap 1603 may be selected from one or more of the following implementations. In one implementation, the gap period 1603 is chosen to be a positive integer multiple of the SIFS duration as defined in [IEEE80211]. Additionally or alternatively, the gap period 1603 is chosen to be a positive integer multiple of a point (coordination function) interframe space (PIFS) duration as defined in [IEEE80211]. Additionally or alternatively, the gap period 1603 is chosen to be a positive integer multiple of the distributed coordination function (DCF) interframe space (DIFS) duration as defined in [IEEE80211]. Additionally or alternatively, the gap period 1603 is chosen to be a positive integer multiple of an Arbitration Inter-Frame Spacing (AIFS) duration as defined in [IEEE80211]. Additionally or alternatively, the gap period 1603 is chosen to be a positive integer multiple of the extended interframe space (EIFS) duration as defined in [IEEE80211]. Additionally or alternatively, a positive integer multiple of a C-V2X symbol duration is used. Additionally or alternatively, any combination of the upper durations (e.g., the gap may be chosen to be SIFS+PIFS+DIFS+EIFS+AIFS, the gap may be chosen to be SIFS+PIFS PCF+DIFS DCF+ . . . , etc.). Any other suitable duration or combination of durations may be used in other embodiments. Additionally, any of the aforementioned implementations may be combined in various combinations.

1.2.8. Transmission Duration Intervals and Negotiations

The duration value in the Duration/ID field may be calculated as described in any one or more of sections 9.3.1, 9.3.2, 9.3.3., and/or 9.3.4 of [IEEE80211], and/or according to any of the techniques discussed herein. All times are calculated in microseconds. In some implementations, if a calculated duration includes a fractional microsecond, the value inserted in the Duration/ID field can be rounded up to the next higher integer. In some implementations, if a calculated duration results in a negative value, the value of the Duration/ID field is set to 0.

In various embodiments, the maximum Tx durations for the different RAT intervals may be negotiated. In some embodiments, a "crowd" agreement protocol is implemented for selecting the Tx durations of the respective intervals (e.g., RAT1 vs RAT2) depending on the locally observed market penetration level. The crowd agreement protocol may have an initial (e.g., default) resource/capacity allocation. An example of this default resource/capacity allocation may include a 50% capacity allocated to RAT1 (e.g., C-V2X) and 50% resource/capacity allocated to RAT2 (e.g., W-V2X). Some other default allocation may be used in other embodiments, such as when a third to-be-defined V2X RAT is implemented, or some other resource allocation split as defined by a network operator or the like.

When a first RAT (RAT1) requires additional resources/capacity, an "add capacity request" sequence is transmitted by one or multiple STAs that implement the first RAT. STAs implementing a second RAT (e.g., C-V2X in case that the sequence was issued by W-V2X, or vice versa) answer by transmitting ACK/NACK sequences depending on the respective observed congestion. Based on the number of received ACKs and/or NACKs, the resources/capacity allocated to RAT1 is increased by some amount. Additionally or alternatively, the resources/capacity allocated to the RAT2 may be reduced by a same or similar amount.

Additionally or alternatively, if a ratio of received ACKs to the total number of received responses (e.g., ACKs and NACKs) is above a threshold, then the resource/capacity is increased by a predefined step-size (e.g., 10% or the like) for RAT1, which originally issued the "add capacity request". This is shown by Equation 1.2.8-1, where theta (θ) is the predetermined or configured threshold, $N_{ACK}$ is the number of received ACKs, and $N_{NACK}$ is the number of received NACKs.

$$\theta \geq \frac{N_{ACK}}{N_{ACK} + N_{NACK}} \qquad \text{(Equation 1.2.8-1)}$$

1.2.9. RAT Channel Metrics and Key Performance Indicators 1.2.9.1. Packet Reception Ratio For one transmission packet with index n, the packet reception ratio (PRR) for a given communication range interval of interest is calculated as $X_n/Y_n$, where $Y_n$ is the number of Rx STAs that are located within that communication range from the Tx STA, and $X_n$ is the number of STAs with successful reception among the $Y_n$ STAs. The average PRR for said communication range interval is calculated as $(X_1+X_2+X_3+ \ldots +X_N)/(Y_1+Y_2+Y_3+ \ldots +Y_N)$ where N denotes the number of messages in simulation relevant for this average PRR measurement. To visualize the communication range of the different system configurations and features, the PRR is plotted as a profile over the distance from the Tx. In some implementations, the distance bin width can be 20 meters (m).

1.2.9.2. Data Age

Data age (DA) or information age is defined as the age of the information in the last correctly received sample of data in a receiving ITS station. Data age, $T_{age}$, is calculated according to Equation 1.2.9.2-1.

$$T_{age} = t - t_{tsLR} \pm t_{sync} \qquad \text{(Equation 1.2.9.2-1)}$$

where t the current time, $t_{tsLR}$ is the timestamp (i.e., generation time) of the last successfully received message and $t_{sync}$ is the synchronization error between the sending and receiving vehicles, where the unit is second. The DA is evaluated for transmitter-receiver pairs, whose distance is within the interval [0, 300] meters. In some implementations, a constant sampling interval of 10 ms is used to measure regularly the age of information at each receiver.

1.2.9.3. End-to-End Delay

End-to-end delay (E2E delay) measures the time from when a packet is passed to the access layer of the sending STAs until the packet is successfully received at the Rx STA. For packets that are not received, it is not measured. Apart from generally minimal processing delays on transmitter and receiver side, the E2E delay is dominated by the scheduling delay of the MAC layer (e.g., channel access delay). The E2E delay is evaluated for transmitter-receiver pairs, whose distance is within the interval [0, 300]. In some implementations, a constant sampling interval of 10 ms is used to measure regularly the age of information at each receiver.

1.2.9.4. Inter-Packet Gap

The inter-packet gap (IPG) is the time difference between the instant when a packet is correctly decoded by an Rx STA, and the instant when the previous packet had been correctly decoded by the Rx STA. The difference between IPG and DA is that IPG does not take into account the channel access delay. The IPG is evaluated for Tx-Rx pairs whose distance is within a predetermined or configured interval In some implementations, the IPG evaluation interval/range is [0, 300] meters.

1.2.9.5. RAT Channel Busy Ratio Assessment

The metric technology ratio percentage ($\text{Tech}_{percentage}$) is introduced to provide an indication of the actual percentage of users belonging to RAT1 and to RAT2, respectively, in a given geographical area at a given time. In one implementation, the $\text{Tech}_{percentage}$ is computed by RAT1 stations only, and in other implementations RAT2 stations may calculate the $\text{Tech}_{percentage}$. The $\text{Tech}_{percentage}$ may be calculated by RAT1 stations as shown by Equation 1.2.9.5-1.

$$\text{Tech}_{percentage} = \frac{CBR_{RAT1}}{CBR_{RAT1+RAT2}} \qquad (\text{Equation} 1.2.9.5\text{-}1)$$

In equation 1, $CBR_{RAT1}$ is the Channel Busy Ratio (CBR) for RAT1, and $CBR_{RAT1+RAT2}$ is the Channel Busy Ratio for RAT1 and RAT2. Here, the RAT1 stations distinguish between the messages pertaining to their technology (RAT1) from the messages pertaining to RAT2 in a given frequency channel (or vice versa). This capability is sometimes referred to as self-detection. There are two ways of assessing $CBR_{RAT1}$, as outlined in equation 2 and equation 3, respectively. The $CBR_{RAT1+RAT2}$ assessment is further described in Table 8.

The $CBR_{RAT1}$ assessment according to Equation 1.2.9.5-2 is the total number of sub-channels occupied by the data associated with correctly received PSCCH SCIs (having a CRC pass) in a given interval is normalized by the number of subframes in the same interval and the number of non-overlapping sub-channels.

$$CBR_{LTE} = \frac{\sum_{j=1}^{N_{PSCCH_{CRCPASS}}} UsedNumSubchannel_j}{numSubchannel * numSubframes_{Tech_{percentage}}} \qquad (\text{Equation} 1.2.9.5\text{-}2)$$

where $N_{PSCCH_{CRCPASS}}$ is the number of RAT1 PSCCH decoded successfully (having a CRC pass), and $UsedNumSubchannel_j$ is the number of sub-channels occupied by the data associated with the jth correctly decoded PSCCH SCI (and thus populated accordingly by the associated PSSCH data). The rational for not taking into account the PSCCH pertaining to HARQ retransmission is to avoid double counting these packets (since ITS-G5 does not do repetitions). The numSubchannel is the number of sub-channels as defined in Table B.2 of ETSI TS 103 613 V1.1.1 (2018-11) ("[TS103613]"), that is 5 sub-channels and $numSubframes_{Tech_{percentage}}$ is the integration time of the measurement, set to 100 ms.

When there are multiple LTE-V2X stations causing interferences to each other, many of their PSCCH reception may be failed. It can lead to an underestimation of the $CBR_{LTE}$. An alternative method for $CBR_{LTE}$ assessment is defined in Equation (3). Then the total number of PSCCH SCIs of which its reference signal received power (RSRP) is higher than a threshold received power in a given interval is normalized by the number of subframes in the same interval and the number of sub-channels.

$$CBR_{LTE} = \frac{N_{PSCCH_{RSRP \geq Threshold}}}{numSubchannel * numSubframes_{Tech_{percentage}}} \qquad (3)$$

In equation 3, $N_{PSCCH_{RSRP \geq Threshold}}$ is the number of RAT1 PSCCHs of which its Reference Signal Received Power (RSRP) is higher than a defined threshold received power; and the numSubchannel is the number of sub-channels as defined in Table B.2 of [TS103613] (e.g., 5 sub-channels and $numSubframes_{Tech_{percentage}}$ is the integration time of the measurement, set to 100 ms). Two options for measuring the aggregated traffic in the channel and assessing $CBR_{RAT1+RAT2}$ (data traffic originating from RAT1 as well as RAT2 stations) are outlined in Table 8.

TABLE 8

Options for the $CBR_{RAT1+RAT2}$ found in Equation 1

| Option | Description |
|---|---|
| #1 | $CBR_{RAT1+RAT2}$ is the native channel busy ratio/rate (CBR) as defined for LTE-V2X (see e.g., 3GPP TS 36.213 v16.2.0 (2020-07-14) ("[TS36213]")). NOTE: This option is an attempt to minimize deviation from LTE-V2X release 14 standard. It relies upon the existing LTE-V2X CBR measurement to capture the overall traffic in the channel. The LTE-V2X CBR is used in the resource selection procedure [TS36213] (e.g., resource selection for sidelink communications) and the CRlimit computation in ETSI TS 103 574 V1.1.1 (2018-11) ("[TS103574]"). Additionally or alternatively, the $CBR_{RAT1+RAT2}$ can be based on the CBR defined for NR-V2X (see e.g., 3GPP TS 38.214 v16.2.0 (2020-07-20)). |
| #2 | $CBR_{RAT1+RAT2}$ is defined as $CBR_{RAT1} + CBR_{RAT2}$, where $CBR_{RAT2}$ measures the occupancy of the channel originating from RAT2 (e.g., ITS-G5), specifically. In order to perform this measurement, RAT1 (e.g., C-V2X) stations detect RAT2 (e.g., ITS-G5) preambles (e.g., based on Short Training Field (STF)) and/or decode SIG field (e.g., based on Long Training field (LTF) and SIG), and distinguish RAT2 (e.g., ITS-G5) headers transmitted by RAT1 (e.g., C-V2X) stations from those transmitted by RAT2 (e.g., ITS-G5) stations. |

According to [TS103574], the CBR is a portion of sub-channels in a resource pool whose Sidelink-Received Signal Strength Indication (S-RSSI) measured by an ITS-S exceeds a (pre)configured threshold sensed over the last 100 ms; and the CRlimits are limit on the maximum channel occupancy ratio for the ITS-S. The channel occupancy ratio (CR) in [TS103574] is the fraction of the total number of sub-channels used by the ITS-S for its transmissions out of the total number of configured (granted) sub-channels over a measurement period of 1000 ms. According to [TS103574], a resource pool is a set of resources that can be used for PSCCH and PSSCH, and a sub-channel is a set of contiguous physical resource blocks (RBs).

Option #2 in Table 8 may require changes to RAT1 stations (e.g., legacy LTE-V2X stations) whereas Option #1 usually does not require any modifications. For Option #2, the following assumptions are made: The $CBR_{RAT1}$ measurement accuracy of an RAT1 station is assumed to be identical to that of a RAT2 station (e.g., assuming RAT2 (e.g., ITS-G5) headers are decoded); and/or RAT1 (e.g., LTE-V2X) stations disregard some or all RAT2 (e.g., ITS-G5) headers transmitted by RAT1 (e.g., LTE-V2X) stations (e.g., they have perfect knowledge about the RAT2 (e.g., ITS-G5) headers transmitted by other RAT1 (e.g., LTE-V2X) stations). The assumptions provide an upper bound on the achievable performance with this approach of the C-V2X CBR assessment.

2. Intelligent Transport System (ITS) Configurations and Arrangements

Figure 17:
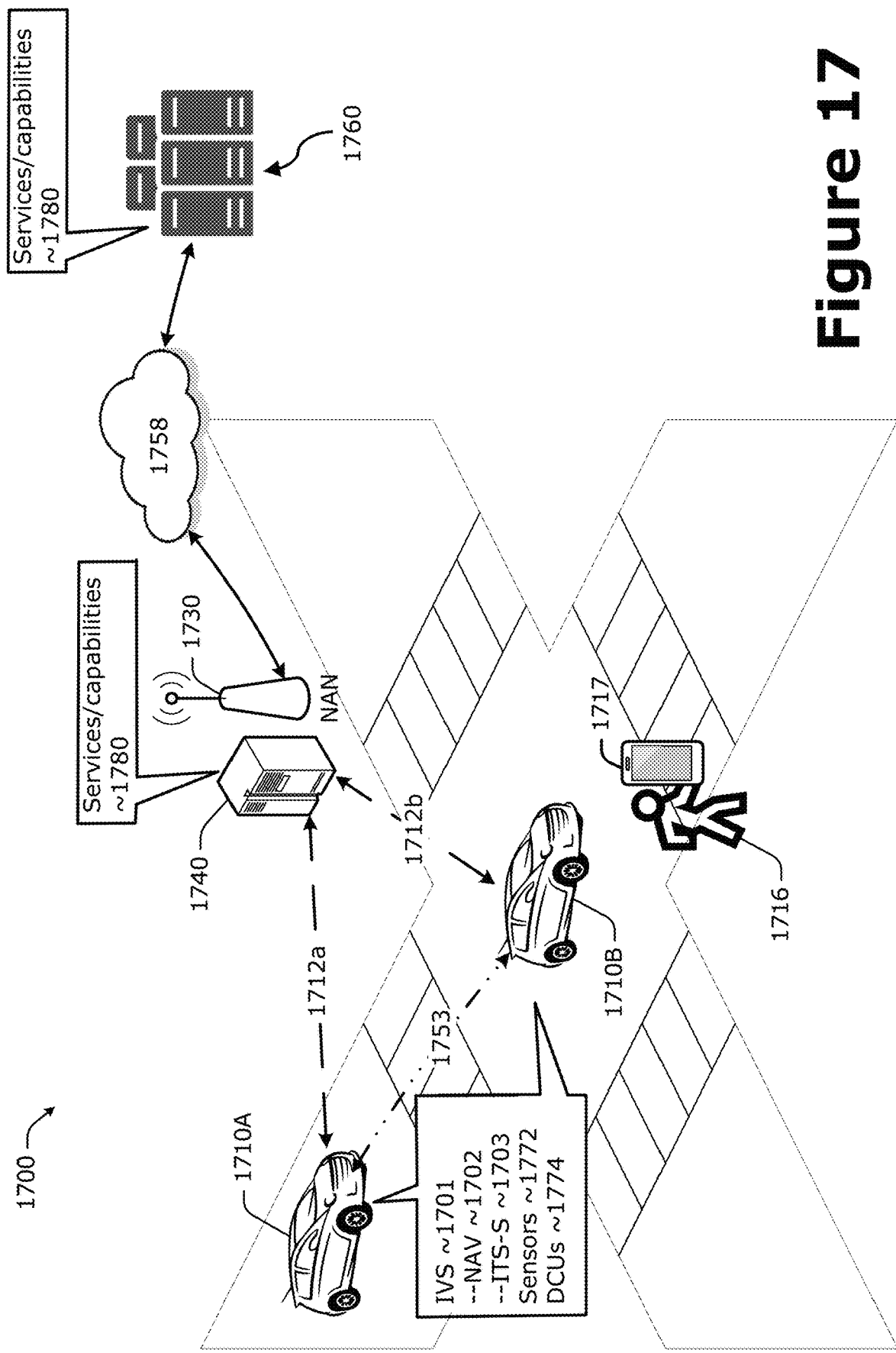
FIG. 17 illustrates an operative Intelligent Transport System arrangement.

FIG. 17 illustrates an overview of a V2X/ITS environment 1700, which includes vehicles 1710A and 1710B (collectively "vehicle 1710"). Rapidly growing cities are under pressure to address safety of road users, congestion, environmental issues, and resulting economic impacts. Road traffic crashes result in the deaths of approximately 1.35 million people around the world each year and leave between 20 and 50 million people with non-fatal injuries (World Health Organization, Road Traffic Injuries, 2019.). More than half of all road traffic deaths and injuries involve vulnerable road users (VRU) 1716, such as pedestrians, cyclists, and motorcyclists.

The operation and control of vehicles 1710 is becoming more autonomous over time, and most vehicles will likely become fully autonomous in the future. Vehicles 1710 that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

ITS comprises advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band. Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. Recent efforts are being made to increase traffic safety and efficiency for VRUs 1716, which refers to both physical entities (e.g., pedestrians) and/or user devices 1717 (e.g., mobile stations, etc.) used by physical entities. Regulation (EU) No 168/2013 of the European Parliament and of the Council of 15 Jan. 2013 on the approval and market surveillance of two- or three-wheel vehicles and quadricycles ("EU regulation 168/2013") provides various examples of VRUs 1716. CA/AD vehicles 1710 are expected to reduce VRU-related injuries and fatalities by eliminating or reducing human-error in operating vehicles. However, to date CA/AD vehicles 1710 can do very little about detection, let alone correction of the human-error at VRUs' 1716 end, even though it is equipped with a sophisticated sensing technology suite, as well as computing and mapping technologies.

The environment 1700 in FIG. 17 includes vehicles 1710A and 1710B (collectively "vehicle 1710"). Each vehicle 1710 includes an engine, transmission, axles, wheels and so forth (not shown). The vehicles 1710 may be any type of motorized vehicles used for transportation of people or goods, each of which are equipped with an engine, transmission, axles, wheels, as well as control systems used for driving, parking, passenger comfort and/or safety, etc. The terms "motor", "motorized", etc. refer to devices that convert one form of energy into mechanical energy, and include internal combustion engines (ICE), compression combustion engines (CCE), electric motors, and hybrids (e.g., including an ICE/CCE and electric motor(s)). The plurality of vehicles 1710 shown by FIG. 17 may represent motor vehicles of varying makes, models, trim, etc. For illustrative purposes, the following description is provided for deployment scenarios including vehicles 1710 in a 2D freeway/highway/roadway environment wherein the vehicles 1710 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 1710 are implemented as flying objects, such as aircraft, drones, UAVs, and/or to any other like motorized devices.

Each of the vehicles 1710 include an in-vehicle systems (IVS) 1701, one or more sensors 1772, and one or more driving control units (DCUs) 1774. The IVS 1701 includes a number of vehicle computing hardware subsystems and/or applications including, for example, various hardware and software elements to implement navigation circuitry 1702 and an ITS-S 1703. Additionally, some or all of the vehicles 1710 may be computer-assisted or autonomous driving (CA/AD) vehicles, which may include artificial intelligence (AI) and/or robotics to assist vehicle operation. The CA/AD vehicles 1710 may be any one of a number of in-vehicle systems and CA/AD vehicles, from computer-assisted to partially or fully autonomous vehicles. Additionally or alternatively, the vehicles 1710 could include additional or alternative types of computing devices/systems such as smartphones, tablets, wearables, laptops, laptop computer, Upgradeable Vehicular Compute Systems (UVCS), in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the functionality discussed herein. Vehicles 1710 including a computing system (e.g., IVS 1701) as well as the vehicles referenced throughout the present disclosure, may be referred to as vehicle user equipment (vUE) 1710, vehicle stations 1710, vehicle ITS stations (V-ITS-S) 1710, CA/AD vehicles 1710, and/or the like. Additionally, the IVS 1701 and CA/AD vehicle 1710 may include other components/subsystems not shown by FIG. 17 such as the elements shown and described throughout the present disclosure.

The subsystems/applications of the IVS 1701 may also include instrument cluster subsystems, front-seat and/or back-seat infotainment subsystems and/or other like media subsystems, a navigation subsystem (NAV) 1702, a vehicle status subsystem/application, a HUD subsystem, an EMA subsystem, and so forth. The NAV 1702 may be configurable or operable to provide navigation guidance or control, depending on whether vehicle 1710 is a computer-assisted vehicle, partially or fully autonomous driving vehicle. NAV 1702 may be configured with computer vision to recognize stationary or moving objects (e.g., a pedestrian, another vehicle, or some other moving object) in an area surrounding vehicle 1710, as it travels enroute to its destination. The NAV 1702 may be configurable or operable to recognize stationary or moving objects in the area surrounding vehicle 1710, and in response, make its decision in guiding or controlling DCUs of vehicle 1710, based at least in part on sensor data collected by sensors 1772

The ITS-S 1703 employs one or more V2X RATs, which allow the vehicles 1710 to communicate directly with one another and with infrastructure equipment (e.g., network access node (NAN) 1730). The V2X RATs may refer to 3GPP cellular V2X RAT (e.g., LTE, 5G/NR, and beyond), a W-V2X RAT (e.g., DSRC in the USA or ITS-G5 in the EU), and/or some other RAT such as those discussed herein. Some or all of the vehicles 1710 may include positioning circuitry to (coarsely) determine their respective geolocations and communicate their current position with the NAN 1730 in a secure and reliable manner. This allows the vehicles 1710 to synchronize with one another and/or the NAN 1730.

The ITS-S 1703 (or the underlying V2X RAT circuitry on which the ITS-S 1703 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

In addition to the functionality discussed herein, the ITS-S 1703 (or the underlying V2X RAT circuitry on which the ITS-S 1703 operates) is capable of measuring various signals or determining/identifying various signal/channel characteristics. Signal measurement may be performed for cell selection, handover, network attachment, testing, and/or other purposes. The measurements/characteristics collected by the ITS-S 1703 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 1730 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019-09), 3GPP TS 38.215 v16.1.0 (2020-04), IEEE 802.11, Part 11: "Wireless LAN Medium Access Control (MAC) and Physical Layer (PHY) specifications, IEEE Std.", and/or the like. The same or similar measurements may be measured or collected by the NAN 1730.

The DCUs 1774 include hardware elements that control various systems of the vehicles 1710, such as the operation of the engine, the transmission, steering, braking, etc. DCUs 1774 are embedded systems or other like computer devices that control a corresponding system of a vehicle 1710. The DCUs 1774 may each have the same or similar components as devices/systems of FIG. 3274 discussed infra, or may be some other suitable microcontroller or other like processor device, memory device(s), communications interfaces, and the like. Individual DCUs 1774 are capable of communicating with one or more sensors 1772 and actuators (e.g., actuators 3274 of FIG. 32).

The sensors 1772 are hardware elements configurable or operable to detect an environment surrounding the vehicles 1710 and/or changes in the environment. The sensors 1772 are configurable or operable to provide various sensor data to the DCUs 1774 and/or one or more AI agents to enable the DCUs 1774 and/or one or more AI agents to control respective control systems of the vehicles 1710. Some or all of the sensors 1772 may be the same or similar as the sensor circuitry 3272 of FIG. 32. In particular, the IVS 1701 may include or implement a facilities layer and operate one or more facilities within the facilities layer.

The sensors 1772 include(s) devices, modules, and/or subsystems whose purpose is to detect events or changes in its environment and send the information (sensor data) about the detected events to some other a device, module, subsystem, etc. Examples of such sensors 1772 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like. Additionally or alternatively, some of the sensors 1772 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; wheel speed sensors; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 1772 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 1772 of the host vehicle may include engine sensor data collected by various engine sensors (e.g., engine temperature, oil pressure, and so forth).

IVS 1701, on its own or in response to user interactions, communicates or interacts with one or more vehicles 1710 via interface 1753, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, etc.). Other technologies could be used, such as Bluetooth/Bluetooth Low Energy (BLE) or the like. The vehicles 1710 may exchange ITS protocol data units (PDUs) or other messages (e.g., VAMs, CPMs, etc.) with one another over the interface 1753.

IVS 1701, on its own or in response to user interactions, communicates or interacts with one or more remote/cloud servers 1760 via NAN 1730 over interface 1712 and over network 1758. The NAN 1730 is arranged to provide network connectivity to the vehicles 1710 via respective interfaces 1712 between the NAN 1730 and the individual vehicles 1710. The NAN 1730 is, or includes, an ITS-S, and may be a roadside ITS-S(R-ITS-S). The NAN 1730 is a network element that is part of an access network that provides network connectivity to the end-user devices (e.g., V-ITS-Ss 1710 and/or VRU ITS-Ss 1717). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vB-BUP), and/or the like. The CRAN, CR, or vBBUP may implement a RAN function split, wherein one or more communication protocol layers are operated by the CRAN/CR/vBBUP and other communication protocol entities are operated by individual RAN nodes 1730. This virtualized framework allows the freed-up processor cores of the NAN 1730 to perform other virtualized applications, such as virtualized applications for the VRU 1716/V-ITS-S 1710.

Environment 1700 also includes VRU 1716, which includes a VRU ITS-S 1717. The VRU 1716 is a non-motorized road users as well as L class of vehicles (e.g., mopeds, motorcycles, Segways, etc.), as defined in Annex I of Regulation (EU) No 168/2013 of the European Parliament and of the Council of 15 Jan. 2013 on the approval and market surveillance of two- or three-wheel vehicles and quadricycles ("EU regulation 168/2013") (see e.g., International Organization for Standardization (ISO) "Road vehicles—Vehicle dynamics and road-holding ability—Vocabulary", ISO, TC 22, SC 33, Ed. 2 (2011-12) ("[ISO-8855: 2011]")). SAE International, "Taxonomy and Classification of Powered Micromobility Vehicles", Powered Micromobility Vehicles Committee, SAE Ground Vehicle Standard J3194 (20 Nov. 2019) ("[SAE-J3194]") also proposes a taxonomy and classification of powered micro-mobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board.); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

A VRU 1716 is an actor that interacts with a VRU system 1717 in a given use case and behaviour scenario. For example, if the VRU 1716 is equipped with a personal device, then the VRU 1716 can directly interact via the personal device with other ITS-Stations and/or other VRUs 1716 having VRU devices 1717. The VRU ITS-S 1717 could be either pedestrian-type VRU or vehicle-type (on bicycle, motorbike) VRU. The term "VRU ITS-S" refers to any type of VRU device or VRU system. Before the potential VRU 1716 can even be identified as a VRU 1716, it may be referred to as a non-VRU and considered to be in IDLE state or inactive state in the ITS.

In general, there are four types of VRU equipment 1717 including non-equipped VRUs (e.g., a VRU 1716 not having a device); VRU-Tx (e.g., a VRU 1716 equipped with an ITS-S 1717 having only a transmission (Tx) but no reception (Rx) capabilities that broadcasts awareness messages or beacons about the VRU 1716); VRU-Rx (e.g., a VRU 1716 equipped with an ITS-S 1717 having only an Rx (but no Tx) capabilities that receives broadcasted awareness messages or beacons about the other VRUs 1716 or other non-VRU ITS-Ss); and VRU-St (e.g., a VRU 1716 equipped with an ITS-S 1717 that includes the VRU-Tx and VRU-Rx functionality). The use cases and behaviour scenarios consider a wide set of configurations of VRU systems 1717 based on the equipment of the VRU 1716 and the presence or absence of V-ITS-S 1710 and/or R-ITS-S 1730 with a VRU application. Examples of the various VRU system configurations are shown by table 2 of ETSI TR 103 300-1 v2.1.1 (2019-09) ("[TR103300-1]").

If the VRU 1716 is not equipped with a device, then the VRU 1716 interacts indirectly, as the VRU 1716 is detected by another ITS-Station in the VRU system 1717 via its sensing devices such as sensors and/or other components. However, such VRUs 1716 cannot detect other VRUs 1716 (e.g., a bicycle). In ETSI TS 103 300-2 V0.3.0 (2019-12) ("[TS103300-2]"), the different types of VRUs 1716 have been categorized into the following four profiles: VRU Profile-1 (pedestrians including pavement users, children, pram, disabled persons, elderly, etc.); VRU Profile-2 (bicyclists including light vehicles carrying persons, wheelchair users, horses carrying riders, skaters, e-scooters, Segways, etc.), VRU Profile-3 (motorcyclists including motorbikes, powered two wheelers, mopeds, etc.), and VRU Profile-4 (animals posing safety risk to other road users such as dogs, wild animals, and livestock (e.g., horses, cows, sheep, etc.)). These profiles further define the VRU functional system and communications architectures for VRU ITS-S 1717. Additionally, VRU device types may include VRU-Tx (VRU device 1717 is equipped with transmitter only and can broadcast beacon messages about the VRU 1716), VRU-Rx (VRU device 1717 is equipped with a receiver only and application to receive message from other ITS-Ss and capable of warning/notifying the VRU 1716), and VRU-St (VRU device 1717 contains and ITS-S including both VRU-Tx and VRU-Rx capabilities).

A VRU 1716 can be equipped with a portable device (e.g., device 1717). The term "VRU" may be used to refer to both a VRU 1716 and its VRU device 1717 unless the context dictates otherwise. The VRU device 1717 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 1717) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, etc.) or an IoT device (e.g., traffic control devices) used by a VRU 1716 integrating ITS-S technology, and as such, the VRU ITS-S 1717 may include or refer to a "VRU device," "VRU equipment," and/or "VRU system".

The VRU systems 1717 are Cooperative Intelligent Transport Systems (C-ITS) that comprise at least one VRU 1716 and one ITS-Station with a VRU application. The ITS-S can be a V-ITS-S 1710 or an R-ITS-S 1713 that is processing the VRU application logic based on the services provided by the lower communication layers (Facilities, Networking & Transport and Access layer (see e.g., ETSI EN 302 665 V1.1.1 (2010-09) ("[EN302665]")), related hardware components, other in-station services and sensor sub-systems. A VRU system may be extended with other VRUs 1716, other ITS-S and other road users involved in a scenario such as vehicles, motorcycles, bikes, and pedestrians. VRUs 1716 may be equipped with ITS-S or with different technologies (e.g., IoT) that enable them to send or receive alerts. The VRU system 1717 considered is thus a heterogeneous system. A definition of a VRU system is used to identify the system components that actively participate in a use case and behaviour scenario. The active system components are equipped with ITS-Stations, while all other components are passive and form part of the environment of the VRU system.

The VRU ITS-S 1717 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

The message specified for VRUs 1716/1717 is the VRU awareness message (VAM). VAMs are messages transmitted from VRU ITSs 1717 to create and maintain awareness of VRUs 1716 participating in the VRU/ITS system. VAMs are harmonized in the largest extent with the existing Cooperative Awareness Messages (CAM). The transmission of the VAM is limited to the VRU profiles specified in clause 6.1 of [TS103300-2] The VAMs contain all required data depending on the VRU profile and the actual environmental conditions. The VRU system 1717 supports the flexible and dynamic triggering of messages with generation intervals from X milliseconds (ms) at the most frequent, where X is a number (e.g., X=100 ms).

A VAM contains status and attribute information of the originating VRU ITS-S 1717. The content may vary depending on the profile of the VRU ITS-S 1717. A typical status information includes time, position, motion state, cluster status, and others. Typical attribute information includes data about the VRU profile, type, dimensions, and others. The generation, transmission and reception of VAMs are managed by a VRU basic service (VBS). The VBS is a facilities layer entity that operates the VAM protocol. The VBS provides the following services: handling the VRU role, sending and receiving of VAMs to enhance VRU safety. The VBS also specifies and/or manages VRU clustering in presence of high VRU 1716/1717 density to reduce VAM communication overhead. In VRU clustering, closely located VRUs with coherent speed and heading form a facility layer VRU cluster and only cluster head VRU 1716/1717 transmits the VAM. Other VRUs 1716/1717 in the cluster skip VAM transmission. Active VRUs 1716/1717 (e.g., VRUs 1716/1717 not in a VRU cluster) send individual VAMs (called single VRU VAM or the like). An "individual VAM" is a VAM including information about an individual VRU 1716/1717. A VAM without a qualification can be a cluster VAM or an individual VAM.

The RATs employed by the NAN 1730, the V-ITS-Ss 1710, and the VRU ITS-S 1717 may include one or more V2X RATs, which allow the V-ITS-Ss 1710 to communicate directly with one another, with infrastructure equipment (e.g., NAN 1730), and with VRU devices 1717. In the example of FIG. 17, any number of V2X RATs may be used for V2X communication. In some implementations, at least two distinct V2X RATs may be used including W-V2X RAT based on IEEE V2X technologies (e.g., DSRC for the U.S. and ITS-G5 for Europe) and 3GPP C-V2X RAT (e.g., LTE V2X, 5G-NR V2X, and beyond). In one example, the C-V2X RAT may utilize an air interface 1712a and the W-V2X RAT may utilize an air interface 1712b.

The W-V2X RATs include, for example, IEEE 1609.0-2019, "IEEE Guide for Wireless Access in Vehicular Environments (WAVE) Architecture" (2019 Apr. 10) ("[IEEE16090]"), IEEE 1609.4-2016/Cor 1-2019, "IEEE Standard for Wireless Access in Vehicular Environments (WAVE)—Multi-Channel Operation—Corrigendum 1: Miscellaneous Corrections" (2019 Oct. 17) ("[IEEE16094]"), SAE Intl, "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) ("[EN302663]") and describes the access layer of the ITS-S reference architecture. The ITS-G5 access layer comprises IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]") (which now incorporates IEEE 802.11p), IEEE/ISO/IEC 8802-2-1998, "ISO/IEC/IEEE International Standard for Information technology—Telecommunications and information exchange between systems—Local and metropolitan area networks—Specific requirements—Part 2: Logical Link Control" (7 May 1998) ("[IEEE8022]"), and/or IEEE 802.11bd protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

In V2X scenarios, a V-ITS-Ss 1710 or a NAN 1730 may be or act as a RSU or R-ITS-S 1730, which refers to any transportation infrastructure entity used for V2X communications. In this example, the RSU 1730 may be a stationary RSU, such as an gNB/eNB-type RSU or other like infrastructure, or relatively stationary UE. Additionally or alternatively, the RSU 1730 may be a mobile RSU or a UE-type RSU, which may be implemented by a vehicle (e.g., V-ITS-Ss 1710), pedestrian, or some other device with such capabilities. In these cases, mobility issues can be managed in order to ensure a proper radio coverage of the translation entities. Additionally or alternatively, RSU 1730 may be a road embedded reflector, a smart street or traffic light, a road side tag, smart signage, or other like traffic control device/element.

The NAN 1730 or an edge compute node 1740 may provide one or more services/capabilities 1780. In an example implementation, RSU 1730 is a computing device coupled with radio frequency circuitry located on a roadside that provides connectivity support to passing V-ITS-Ss 1710. The RSU 1730 may also include internal data storage circuitry to store intersection map geometry, traffic statistics, media, as well as applications/software to sense and control ongoing vehicular and pedestrian traffic. The RSU 1730 provides various services/capabilities 1780 such as, for example, very low latency communications required for high speed events, such as crash avoidance, traffic warnings, and the like. Additionally or alternatively, the RSU 1730 may provide other services/capabilities 1780 such as, for example, cellular/WLAN communications services. In some implementations, the components of the RSU 1730 may be packaged in a weatherproof enclosure suitable for outdoor installation, and may include a network interface controller to provide a wired connection (e.g., Ethernet) to a traffic signal controller and/or a backhaul network. Further, RSU 1730 may include wired or wireless interfaces to communicate with other RSUs 1730 (not shown by FIG. 17)

In arrangement 1700, V-ITS-S 1710a may be equipped with a first V2X RAT communication system (e.g., C-V2X) whereas V-ITS-S 1710b may be equipped with a second V2X RAT communication system (e.g., W-V2X which may be DSRC, ITS-G5, or the like). Additionally or alternatively, the V-ITS-S 1710a and/or V-ITS-S 1710b may each be employed with one or more V2X RAT communication systems. The RSU 1730 may provide V2X RAT translation services among one or more services/capabilities 1780 so that individual V-ITS-Ss 1710 may communicate with one another even when the V-ITS-Ss 1710 implement different V2X RATs. The RSU 1730 (or edge compute node 1740) may provide communication services among the one or more services/capabilities 1780 wherein the R-ITS-S 1730 shares CPMs, MCMs, VAMs DENMs, CAMs, etc., with V-ITS-Ss 1710 and/or VRUs for VRU safety purposes. The V-ITS-Ss 1710 may also share such messages with each other, with RSU 1730, and/or with VRUs. These messages may include the various data elements and/or data fields as discussed herein. Additionally or alternatively, the R-ITS-S 1730 may provide edge LBO related services as discussed herein.

In this example, the NAN 1730 may be a stationary RSU, such as an gNB/eNB-type RSU or other like infrastructure. Additionally or alternatively, the NAN 1730 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 1730 that enables the connections 1712 may be referred to as a "RAN node" or the like. The RAN node 1730 may comprise ground stations (e.g., terrestrial access points) or satellite stations providing coverage within a geographic area (e.g., a cell). The RAN node 1730 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1730 is embodied as a NodeB, evolved NodeB (eNB), or a next generation NodeB (gNB), one or more relay nodes, distributed units, or Road Side Unites (RSUs). Any other type of NANs can be used. Additionally, the RAN node 1730 can fulfil various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc.

The network 1758 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 1758 and/or access technologies may include cellular technology such as LTE, MuLTEfire, and/or NR/5G (e.g., as provided by Radio Access Network (RAN) node 1730), WLAN (e.g., WiFi®) technologies (e.g., as provided by an access point (AP) 1730), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The remote/cloud servers 1760 may represent one or more application servers, a cloud computing architecture/platform that provides cloud computing services, and/or some other remote infrastructure. The remote/cloud servers 1760 may include any one of a number of services and capabilities 1780 such as, for example, ITS-related applications and services, driving assistance (e.g., mapping/navigation), content provision (e.g., multi-media infotainment streaming), and/or the like.

Additionally, the NAN 1730 is co-located with an edge compute node 1740 (or a collection of edge compute nodes 1740), which may provide any number of services/capabilities 1780 to vehicles 1710 such as ITS services/applications, driving assistance, and/or content provision services 1780. The edge compute node 1740 may include or be part of an edge network or "edge cloud." The edge compute node 1740 may also be referred to as an "edge host 1740," "edge server 1740," or "compute platforms 1740." The edge compute nodes 1740 may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 1740 may be implemented in a data center or cloud installation; a designated edge node server, an enterprise server, a roadside server, a telecom central office; or a local or peer at-the-edge device being served consuming edge services. The edge compute node 1740 may provide any number of driving assistance and/or content provision services 1780 to vehicles 1710. The edge compute node 1740 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 1740 and/or edge computing network/cloud are discussed infra. Additionally or alternatively, the edge compute node 1740 may provide the edge LBO related services as discussed herein.

3. Example ITS-Station Configurations and Arrangements

Figure 18:
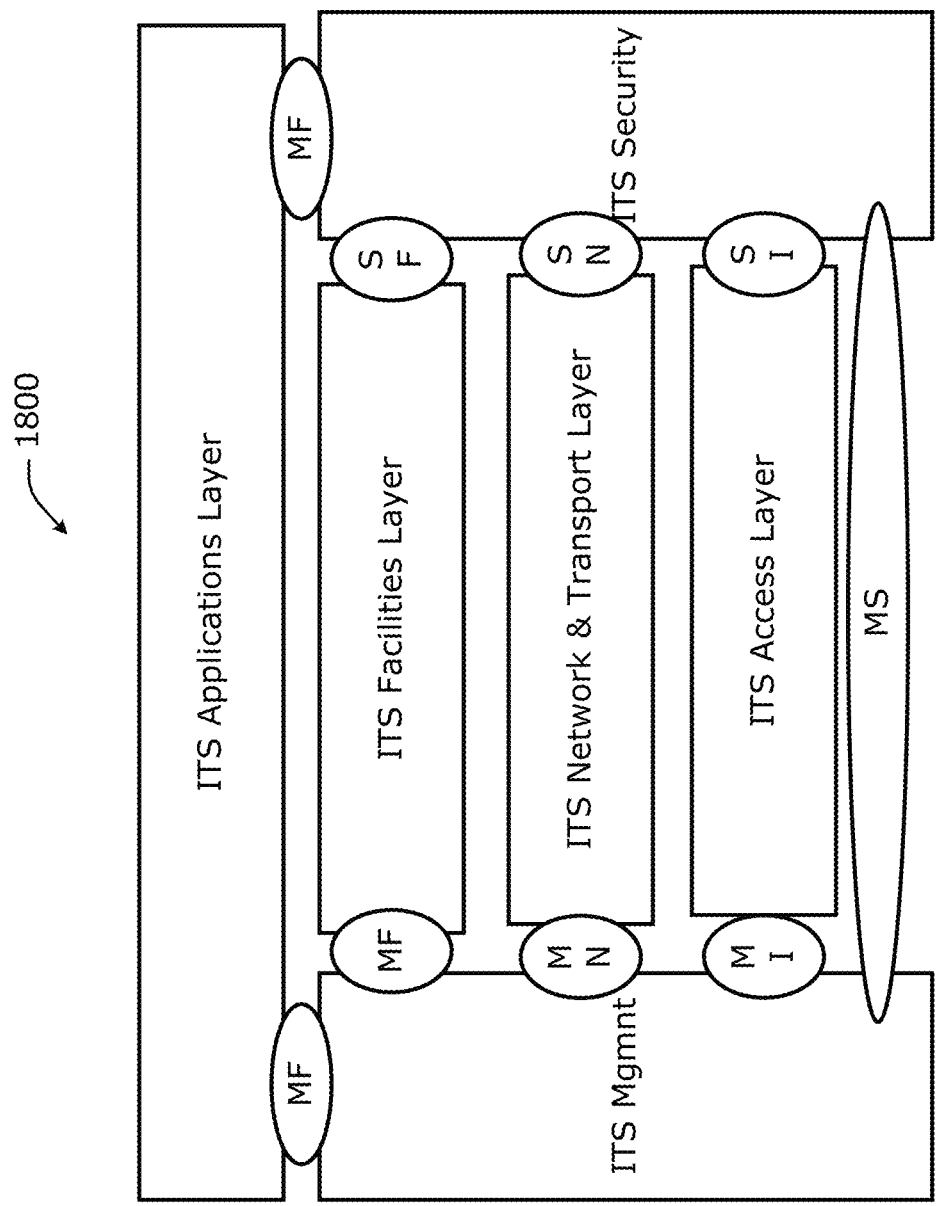
FIG. 18 shows an example ITS-S reference architecture.

FIG. 18 depicts an example ITS-S reference architecture 1800 according to various embodiments. In ITS-based implementations, some or all of the components depicted by FIG. 18 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer provides ITS services, and ITS applications are defined within the application layer. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009-06) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S provides ITS applications to vehicle drivers and/or passengers, and may require an interface for accessing in-vehicle data from the in-vehicle network or in-vehicle system. For deployment and performances needs, specific instances of a V-ITS-S may contain groupings of Applications and/or Facilities.

The facilities layer comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VRUBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013-08) ("[TS102894-1]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer is connected to an in-vehicle network via an in-vehicle data gateway as shown and described in [TS102894-1]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, etc.). The station type/capabilities facility may store sensor capabilities of various connected/coupled sensors and sensor data obtained from such sensors.

The Position and Time management entity (PoTi) manages the position and time information for use by ITS applications, facility, network, management, and security layers. For this purpose, the PoTi gets information from sub-system entities such as GNSS, sensors and other sub-system of the ITS-S. The PoTi ensures ITS time synchronicity between ITS-Ss in an ITS constellation, maintains the data quality (e.g., by monitoring time deviation), and manages updates of the position (e.g., kinematic and attitude state) and time. A ITS constellation is a group of ITS-S's that are exchanging ITS data among themselves. The PoTi entity may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi may use augmentation services to improve the position and time accuracy. Various augmentation methods may be applied. PoTi may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi should also maintain information on the confidence of the kinematic and attitude state variables.

The N&T layer provides functionality of the OSI network layer and the OSI transport layer and includes one or more networking protocols, one or more transport protocols, and network and transport layer management. Additionally, aspects of sensor interfaces and communication interfaces may be part of the N&T and access layers. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include W-V2X and 3GPP C-V2X. Additionally or alternatively, other access layer technologies (V2X RATs) may be used in various other embodiments.

Figure 19:
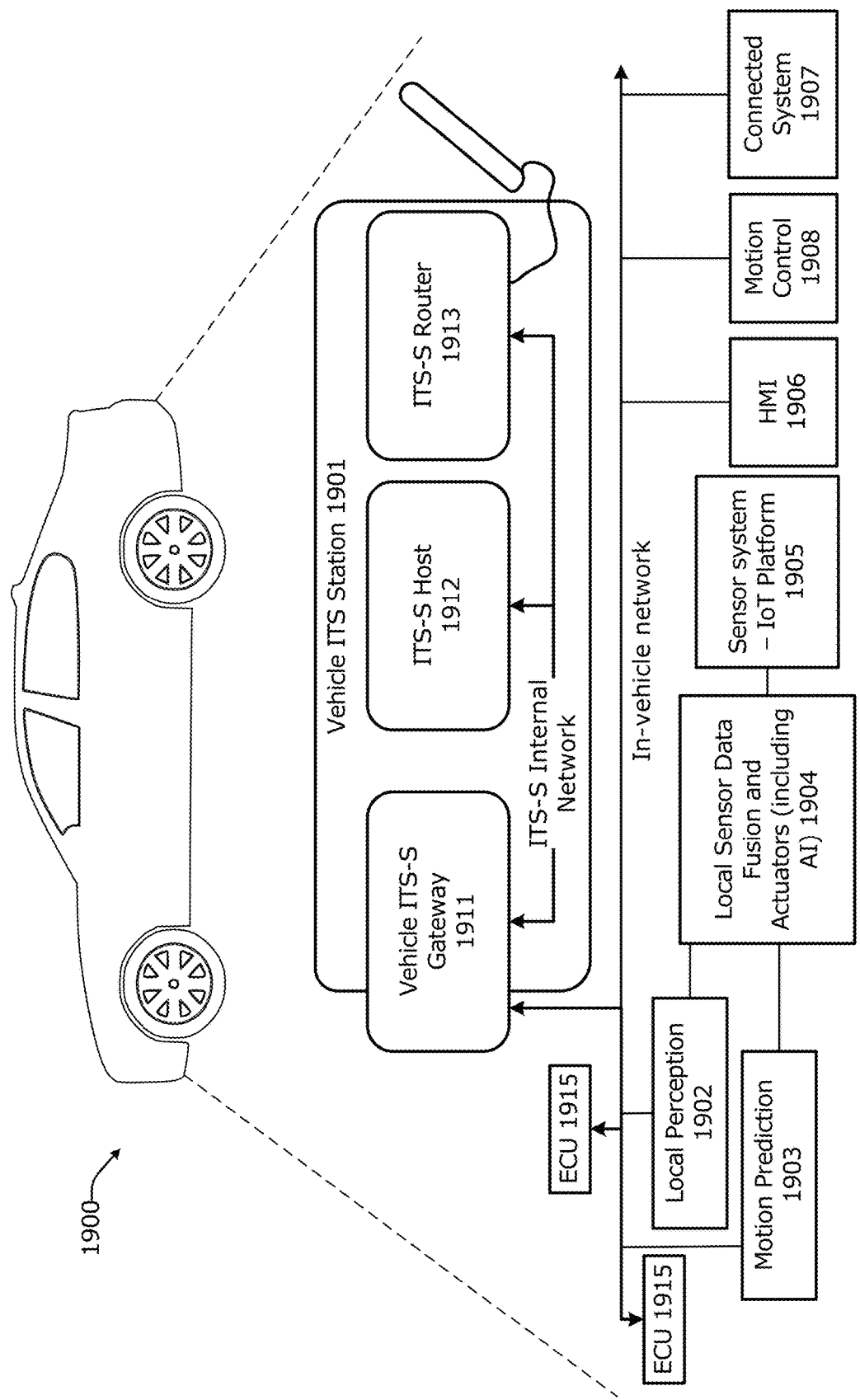
FIG. 19 depicts a vehicle ITS station (V-ITS-S) in a vehicle system.
Figure 21:
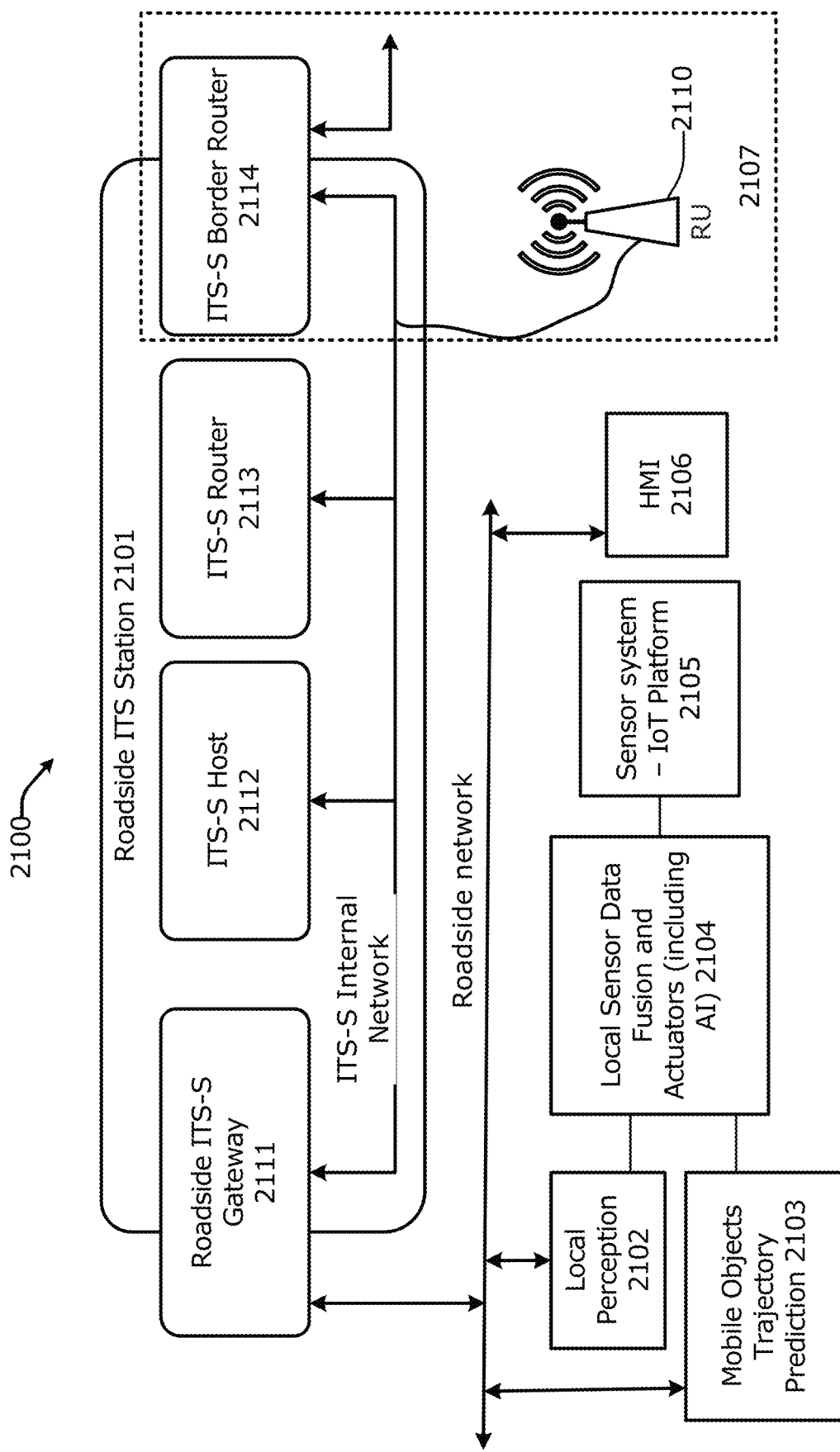
FIG. 21 depicts a roadside ITS-S in a roadside infrastructure node.

The ITS-S reference architecture 1800 may be applicable to the elements of FIGS. 19 and 21. The ITS-S gateway 1911, 2111 (see e.g., FIGS. 19 and 21) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 1911, 2111 (see e.g., FIGS. 19 and 21) is capable of converting protocols. This allows an ITS-S to communicate with external elements of the system in which it is implemented. The ITS-S router 1911, 2111 provides the functionality the ITS-S reference architecture 1800 excluding the Applications and Facilities layers. The ITS-S router 1911, 2111 interconnects two different ITS protocol stacks at layer 3. The ITS-S router 1911, 2111 may be capable to convert protocols. One of these protocol stacks typically is connected to the ITS station-internal network. The ITS-S border router 2114 (see e.g., FIG. 21) provides the same functionality as the ITS-S router 1911, 2111, but includes a protocol stack related to an external network that may not follow the management and security principles of ITS (e.g., the ITS Mgmnt and ITS Security layers in FIG. 18).

Additionally, other entities that operate at the same level but are not included in the ITS-S include the relevant users at that level, the relevant HMI (e.g., audio devices, display/touchscreen devices, etc.); when the ITS-S is a vehicle, vehicle motion control for automated vehicles (both HMI and vehicle motion control entities may be triggered by the ITS-S applications); a local device sensor system and IoT Platform that collects and shares IoT data; local device sensor fusion and actuator application(s), which may contain AI and aggregates the data flow issued by the sensor system; local perception and trajectory prediction applications that consume the output of the fusion application and feed the ITS-S applications; and the relevant ITS-S. The sensor system can include one or more cameras, radars, lidars, etc., in a V-ITS-S or RSE. In the central station, the sensor system includes sensors that may be located on the side of the road, but directly report their data to the central station, without the involvement of a V-ITS-S or a R-ITS-S. In some cases, the sensor system may additionally include gyroscope(s), accelerometer(s), and the like (see e.g., sensor circuitry 3272 of FIG. 32).

FIG. 19 depicts an example vehicle computing system 1900. In this example, the vehicle computing system 1900 includes a V-ITS-S 1901 and Electronic Control Units (ECUs) 1915. The V-ITS-S 1901 includes a V-ITS-S gateway 1911, an ITS-S host 1912, and an ITS-S router 1913. The vehicle ITS-S gateway 1911 provides functionality to connect the components at the in-vehicle network (e.g., ECUs 1915) to the ITS station-internal network. The interface to the in-vehicle components (e.g., ECUs 1915) may be the same or similar as those discussed herein (see e.g., IX 3256 of FIG. 32) and/or may be a proprietary interface/interconnect. Access to components (e.g., ECUs 1915) may be implementation specific. The ECUs 1915 may be the same or similar to the driving control units (DCUs) 1774 discussed previously with respect to FIG. 17. The ITS station connects to ITS ad hoc networks via the ITS-S router 1913.

Figure 20:
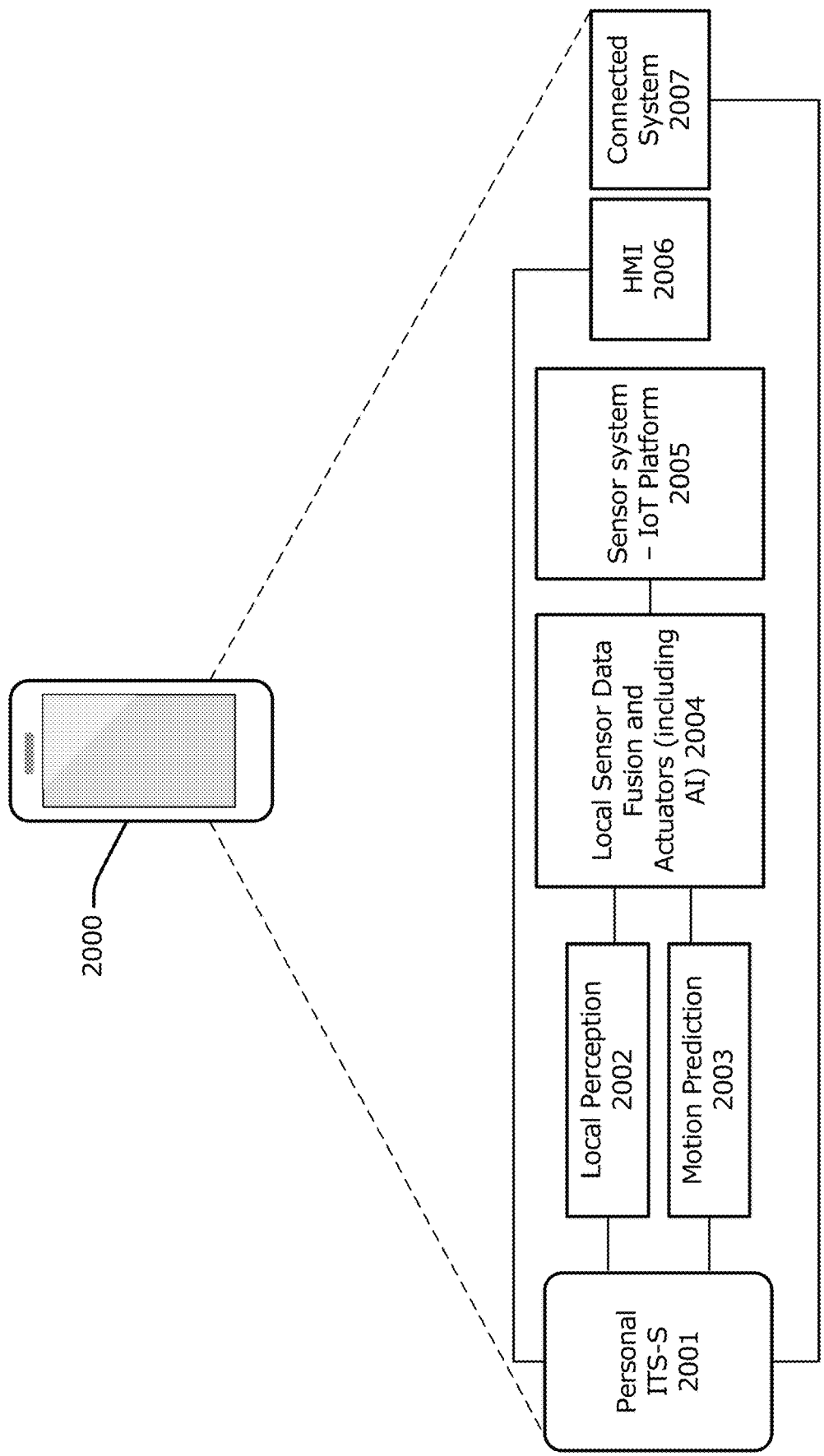
FIG. 20 depicts a personal ITS station (P-ITS-S), which may be used as a VRU ITS-S.

FIG. 20 depicts an example personal computing system 2000. The personal ITS sub-system 2000 provides the application and communication functionality of ITSC in mobile devices, such as smartphones, tablet computers, wearable devices, PDAs, portable media players, laptops, and/or other mobile devices. The personal ITS sub-system 2000 contains a personal ITS station (P-ITS-S) 2001 and various other entities not included in the P-ITS-S 2001, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 2000 may be used as a VRU ITS-S 1717.

FIG. 21 depicts an example roadside infrastructure system 2100. In this example, the roadside infrastructure system 2100 includes an R-ITS-S 2101, output device(s) 2105, sensor(s) 2108, and one or more radio units (RUs) 2110. The R-ITS-S 2101 includes a R-ITS-S gateway 2111, an ITS-S host 2112, an ITS-S router 2113, and an ITS-S border router 2114. The ITS station connects to ITS ad hoc networks and/or ITS access networks via the ITS-S router 2113. The R-ITS-S gateway 1911 provides functionality to connect the components of the roadside system (e.g., output devices 2105 and sensors 2108) at the roadside network to the ITS station-internal network. The interface to the in-vehicle components (e.g., ECUs 1915) may be the same or similar as those discussed herein (see e.g., IX 3256 of FIG. 32) and/or may be a proprietary interface/interconnect. Access to components (e.g., ECUs 1915) may be implementation specific.

Figure 32:
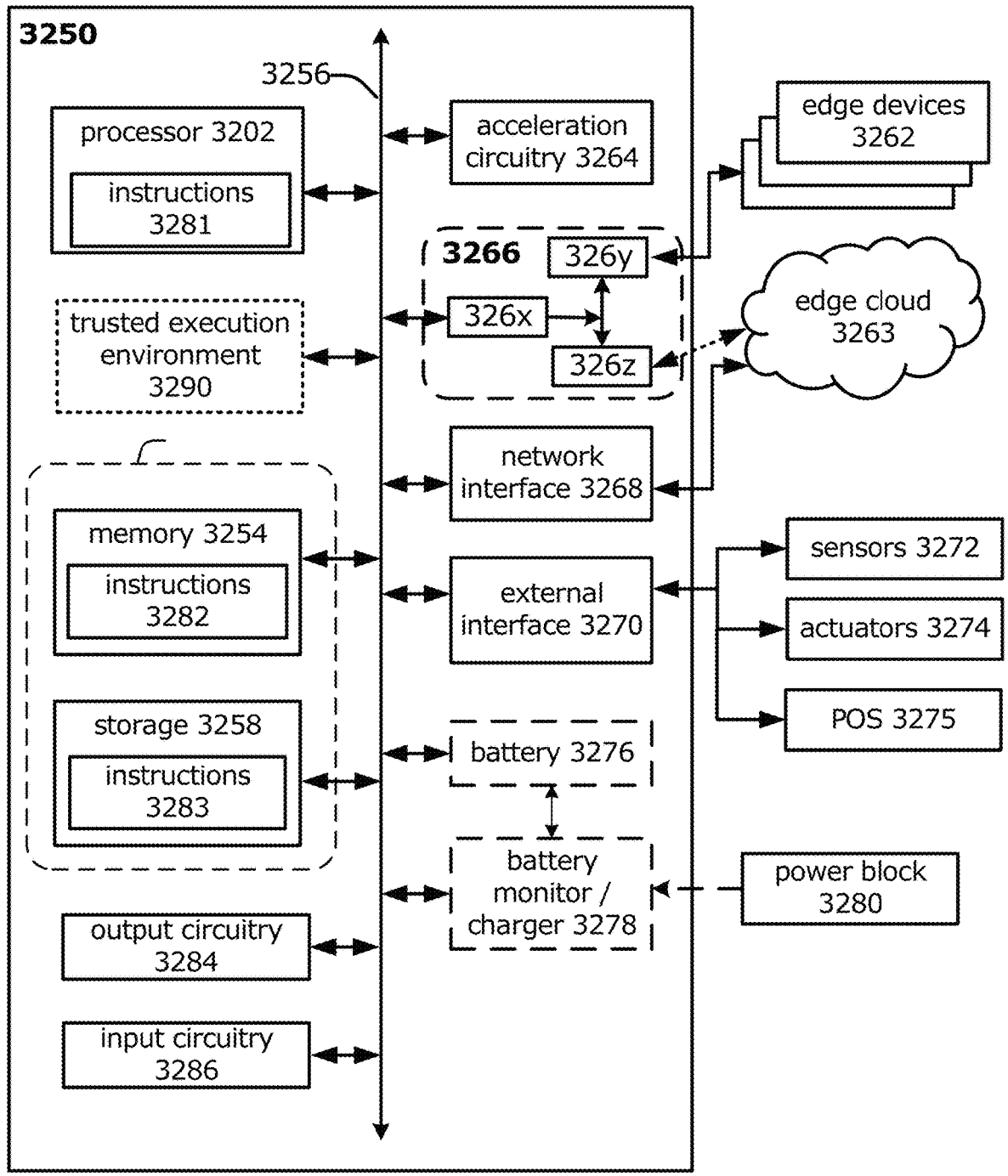

The sensor(s) 2108 may be inductive loops and/or sensors that are the same or similar to the sensors 1772 discussed infra with respect to FIG. 17 and/or sensor circuitry 3272 discussed with respect to FIG. 32

The actuators 2113 are devices that are responsible for moving and controlling a mechanism or system. The actuators 2113 are used to change the operational state (e.g., on/off, zoom or focus, etc.), position, and/or orientation of the sensors 2108. The actuators 2113 are used to change the operational state of some other roadside equipment, such as gates, traffic lights, digital signage or variable message signs (VMS), etc. The actuators 2113 are configured to receive control signals from the R-ITS-S 2101 via the roadside network, and convert the signal energy (or some other energy) into an electrical and/or mechanical motion. The control signals may be relatively low energy electric voltage or current. The actuators 2113 comprise electromechanical relays and/or solid state relays, which are configured to switch electronic devices on/off and/or control motors, and/or may be that same or similar or actuators 3274 discussed infra with respect to FIG. 32.

Each of FIGS. 19, 20, and 21 also show entities which operate at the same level but are not included in the ITS-S including the relevant HMI 1906, 2006, and 2106; vehicle motion control 1908 (only at the vehicle level); local device sensor system and IoT Platform 1905, 2005, and 2105; local device sensor fusion and actuator application 1904, 2004, and 2104; local perception and trajectory prediction applications 1902, 2002, and 2102; motion prediction 1903 and 2003, or mobile objects trajectory prediction 2103 (at the RSU level); and connected system 1907, 2007, and 2107.

The local device sensor system and IoT Platform 1905, 2005, and 2105 collects and shares IoT data. The VRU sensor system and IoT Platform 2005 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, etc.). An IoT platform, which can be distributed over the system elements, may contribute to provide additional information related to the environment surrounding the VRU system 2000. The sensor system can include one or more cameras, radars, LiDARs, and/or other sensors (see e.g., 3222 of FIG. 32), in a V-ITS-S 1710 or R-ITS-S 1730. In the VRU device 1717/2000, the sensor system may include gyroscope(s), accelerometer(s), and the like (see e.g., 3222 of FIG. 32). In a central station (not shown), the sensor system includes sensors that may be located on the side of the road, but directly report their data to the central station, without the involvement of a V-ITS-S 1710 or an R-ITS-S 1730.

The (local) sensor data fusion function and/or actuator applications 1904, 2004, and 2104 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Sensor data fusion usually relies on the consistency of its inputs and then to their timestamping, which correspond to a common given time, the sensor data fusion and/or ML/AL techniques may be used to determine occupancy values for an occupancy (cost) map as discussed herein.

Various ML/AI techniques can be used to carry out sensor data fusion and/or may be used for other purposes discussed herein. Where the apps 1904, 2004, and 2104 are (or include) AI/ML functions, the apps 1904, 2004, and 2104 may include AI/ML models that have the ability to learn useful information from input data (e.g., context information, etc.) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, etc.). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm A local perception function (which may or may not include trajectory prediction application(s)) 1902, 2002, and 2102 is provided by the local processing of information collected by local sensor(s) associated to the system element. The local perception (and trajectory prediction) function 1902, 2002, and 2102 consumes the output of the sensor data fusion application/function 1904, 2004, and 2104 and feeds ITS-S applications with the perception data (and/or trajectory predictions). The local perception (and trajectory prediction) function 1902, 2002, and 2102 detects and characterize objects (static and mobile) which are likely to cross the trajectory of the considered moving objects. The infrastructure, and particularly the road infrastructure 2100, may offer services relevant to the VRU support service. The infrastructure may have its own sensors detecting VRUs 1716/1717 evolutions and then computing a risk of collision if also detecting local vehicles' evolutions, either directly via its own sensors or remotely via a cooperative perception supporting services such as the CPS. Additionally, road marking (e.g., zebra areas or crosswalks) and vertical signs may be considered to increase the confidence level associated with the VRU detection and mobility since VRUs 1716/1717 usually have to respect these marking/signs.

The motion dynamic prediction function 1903 and 2003, and the mobile objects trajectory prediction 2103 (at the RSU level), are related to the behaviour prediction of the considered moving objects. The motion dynamic prediction function 1903 and 2003 predict the trajectory of the vehicle 1710 and the VRU 1716, respectively. The motion dynamic prediction function 1903 may be part of the VRU Trajectory and Behavioral Modeling module and trajectory interception module of the V-ITS-S 1710. The motion dynamic prediction function 2003 may be part of the dead reckoning module and/or the movement detection module of the VRU ITS-S 1717. Alternatively, the motion dynamic prediction functions 1903 and 2003 may provide motion/movement predictions to the aforementioned modules. Additionally or alternatively, the mobile objects trajectory prediction 2103 predict respective trajectories of corresponding vehicles 1710 and VRUs 1716, which may be used to assist the VRU ITS-S 1717 in performing dead reckoning and/or assist the V-ITS-S 1710 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 1716/1717 are moving, they still have a large amount of possible motion dynamics in terms of possible trajectories and velocities. This means that motion dynamic prediction 1903, 2003, 2103 is used to identify which motion dynamic will be selected by the VRU 1716 as quickly as possible, and if this selected motion dynamic is subject to a risk of collision with another VRU or a vehicle.

The motion dynamic prediction functions 1903, 2003, 2103 analyze the evolution of mobile objects and the potential trajectories that may meet at a given time to determine a risk of collision between them. The motion dynamic prediction works on the output of cooperative perception considering the current trajectories of considered device (e.g., VRU device 1717) for the computation of the path prediction; the current velocities and their past evolutions for the considered mobiles for the computation of the velocity evolution prediction; and the reliability level which can be associated to these variables. The output of this function is provided to the risk analysis function (see e.g., FIG. 18).

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 1717) navigation system, which provides assistance to the user (e.g., VRU 1716) to select the best trajectory for reaching its planned destination. With the development of Mobility as a Service (MaaS), multimodal itinerary computation may also indicate to the VRU 1716 dangerous areas and then assist to the motion dynamic prediction at the level of the multimodal itinerary provided by the system. In another example, the knowledge of the user (e.g., VRU 1716) habits and behaviours may be additionally or alternatively used to improve the consistency and the reliability of the motion predictions. Some users (e.g., VRUs 1716/1717) follow the same itineraries, using similar motion dynamics, for example when going to the main Point of Interest (POI), which is related to their main activities (e.g., going to school, going to work, doing some shopping, going to the nearest public transport station from their home, going to sport center, etc.). The device (e.g., VRU device 1717) or a remote service center may learn and memorize these habits. In another example, the indication by the user (e.g., VRU 1716) itself of its selected trajectory in particular when changing it (e.g., using a right turn or left turn signal similar to vehicles when indicating a change of direction).

The vehicle motion control 1908 may be included for computer-assisted and/or automated vehicles 1710. Both the HMI entity 1906 and vehicle motion control entity 1908 may be triggered by one or more ITS-S applications. The vehicle motion control entity 1908 may be a function under the responsibility of a human driver or of the vehicle if it is able to drive in automated mode.

The Human Machine Interface (HMI) 1906, 2006, and 2106, when present, enables the configuration of initial data (parameters) in the management entities (e.g., VRU profile management) and in other functions (e.g., VBS management). The HMI 1906, 2006, and 2106 enables communication of external events related to the VBS to the device owner (user), including the alerting about an immediate risk of collision (TTC<2 s) detected by at least one element of the system and signalling a risk of collision (e.g., TTC>2 seconds) being detected by at least one element of the system. For a VRU system 1717 (e.g., personal computing system 2000), similar to a vehicle driver, the HMI provides the information to the VRU 1716, considering its profile (e.g., for a blind person, the information is presented with a clear sound level using accessibility capabilities of the particular platform of the personal computing system 2000). In various implementations, the HMI 1906, 2006, and 2106 may be part of the alerting system.

The connected systems 1907, 2007, and 2107 refer to components/devices used to connect a system with one or more other systems. As examples, the connected systems 1907, 2007, and 2107 may include communication circuitry and/or radio units. The VRU system 2000 may be a connected system made of up to 4 different levels of equipment. The VRU system 2000 may also be an information system which collects, in real time, information resulting from events, processes the collected information and stores them together with processed results. At each level of the VRU system 2000, the information collection, processing and storage is related to the functional and data distribution scenario which is implemented.

4. Edge Computing Systems, Arrangements, and Configurations

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 22:
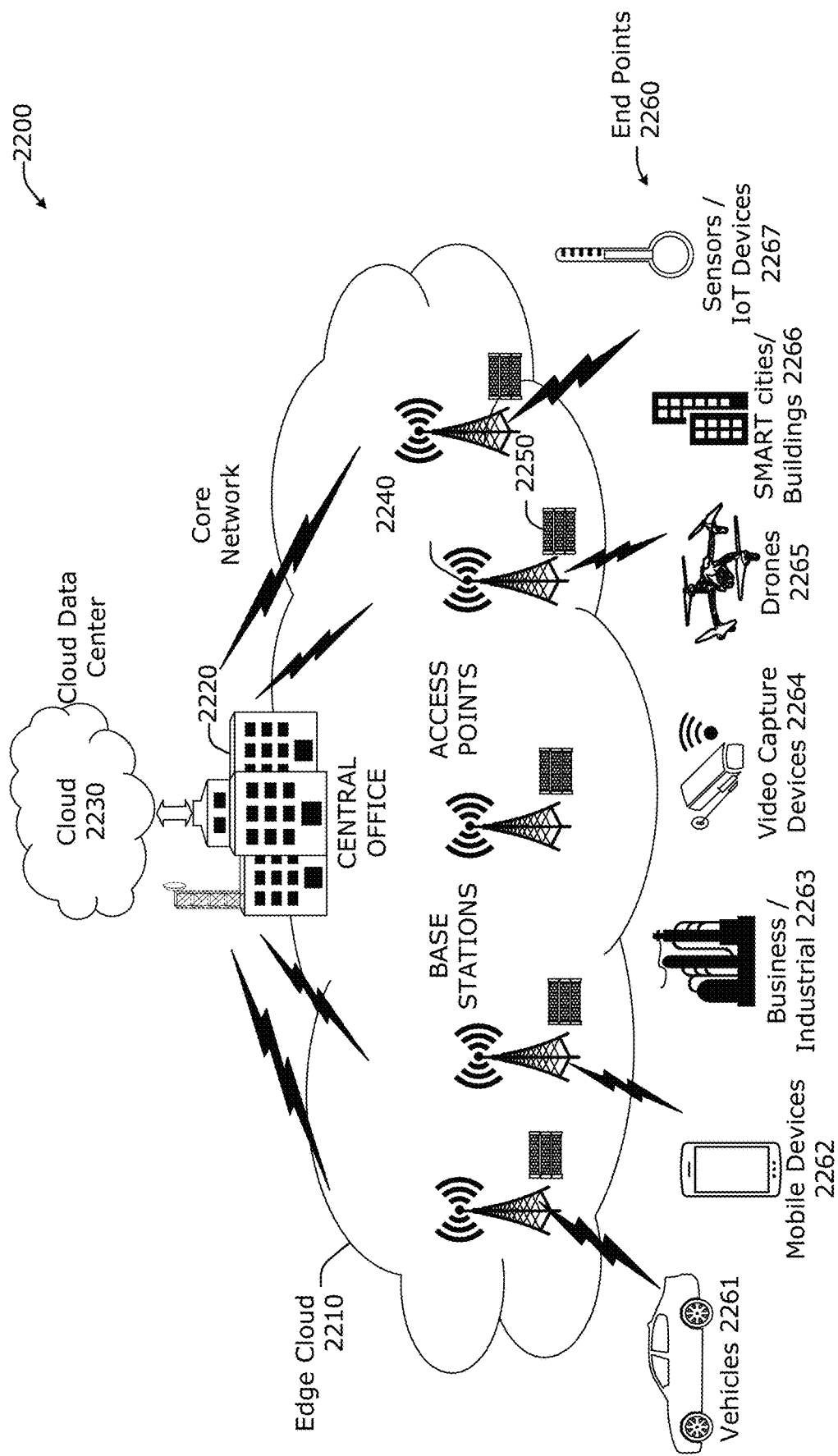
FIG. 22 illustrates an overview of an edge cloud configuration for edge computing.

FIG. 22 is a block diagram 2200 showing an overview of a configuration for edge computing, which includes a layer of processing referred to in many of the following examples as an "edge cloud". As shown, the edge cloud 2210 is co-located at an edge location, such as an access point or base station 2240, a local processing hub 2250, or a central office 2220, and thus may include multiple entities, devices, and equipment instances. The edge cloud 2210 is located much closer to the endpoint (consumer and producer) data sources 2260 (e.g., autonomous vehicles 2261, user equipment 2262, business and industrial equipment 2263, video capture devices 2264, drones 2265, smart cities and building devices 2266, sensors and IoT devices 2267, etc.) than the cloud data center 2230. Compute, memory, and storage resources which are offered at the edges in the edge cloud 2210 are critical to providing ultra-low latency response times for services and functions used by the endpoint data sources 2260 as well as reduce network backhaul traffic from the edge cloud 2210 toward cloud data center 2230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 23:
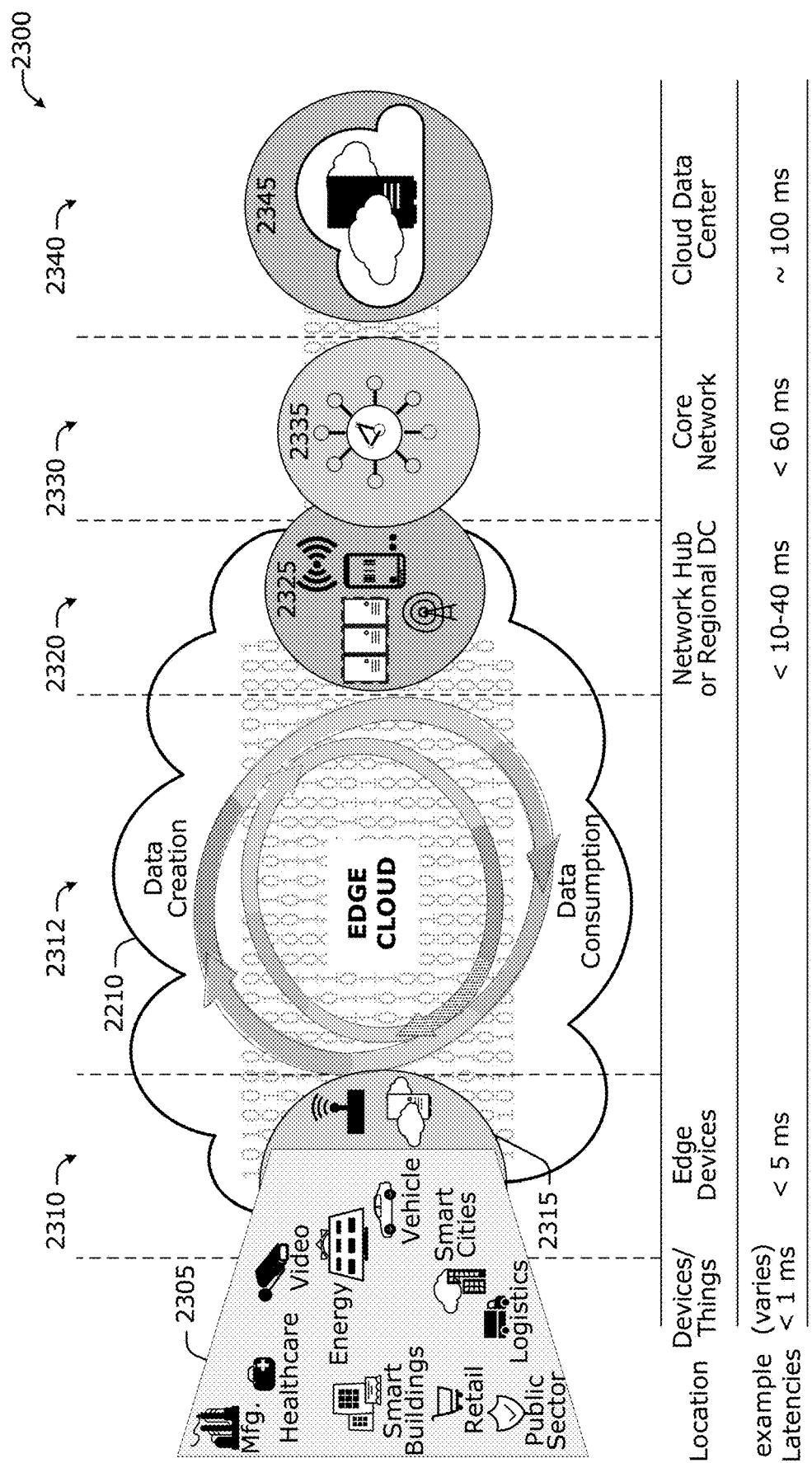
FIG. 23 illustrates operational layers among endpoints, an edge cloud, and cloud computing environments.

FIG. 23 illustrates operational layers among endpoints, an edge cloud, and cloud computing environments. Specifically, FIG. 23 depicts examples of computational use cases 2305, utilizing the edge cloud 2210 among multiple illustrative layers of network computing. The layers begin at an endpoint (devices and things) layer 2300, which accesses the edge cloud 2210 to conduct data creation, analysis, and data consumption activities. The edge cloud 2210 may span multiple network layers, such as an edge devices layer 2310 having gateways, on-premise servers, or network equipment (nodes 2315) located in physically proximate edge systems; a network access layer 2320, encompassing base stations, radio processing units, network hubs, regional data centers (DC), or local network equipment (equipment 2325); and any equipment, devices, or nodes located therebetween (in layer 2312, not illustrated in detail). The network communications within the edge cloud 2210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 2300, under 5 ms at the edge devices layer 2310, to even between 10 to 40 ms when communicating with nodes at the network access layer 2320. Beyond the edge cloud 2210 are core network 2330 and cloud data center 2340 layers, each with increasing latency (e.g., between 50-60 ms at the core network layer 2330, to 100 or more ms at the cloud data center layer). As a result, operations at a core network data center 2335 or a cloud data center 2345, with latencies of at least 50 to 100 ms or more, will not be able to accomplish many time-critical functions of the use cases 2305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 2335 or a cloud data center 2345, a central office or content data network may be considered as being located within a "near edge" layer ("near" to the cloud, having high latency values when communicating with the devices and endpoints of the use cases 2305), whereas an access point, base station, on-premise server, or network gateway may be considered as located within a "far edge" layer ("far" from the cloud, having low latency values when communicating with the devices and endpoints of the use cases 2305). It will be understood that other categorizations of a particular network layer as constituting a "close", "local", "near", "middle", or "far" edge may be based on latency, distance, number of network hops, or other measurable characteristics, as measured from a source in any of the network layers 2300-2340.

The various use cases 2305 may access resources under usage pressure from incoming streams, due to multiple services utilizing the edge cloud. To achieve results with low latency, the services executed within the edge cloud 2210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 2210 may provide the ability to serve and respond to multiple applications of the use cases 2305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 2210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 2210 (network layers 2300-2340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 2210.

As such, the edge cloud 2210 is formed from network components and functional features operated by and within edge gateway nodes, edge aggregation nodes, or other edge compute nodes among network layers 2310-2330. The edge cloud 2210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 2210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 2210 may be servers, multi-tenant servers, appliance computing devices, and/or any other type of computing devices. For example, the edge cloud 2210 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 32. The edge cloud 2210 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 24:
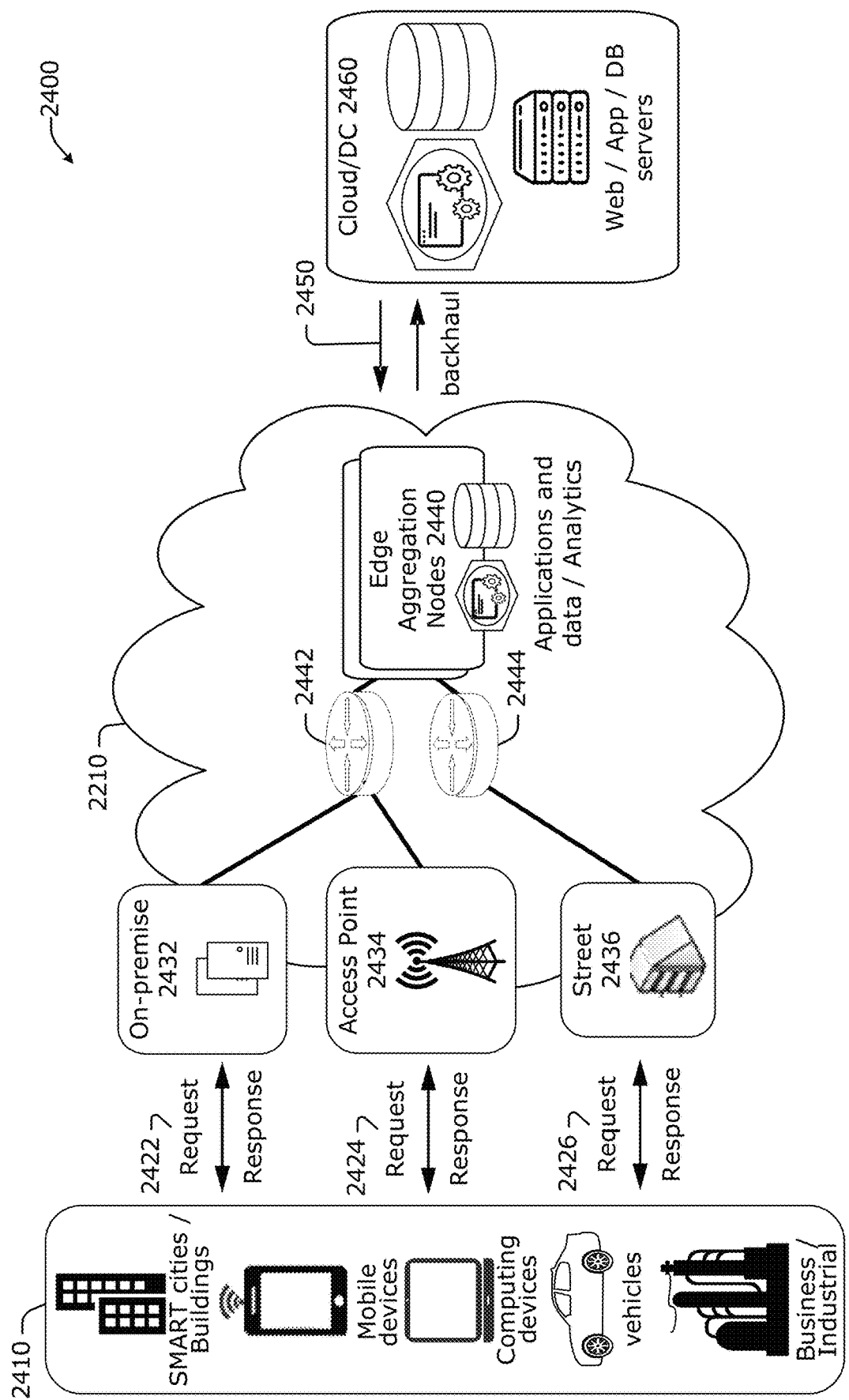
FIG. 24 illustrates an example approach for networking and services in an edge computing system.

In FIG. 24, various client endpoints 2410 (in the form of mobile devices, computers, autonomous vehicles, business computing equipment, industrial processing equipment) exchange requests and responses that are specific to the type of endpoint network aggregation. For instance, client endpoints 2410 may obtain network access via a wired broadband network, by exchanging requests and responses 2422 through an on-premise network system 2432. Some client endpoints 2410, such as mobile computing devices, may obtain network access via a wireless broadband network, by exchanging requests and responses 2424 through an access point (e.g., cellular network tower) 2434. Some client endpoints 2410, such as autonomous vehicles may obtain network access for requests and responses 2426 via a wireless vehicular network through a street-located network system 2436. However, regardless of the type of network access, the TSP may deploy aggregation points 2442, 2444 within the edge cloud 2210 to aggregate traffic and requests. Thus, within the edge cloud 2210, the TSP may deploy various compute and storage resources, such as at edge aggregation nodes 2440, to provide requested content. The edge aggregation nodes 2440 and other systems of the edge cloud 2210 are connected to a cloud or data center 2460, which uses a backhaul network 2450 to fulfill higher-latency requests from a cloud/data center for websites, applications, database servers, etc. Additional or consolidated instances of the edge aggregation nodes 2440 and the aggregation points 2442, 2444, including those deployed on a single server framework, may also be present within the edge cloud 2210 or other areas of the TSP infrastructure.

Figure 25:
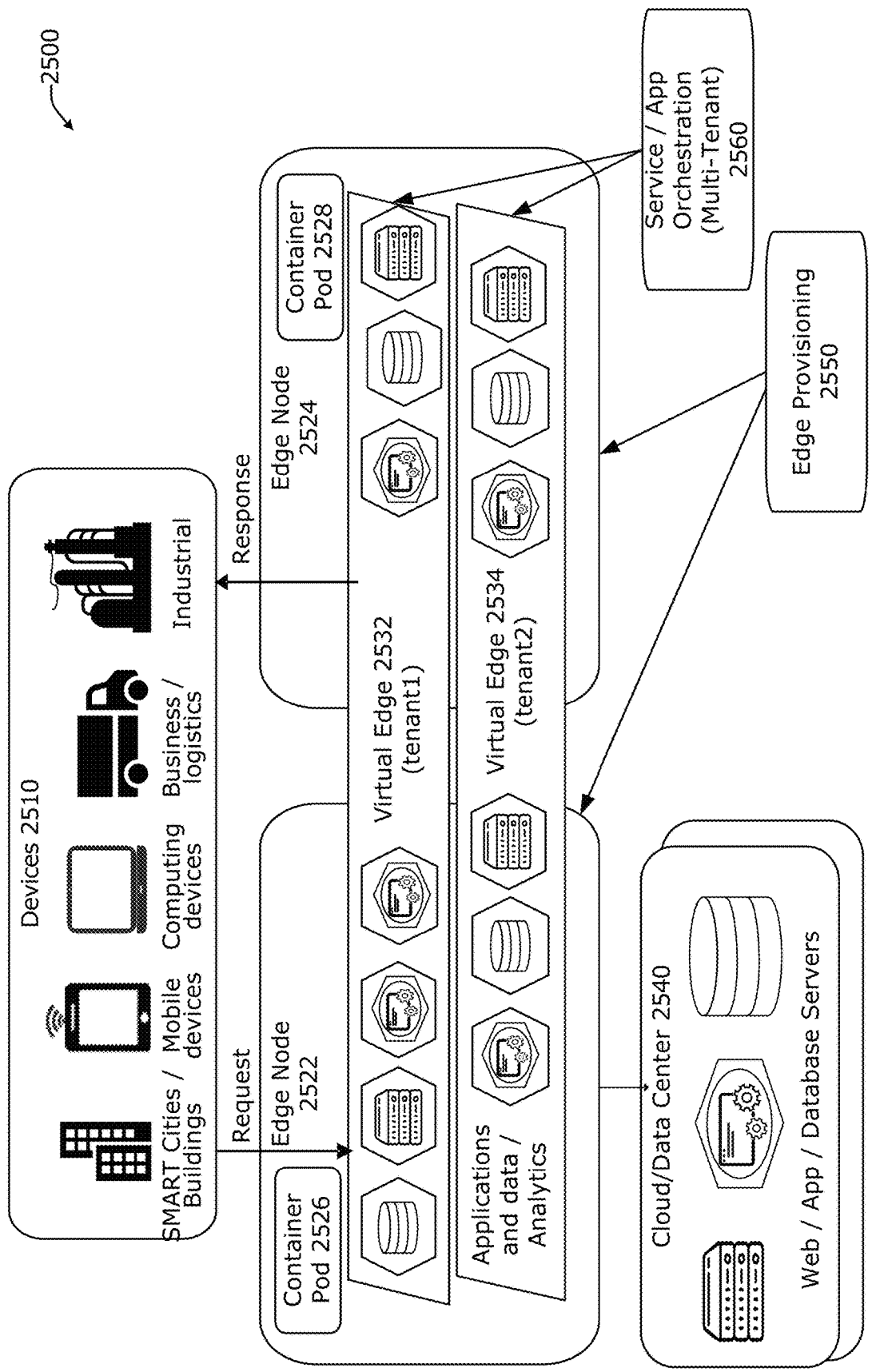
FIG. 25 illustrates deployment of a virtual edge configuration in an edge computing system operated among multiple edge nodes and multiple tenants.

FIG. 25 illustrates deployment and orchestration for virtualized and container-based edge configurations across an edge computing system operated among multiple edge nodes and multiple tenants (e.g., users, providers) which use such edge nodes. Specifically, FIG. 25 depicts coordination of a first edge node 2522 and a second edge node 2524 in an edge computing system 2500, to fulfill requests and responses for various client endpoints 2510 (e.g., smart cities/building systems, mobile devices, computing devices, business/logistics systems, industrial systems, etc.), which access various virtual edge instances. Here, the virtual edge instances 2532, 2534 provide edge compute capabilities and processing in an edge cloud, with access to a cloud/data center 2540 for higher-latency requests for websites, applications, database servers, etc. However, the edge cloud enables coordination of processing among multiple edge nodes for multiple tenants or entities.

In FIG. 25, these virtual edge instances include: a first virtual edge 2532, offered to a first tenant (Tenant 1), which offers a first combination of edge storage, computing, and services; and a second virtual edge 2534, offering a second combination of edge storage, computing, and services. The virtual edge instances 2532, 2534 are distributed among the edge nodes 2522, 2524, and may include scenarios in which a request and response are fulfilled from the same or different edge nodes. The configuration of the edge nodes 2522, 2524 to operate in a distributed yet coordinated fashion occurs based on edge provisioning functions 2550. The functionality of the edge nodes 2522, 2524 to provide coordinated operation for applications and services, among multiple tenants, occurs based on orchestration functions 2560.

Some of the devices in 2510 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 2522, 2524 may operate as security feature enforcement points for local resources allocated to multiple tenants per node. Additionally, tenant runtime and application execution (e.g., in instances 2532, 2534) may serve as an enforcement point for a security feature that creates a virtual edge abstraction of resources spanning potentially multiple physical hosting platforms. Finally, the orchestration functions 2560 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 2510, 2522, and 2540 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 25. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 2522, 2524 may implement the use of containers, such as with the use of a container "pod" 2526, 2528 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 2532, 2534 are partitioned according to the needs of each container.

With the use of container pods, a pod controller oversees the partitioning and allocation of containers and resources. The pod controller receives instructions from an orchestrator (e.g., orchestrator 2560) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 2560 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 26:
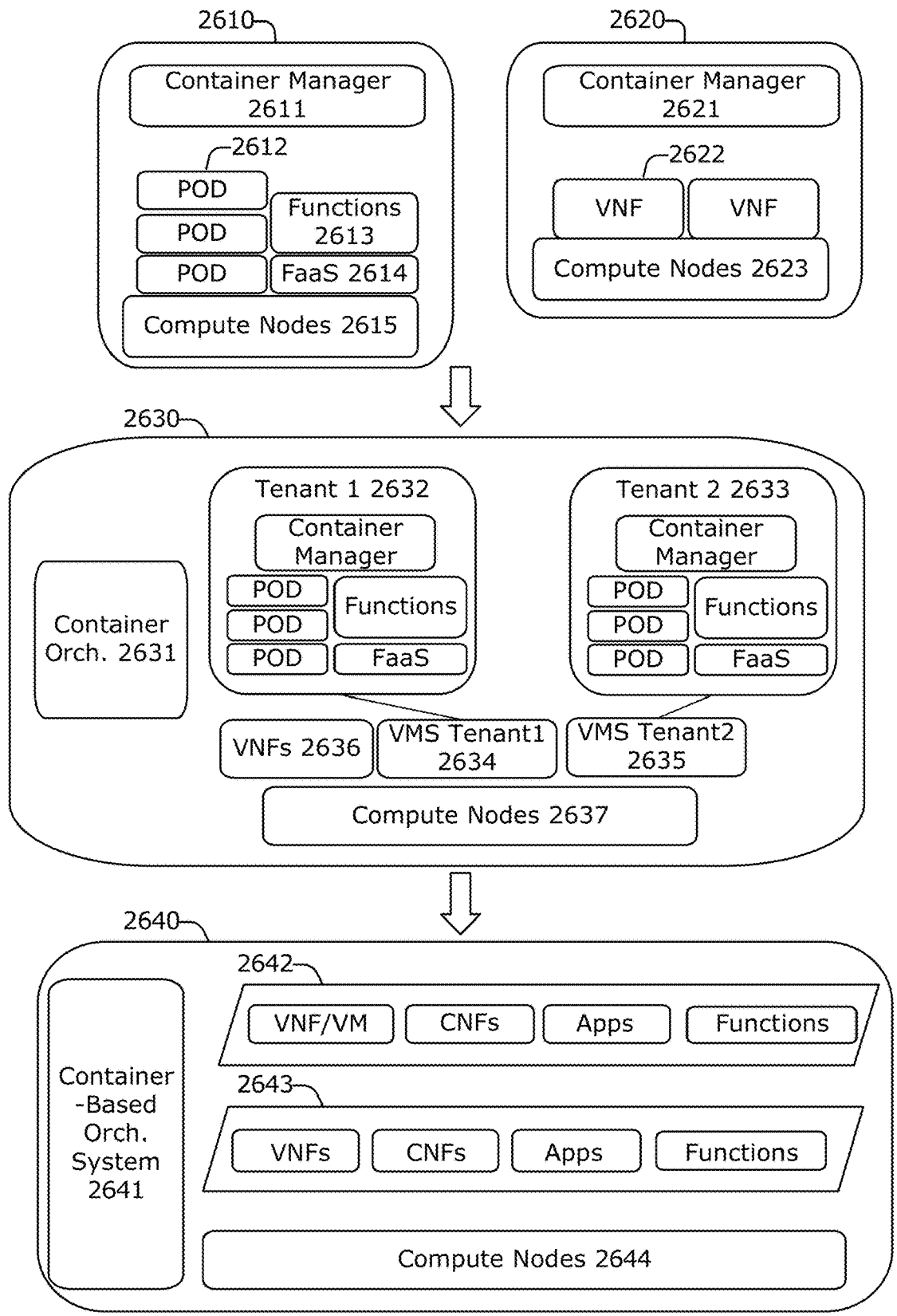
FIG. 26 illustrates various compute arrangements deploying containers in an edge computing system.

FIG. 26 illustrates additional compute arrangements deploying containers in an edge computing system. As a simplified example, system arrangements 2610, 2620 depict settings in which a pod controller (e.g., container managers 2611, 2621, and container orchestrator 2631) is adapted to launch containerized pods, functions, and functions-as-a-service instances through execution via compute nodes (2615 in arrangement 2610), or to separately execute containerized virtualized network functions through execution via compute nodes (2623 in arrangement 2620). This arrangement is adapted for use of multiple tenants in system arrangement 2630 (using compute nodes 2637), where containerized pods (e.g., pods 2612), functions (e.g., functions 2613, VNFs 2622, 2636), and functions-as-a-service instances (e.g., FaaS instance 2614) are launched within virtual machines (e.g., VMs 2634, 2635 for tenants 2632, 2633) specific to respective tenants (aside the execution of virtualized network functions). This arrangement is further adapted for use in system arrangement 2640, which provides containers 2642, 2643, or execution of the various functions, applications, and functions on compute nodes 2644, as coordinated by an container-based orchestration system 2641.

The system arrangements of depicted in FIG. 26 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 26, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 27:
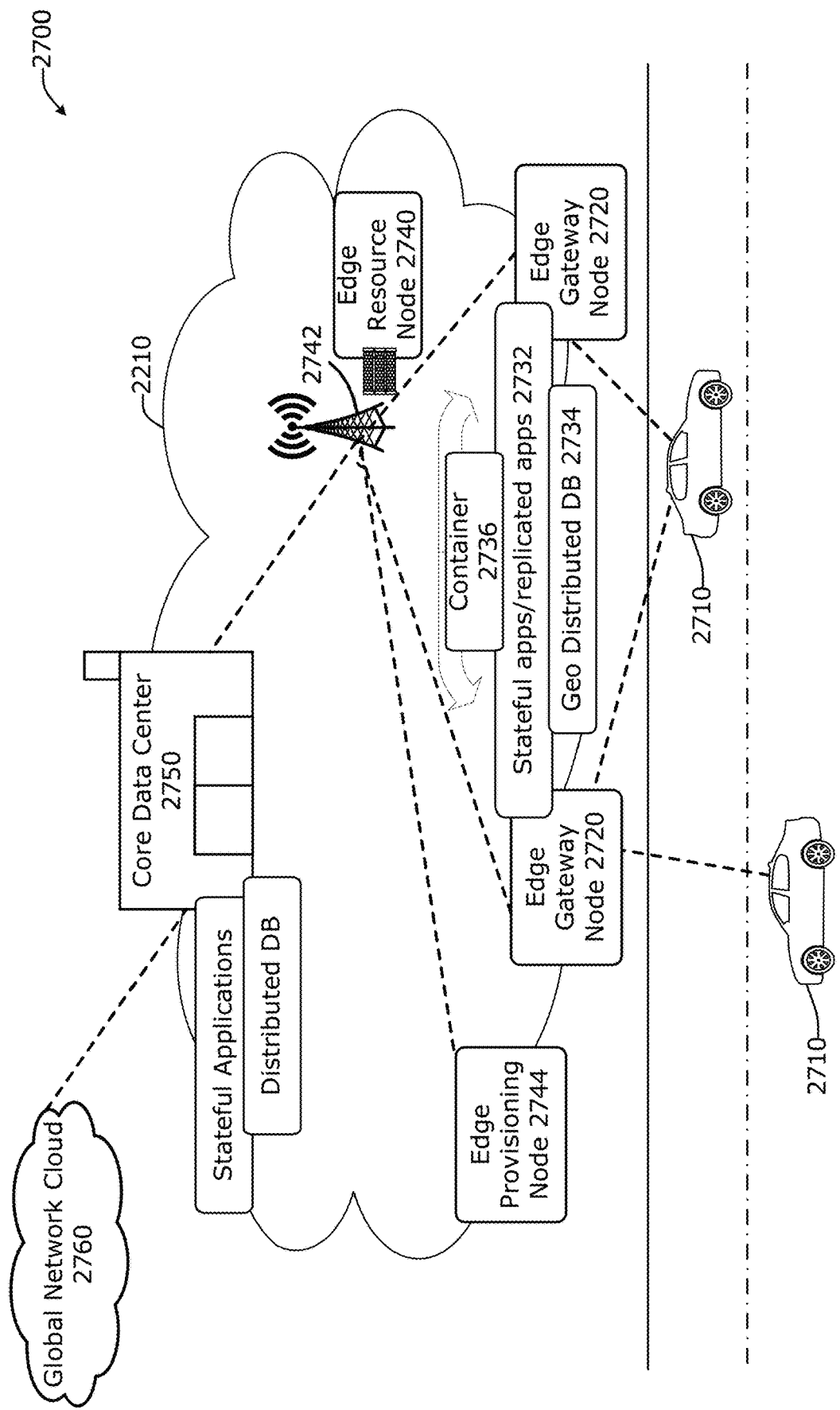
FIG. 27 illustrates a compute and communication use case involving mobile access to applications in an edge computing system.

The edge computing systems and arrangements discussed herein may be applicable in various solutions, services, and/or use cases involving mobility. FIG. 27 shows vehicle compute and communication use case involving mobile access to applications in an edge computing system 2700 that implements an edge cloud 2210. In this use case, respective client compute nodes 2710 may be embodied as in-vehicle compute systems (e.g., in-vehicle navigation and/or infotainment systems) located in corresponding vehicles which communicate with the edge gateway nodes 2720 during traversal of a roadway. For instance, the edge gateway nodes 2720 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 2710 and a particular edge gateway device 2720 may propagate so as to maintain a consistent connection and context for the client compute node 2710. Likewise, mobile edge nodes may aggregate at the high priority services or according to the throughput or latency resolution requirements for the underlying service(s) (e.g., in the case of drones). The respective edge gateway devices 2720 include an amount of processing and storage capabilities and, as such, some processing and/or storage of data for the client compute nodes 2710 may be performed on one or more of the edge gateway devices 2720.

The edge gateway devices 2720 may communicate with one or more edge resource nodes 2740, which are illustratively embodied as compute servers, appliances or components located at or in a network access node (NAN) 2742 (e.g., a base station of a cellular network). As discussed above, the respective edge resource nodes 2740 include an amount of processing and storage capabilities and, as such, some processing and/or storage of data for the client compute nodes 2710 may be performed on the edge resource node 2740. For example, the processing of data that is less urgent or important may be performed by the edge resource node 2740, while the processing of data that is of a higher urgency or importance may be performed by the edge gateway devices 2720 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 2740 also communicate with the core data center 2750, which may include compute servers, appliances, and/or other components located in a central location (e.g., a central office of a cellular communication network). The core data center 2750 may provide a gateway to the global network cloud 2760 (e.g., the Internet) for the edge cloud 2210 operations formed by the edge resource node(s) 2740 and the edge gateway devices 2720. Additionally, in some examples, the core data center 2750 may include an amount of processing and storage capabilities and, as such, some processing and/or storage of data for the client compute devices may be performed on the core data center 2750 (e.g., processing of low urgency or importance, or high complexity).

The edge gateway nodes 2720 or the edge resource nodes 2740 may offer the use of stateful applications 2732 and a geographic distributed database 2734. Although the applications 2732 and database 2734 are illustrated as being horizontally distributed at a layer of the edge cloud 2210, it will be understood that resources, services, or other components of the application may be vertically distributed throughout the edge cloud (including, part of the application executed at the client compute node 2710, other parts at the edge gateway nodes 2720 or the edge resource nodes 2740, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 2736 (or pod of containers) may be flexibly migrated from an edge node 2720 to other edge nodes (e.g., 2720, 2740, etc.) such that the container with an application and workload does not need to be reconstituted, re-compiled, re-interpreted in order for migration to work. However, in such settings, there may be some remedial or "swizzling" translation operations applied. For example, the physical hardware at node 2740 may differ from edge gateway node 2720 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 27 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 2720, some others at the edge resource node 2740, and others in the core data center 2750 or global network cloud 2760.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 2700 can include or be in communication with an edge provisioning node 2744. The edge provisioning node 2744 can distribute software such as the example computer readable instructions 3282 of FIG. 32, to various receiving parties for implementing any of the methods described herein. The example edge provisioning node 2744 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 2744. For example, the entity that owns and/or operates the edge provisioning node 2744 may be a developer, a seller, and/or a licensor (or a customer and/or consumer thereof) of software instructions such as the example computer readable instructions 3282 of FIG. 32. The receiving parties may be consumers, service providers, users, retailers, OEMs, etc., who purchase and/or license the software instructions for use and/or re-sale and/or sub-licensing.

In an example, edge provisioning node 2744 includes one or more servers and one or more storage devices/disks. The storage devices and/or storage disks host computer readable instructions such as the example computer readable instructions 3282 of FIG. 32, as described below. Similarly to edge gateway devices 2720 described above, the one or more servers of the edge provisioning node 2744 are in communication with a NAN 2742 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 3282 from the edge provisioning node 2744. For example, the software instructions, which may correspond to the example computer readable instructions 3282 of FIG. 32, may be downloaded to the example processor platform/s, which is to execute the computer readable instructions 3282 to implement the methods described herein.

In some examples, the processor platform(s) that execute the computer readable instructions 3282 can be physically located in different geographic locations, legal jurisdictions, etc. In some examples, one or more servers of the edge provisioning node 2744 periodically offer, transmit, and/or force updates to the software instructions (e.g., the example computer readable instructions 3282 of FIG. 32) to ensure improvements, patches, updates, etc. are distributed and applied to the software instructions implemented at the end user devices. In some examples, different components of the computer readable instructions 3282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 28:
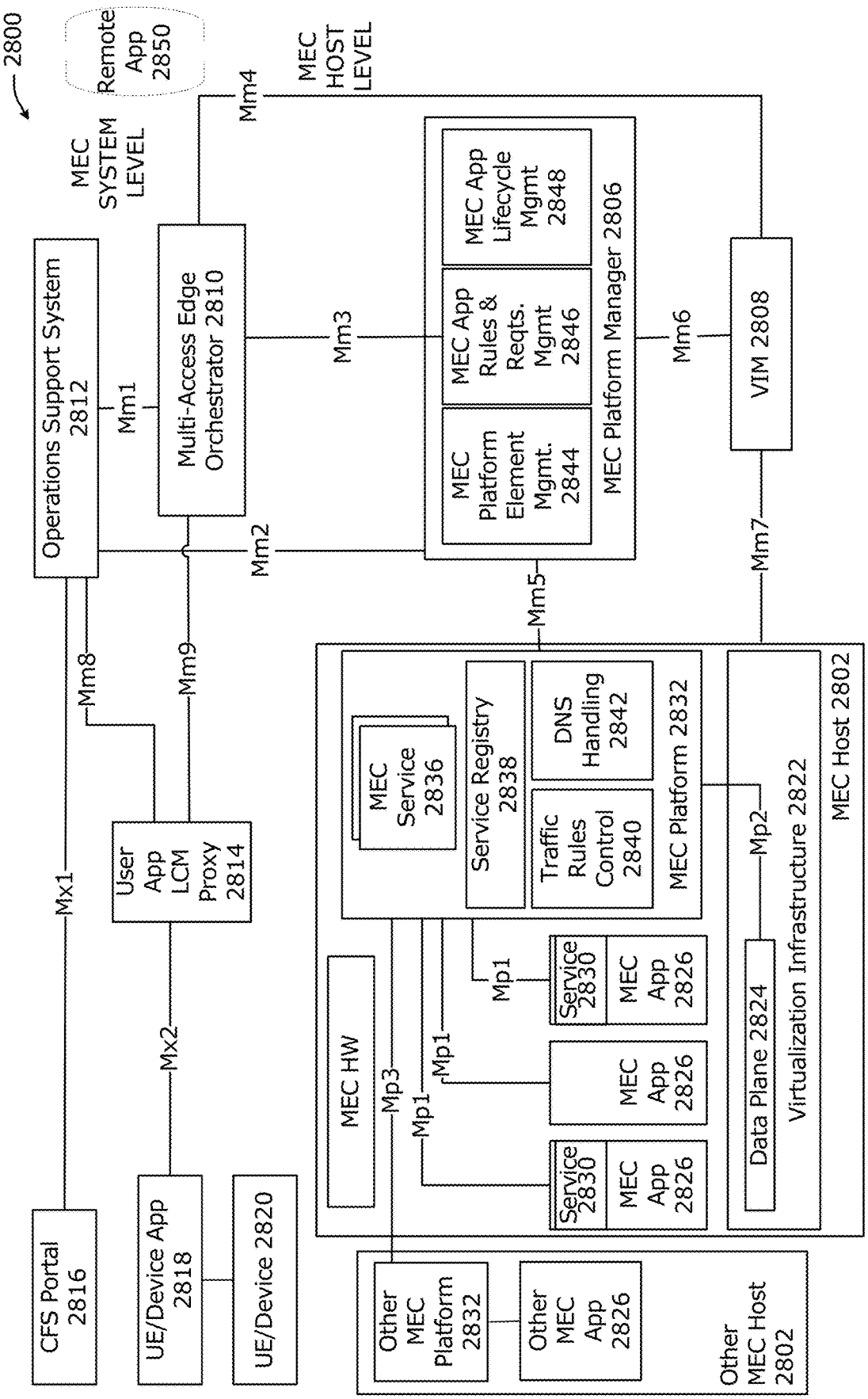
FIG. 28 illustrates a MEC system reference architecture.

FIG. 28 illustrates a MEC system reference architecture (or MEC architecture) 2800 providing functionalities in accordance with ETSI GS MEC 003 v2.1.1 (2019-01) ("[MEC003]"); ETSI GS MEC 009 V2.1.1 (2019-01) ("[MEC009]"); ETSI GS MEC 010-1 V1.1.1 (2017-10) ("[MEC010-1]"); ETSI GS MEC 010-2 V2.1.1 (2019-11) ("[MEC010-2]"); ETSI GS MEC 011 V1.1.1 (2017-07) ("[MEC011]"); ETSI GS MEC 012 V2.1.1 (2019-12) ("[MEC012]"); ETSI GS MEC 013 v2.1.1 (2019-09) ("[MEC013]"); ETSI GS MEC 014 V1.1.1 (2018-02) ("[MEC014]"); ETSI GS MEC 015 v2.1.1 (2020-06) ("[MEC015]"); ETSI GS MEC 028 v2.1.1 (2020-07) ("[MEC028]"); ETSI GS MEC 029 v2.1.1 (2019-07) ("[MEC029]"); ETSI MEC GS 030 v2.1.1 (2020-04) ("[MEC030]"); ETSI GS MEC 040 ("[MEC040]"); among many other ETSI MEC standards. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X need to exchange data, provide data to aggregation points and access to data in databases which provide an overview of the local situation derived from a multitude of sensors (by various cars, roadside units, etc.).

The MEC architecture 2800 includes MEC hosts 2802, a virtualization infrastructure manager (VIM) 2808, an MEC platform manager 2806, an MEC orchestrator 2810, an operations support system (OSS) 2812, a user app proxy 2814, a UE app 2818 running on UE 2820, and CFS portal 2816. The MEC host 2802 can include a MEC platform 2832 with filtering rules control component 2840, a DNS handling component 2842, a service registry 2838, and MEC services 2836. The MEC services 2836 can include at least one scheduler, which can be used to select resources for instantiating MEC apps (or Virtual Network Functions (NFVs)) 2826 upon virtualization infrastructure (VI) 2822. The MEC apps 2826 can be configured to provide services 2830, which can include processing network communications traffic of different types associated with one or more wireless connections (e.g., connections to one or more RANs or core network functions) and/or some other services such as those discussed herein. The other MEC host 2802 may have a same or similar configuration/implementation as the MEC host 2802, and the other MEC app 2826 instantiated within other MEC host 2802 can be similar to the MEC apps 2826 instantiated within MEC host 2802. The VI 28 22 includes a data plane 2824 coupled to the MEC platform 2822 via an MP2 interface. Additional interfaces between various network entities of the MEC architecture 2800 are illustrated in FIG. 28.

The MEC system 2800 includes three groups of reference points, including "Mp" reference points regarding the MEC platform functionality; "Mm" reference points, which are management reference points; and "Mx" reference points, which connect MEC entities to external entities. The interfaces/reference points in the MEC system 2800 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 2800 may be access-agnostic and not dependent on a particular deployment. MEC enables implementation of MEC apps 2826 as software-only entities that run on top of a VI 2822, which is located in or close to the network edge. A MEC app 2826 is an application that can be instantiated on a MEC host 2802 within the MEC system 2800 and can potentially provide or consume MEC services 2836.

The MEC entities depicted by FIG. 28 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 2820, and is discussed in more detail infra. The MEC host level includes one or more MEC hosts 2802, 2804 and MEC management entities, which provide functionality to run MEC Apps 2826 within an operator network or a subset of an operator network. The MEC management entities include various components that handle the management of the MEC-specific functionality of a particular MEC platform 2832, MEC host 2802, and the MEC Apps 2826 to be run.

The MEC platform manager 2806 is a MEC management entity including MEC platform element management component 2844, MEC app rules and requirements management component 2846, and MEC app lifecycle management component 2848. The various entities within the MEC architecture 2800 can perform functionalities as discussed in [MEC003]. The remote app 2850 is configured to communicate with the MEC host 2802 (e.g., with the MEC apps 2826) via the MEC orchestrator 2810 and the MEC platform manager 2806.

The MEC host 2802 is an entity that contains an MEC platform 2832 and VI 2822 which provides compute, storage, and network resources for the purpose of running MEC Apps 2826. The VI 2822 includes a data plane (DP) 2824 that executes traffic rules 2840 received by the MEC platform 2832, and routes the traffic among MEC Apps 2826, MEC services 2836, DNS server/proxy (see e.g., via DNS handling entity 2842), 3GPP network, local networks, and external networks. The MEC DP 2824 may be connected with the (R)AN nodes and the 3GPP core network, and/or may be connected with an access point via a wider network, such as the internet, an enterprise network, or the like.

The MEC platform 2832 is a collection of essential functionality required to run MEC Apps 2826 on a particular VI 2822 and enable them to provide and consume MEC services 2836, and that can provide itself a number of MEC services 937a. The MEC platform 2832 can also provide various services and/or functions, such as offering an environment where the MEC Apps 2826 can discover, advertise, consume and offer MEC services 2836 (discussed infra), including MEC services 2836 available via other platforms when supported. The MEC platform 2832 may be able to allow authorized MEC Apps 2826 to communicate with third party servers located in external networks. The MEC platform 2832 may receive traffic rules from the MEC platform manager 2806, applications, or services, and instruct the data plane accordingly (see e.g., Traffic Rules Control 2840). The MEC platform 2832 may send instructions to the DP 2824 within the VI 2822 via the Mp2 reference point. The Mp2 reference point between the MEC platform 2832 and the DP 2824 of the VI 2822 may be used to instruct the DP 2834 on how to route traffic among applications, networks, services, etc. The MEC platform 2832 may translate tokens representing UEs 2820 in the traffic rules into specific IP addresses. The MEC platform 2832 also receives DNS records from the MEC platform manager 2806 and configures a DNS proxy/server accordingly. The MEC platform 2832 hosts MEC services 2836 including the multi-access edge services discussed infra, and provide access to persistent storage and time of day information. Furthermore, the MEC platform 2832 may communicate with other MEC platforms 2832 of other MEC servers 2802 via the Mp3 reference point.

The VI 2822 represents the totality of all hardware and software components which build up the environment in which MEC Apps 2826 and/or MEC platform 2832 are deployed, managed and executed. The VI 2822 may span across several locations, and the network providing connectivity between these locations is regarded to be part of the VI 2822. The physical hardware resources of the VI 2822 includes computing, storage and network resources that provide processing, storage and connectivity to MEC Apps 2826 and/or MEC platform 2832 through a virtualization layer (e.g., a hypervisor, VM monitor (VMM), or the like). The virtualization layer may abstract and/or logically partition the physical hardware resources of the MEC server 2802 as a hardware abstraction layer. The virtualization layer may also enable the software that implements the MEC Apps 2826 and/or MEC platform 2832 to use the underlying VI 2822, and may provide virtualized resources to the MEC Apps 2826 and/or MEC platform 2832, so that the MEC Apps 2826 and/or MEC platform 2832 can be executed.

The MEC Apps 2826 are applications that can be instantiated on a MEC host/server 2802 within the MEC system 2800 and can potentially provide or consume MEC services 2836. The term "MEC service" refers to a service provided via a MEC platform 2832 either by the MEC platform 2832 itself or by a MEC App 2826. MEC Apps 2826 may run as VM on top of the VI 2822 provided by the MEC server 2802, and can interact with the MEC platform 2832 to consume and provide the MEC services 2836. The Mp1 reference point between the MEC platform 2832 and the MEC Apps 2826 is used for consuming and providing service specific functionality. Mp1 provides service registration 2838, service discovery, and communication support for various services, such as the MEC services 2836 provided by MEC host 2802. Mp1 may also provide application availability, session state relocation support procedures, traffic rules and DNS rules activation, access to persistent storage and time of day information, and/or the like.

The MEC Apps 2826 are instantiated on the VI 2822 of the MEC server 2802 based on configuration or requests validated by the MEC management (e.g., MEC platform manager 2806). The MEC Apps 2826 can also interact with the MEC platform 2832 to perform certain support procedures related to the lifecycle of the MEC Apps 2826, such as indicating availability, preparing relocation of user state, etc. The MEC Apps 2826 may have a certain number of rules and requirements associated to them, such as required resources, maximum latency, required or useful services, etc. These requirements may be validated by the MEC management, and can be assigned to default values if missing. MEC services 2836 are services provided and/or consumed either by the MEC platform 2832 and/or MEC Apps 2826. The service consumers (e.g., MEC Apps 2826 and/or MEC platform 2832) may communicate with particular MEC services 2836 over individual APIs (including the various MEC APIs discussed herein). When provided by an application, a MEC service 2836 can be registered in a list of services in the service registries 2838 to the MEC platform 2832 over the Mp1 reference point. Additionally, a MEC App 2826 can subscribe to one or more services 2830/2836 for which it is authorized over the Mp1 reference point.

Communication between applications and services in the MEC server is designed according to the principles of Service-oriented Architecture (SOA). The communication services allow applications hosted on a single MEC server to communicate with the application-platform services through well-defined APIs and with each other through a service-specific API. The service registry 2838 provides visibility of the services available on the MEC server 2802. The service registry 2838 uses the concept of loose coupling of services, providing flexibility in application deployment. In addition, the service registry presents service availability (status of the service) together with the related interfaces and versions. It is used by applications to discover and locate the end-points for the services they require, and to publish their own service end-point for other applications to use. The access to the service registry 2838 is controlled (authenticated and authorized). Additionally or alternatively, for the communication services, a lightweight broker-based 'publish and subscribe' messaging protocol is used. The 'publish and subscribe' capability provides one-to-many message distribution and application decoupling. Subscription and publishing by applications are access controlled (authenticated and authorized). The messaging transport should be agnostic to the content of the payload. Mechanisms should be provided to protect against malicious or misbehaving applications.

Examples of MEC services 2836 include the VIS, RNIS [MEC012], LS [MEC013], UE_ID Services [MEC014], BWMS [MEC015], WAIS [MEC028], FAIS [MEC029], and/or other MEC services. The RNIS, when available, provides authorized MEC Apps 2826 with radio network related information, and expose appropriate up-to-date radio network information to the MEC Apps 2826. The RNI may include, inter alia, radio network conditions, measurement and statistics information related to the user plane, information related to UEs 2820 served by the radio node(s) associated with the MEC host 2802 (e.g., UE context and radio access bearers), changes on information related to UEs 2820 served by the radio node(s) associated with the MEC host 2802, and/or the like. The RNI may be provided at the relevant granularity (e.g., per UE 2820, per cell, per period of time).

The service consumers (e.g., MEC Apps 2826, MEC platform 2832, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 2832 (not shown). A MEC App 2826 may query information on a message broker via a transport information query procedure, wherein the transport information may be pre-provisioned to the MEC App 2826 via a suitable configuration mechanism. The various messages communicated via the RNI API may be in XML, JSON, Protobuf, or some other suitable format.

The VIS provides supports various V2X applications. The RNI may be used by MEC Apps 2826 and MEC platform 2832 to optimize the existing services and to provide new types of services that are based on up to date information on radio conditions. As an example, a MEC App 2826 may use RNI to optimize current services such as video throughput guidance. In throughput guidance, a radio analytics MEC App 2826 may use MEC services to provide a backend video server with a near real-time indication on the throughput estimated to be available at the radio DL interface in a next time instant. The throughput guidance radio analytics application computes throughput guidance based on the required radio network information it obtains from a multi-access edge service running on the MEC server 2802. RNI may be also used by the MEC platform 2832 to optimize the mobility procedures required to support service continuity, such as when a certain MEC App 2826 requests a single piece of information using a simple request-response model (e.g., using RESTful mechanisms) while other MEC Apps 2826 subscribe to multiple different notifications regarding information changes (e.g., using a pub/sub mechanism and/ or message broker mechanisms).

The LS, when available, may provide authorized MEC Apps 2826 with location-related information, and expose such information to the MEC Apps 2826. With location related information, the MEC platform 2832 or one or more MEC Apps 2826 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2820 currently served by the radio node(s) associated with the MEC server 2802, information about the location of all UEs 2820 currently served by the radio node(s) associated with the MEC host 2802, information about the location of a certain category of UEs 2820 currently served by the radio node(s) associated with the MEC host 2802, a list of UEs 2820 in a particular location, information about the location of all radio nodes currently associated with the MEC host 2802, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 2802, or a subset thereof, according to a desired deployment. In this regard, the OMA Zonal Presence API provides means for MEC Apps 2826 to retrieve information about a zone, the access points associated to the zones and the users that are connected to the access points. In addition, the OMA Zonal Presence API, allows authorized application to subscribe to a notification mechanism, reporting about user activities within a zone. A MEC server 2802 may access location information or zonal presence information of individual UEs 2820 using the OMA Zonal Presence API to identify the relative location or positions of the UEs 2820.

The Traffic Management Service (TMS) allows edge applications to get informed of various traffic management capabilities and multi-access network connection information, and allows edge applications to provide requirements, e.g., delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 2826, and specify static/dynamic up/down bandwidth resources, including bandwidth size and bandwidth priority. MEC Apps 2826 may use the BWMS to update/receive bandwidth information to/from the MEC platform 2832. Different MEC Apps 2826 running in parallel on the same MEC server 2802 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism.

The purpose of the UE Identity feature is to allow UE specific traffic rules in the MEC system 2800. When the MEC system 2800 supports the UE Identity feature, the MEC platform 2832 provides the functionality (e.g., UE Identity API) for a MEC App 2826 to register a tag representing a UE 2820 or a list of tags representing respective UEs 2820. Each tag is mapped into a specific UE 2820 in the MNO's system, and the MEC platform 2832 is provided with the mapping information. The UE Identity tag registration triggers the MEC platform 2832 to activate the corresponding traffic rule(s) 2840 linked to the tag. The MEC platform 2832 also provides the functionality (e.g., UE Identity API) for a MEC App 2826 to invoke a de-registration procedure to disable or otherwise stop using the traffic rule for that user.

The WAIS is a service that provides WLAN access related information to service consumers within the MEC System 2800. The WAIS is available for authorized MEC Apps 2826 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 2800. The FAIS is available for the authorized MEC Apps 2826 and is discovered over the Mp1 reference point. The FAI may be used by MEC Apps 2826 and the MEC platform 2832 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 2826 and the MEC platform 2832 may consume the FAIS; and both the MEC platform 2832 and the MEC Apps 2826 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 2806 and the VI manager (VIM) 2808, and handles the management of MEC-specific functionality of a particular MEC server 2802 and the applications running on it. In some implementations, some or all of the multi-access edge management components may be implemented by one or more servers located in one or more data centers, and may use virtualization infrastructure that is connected with Network Function Virtualization (NFV) infrastructure used to virtualize Network Functions (NFs), or using the same hardware as the NFV infrastructure.

The MEC platform manager 2806 is responsible for managing the life cycle of applications including informing the multi-access edge orchestrator (MEO) 2810 of relevant application related events. The MEC platform manager 2806 may also provide MEC Platform Element management functions 2844 to the MEC platform 2832, manage MEC App rules and requirements 2846 including service authorizations, traffic rules, DNS configuration and resolving conflicts, and manage MEC App lifecycles mgmt 2848. The MEC platform manager 2806 may also receive virtualized resources, fault reports, and performance measurements from the VIM 2808 for further processing. The Mm5 reference point between the MEC platform manager 2806 and the MEC platform 2832 is used to perform platform configuration, configuration of the MEC Platform element mgmt 2844, MEC App rules and reqts 2846, MEC App lifecycles mgmt 2848, and management of application relocation.

The VIM 2808 may be an entity that allocates, manages and releases virtualized (compute, storage and networking) resources of the VI 2822, and prepares the VI 2822 to run a software image. To do so, the VIM 2808 may communicate with the VI 2822 over the Mm7 reference point between the VIM 2808 and the VI 2822. Preparing the VI 2822 may include configuring the VI 2822, and receiving/storing the software image. When supported, the VIM 2808 may provide rapid provisioning of applications, such as described in "Openstack++ for Cloudlet Deployments", available at http://reports-archive.adm.cs.cmu.edu/anon/2015/CMU-CS-15-123.pdf. The VIM 2808 may also collect and report performance and fault information about the virtualized resources, and perform application relocation when supported. For application relocation from/to external cloud environments, the VIM 2808 may interact with an external cloud manager to perform the application relocation, for example using the mechanism described in "Adaptive VM Handoff Across Cloudlets", and/or possibly through a proxy. Furthermore, the VIM 2808 may communicate with the MEC platform manager 2806 via the Mm6 reference point, which may be used to manage virtualized resources, for example, to realize the application lifecycle management. Moreover, the VIM 2808 may communicate with the MEC-O 2810 via the Mm4 reference point, which may be used to manage virtualized resources of the MEC server 2802, and to manage application images. Managing the virtualized resources may include tracking available resource capacity, etc.

The MEC system level management includes the MEC-O 2810, which has an overview of the complete MEC system 2800. The MEC-O 2810 may maintain an overall view of the MEC system 2800 based on deployed MEC hosts 2802, available resources, available MEC services 2836, and topology. The Mm3 reference point between the MEC-O 2810 and the MEC platform manager 2806 may be used for the management of the application lifecycle, application rules and requirements and keeping track of available MEC services 2836. The MEC-O 2810 may communicate with the user application lifecycle management proxy (UALMP) 2814 via the Mm9 reference point in order to manage MEC Apps 2826 requested by UE app 2818.

The MEC-O 2810 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2808 to handle the applications. The MEC-O 2810 may select appropriate MEC host(s) 901 for application instantiation based on constraints, such as latency, available resources, and available services. The MEC-O 2810 may also trigger application instantiation and termination, as well as trigger application relocation as needed and when supported.

The Operations Support System (OSS) 2812 is the OSS of an operator that receives requests via the Customer Facing Service (CFS) portal 2816 over the Mx1 reference point and from UE apps 2818 for instantiation or termination of MEC Apps 2826. The OSS 2812 decides on the granting of these requests. The CFS portal 2816 (and the Mx1 interface) may be used by third-parties to request the MEC system 2800 to run apps 2818 in the MEC system 2800. Granted requests may be forwarded to the MEC-O 2810 for further processing. When supported, the OSS 2812 also receives requests from UE apps 2818 for relocating applications between external clouds and the MEC system 2800. The Mm2 reference point between the OSS 2812 and the MEC platform manager 2806 is used for the MEC platform manager 2806 configuration, fault and performance management. The Mm1 reference point between the MEC-O 2810 and the OSS 2812 is used for triggering the instantiation and the termination of MEC Apps 2826 in the MEC system 2800.

The UE app(s) 2818 (also referred to as "device applications" or the like) is one or more apps running in a device 2820 that has the capability to interact with the MEC system 2800 via the user application lifecycle management proxy 2814. The UE app(s) 2818 may be, include, or interact with one or more client applications, which in the context of MEC, is application software running on the device 2818 that utilizes functionality provided by one or more specific MEC Apps 2826. The user app LCM proxy 2814 may authorize requests from UE apps 2818 in the UE 2820 and interacts with the OSS 2812 and the MEC-O 2810 for further processing of these requests. The term "lifecycle management," in the context of MEC, refers to a set of functions required to manage the instantiation, maintenance and termination of a MEC App 2826 instance. The user app LCM proxy 2814 may interact with the OSS 2812 via the Mm8 reference point, and is used to handle UE 2818 requests for running applications in the MEC system 2800. A user app may be an MEC App 2826 that is instantiated in the MEC system 2800 in response to a request of a user via an application running in the UE 2820 (e.g., UE App 2818). The user app LCM proxy 2814 allows UE apps 2818 to request on-boarding, instantiation, termination of user applications and when supported, relocation of user applications in and out of the MEC system 2800. It also allows informing the user apps about the state of the user apps. The user app LCM proxy 2814 is only accessible from within the mobile network, and may only be available when supported by the MEC system 2800. A UE app 2818 may use the Mx2 reference point between the user app LCM proxy 2814 and the UE app 2818 to request the MEC system 2800 to run an application in the MEC system 2800, or to move an application in or out of the MEC system 2800. The Mx2 reference point may only be accessible within the mobile network and may only be available when supported by the MEC system 2800.

In order to run an MEC App 2826 in the MEC system 2800, the MEC-O 2810 receives requests triggered by the OSS 2812, a third-party, or a UE app 2818. In response to receipt of such requests, the MEC-O 2810 selects a MEC server/host 2802 to host the MEC App 2826 for computational offloading, etc. These requests may include information about the application to be run, and possibly other information, such as the location where the application needs to be active, other application rules and requirements, as well as the location of the application image if it is not yet on-boarded in the MEC system 2800.

The MEC-O 2810 may select one or more MEC servers 2802 for computational intensive tasks. The selected one or more MEC hosts 2802 may offload computational tasks of a UE app 2818 based on various operational parameters, such as network capabilities and conditions, computational capabilities and conditions, application requirements, and/or other like operational parameters. The application requirements may be rules and requirements associated to/with one or more MEC Apps 2826, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 2826 to be able to run; multi-access edge services that the MEC Apps 2826 can take advantage of, if available; connectivity or mobility support/requirements (e.g., application state relocation, application instance relocation); required multi-access edge features, such as VM relocation support or UE identity; required network connectivity (e.g., connectivity to applications within the MEC system 2800, connectivity to local networks, or to the Internet); information on the operator's MEC system 2800 deployment or mobile network deployment (e.g., topology, cost); requirements on access to user traffic; requirements on persistent storage; traffic rules 2840; DNS rules 2842; etc.

The MEC-O 2810 considers the requirements and information listed above and information on the resources currently available in the MEC system 2800 to select one or several MEC servers 2802 to host MEC Apps 2826 and/or for computational offloading. After one or more MEC hosts 2802 are selected, the MEC-O 2810 requests the selected MEC host(s) 2802 to instantiate the application(s) or application tasks. The actual algorithm used to select the MEC servers 2802 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2810 may decide to select one or more new MEC hosts 2802 to act as a master node, and initiates the transfer of an application instance or application-related state information from the one or more source MEC hosts 2802 to the one or more target MEC hosts 2802.

Additionally or alternatively, MEC system 2800 can be flexibly deployed depending on the use case/vertical segment/information to be processed. Some components of the MEC system 2800 can be co-located with other elements of the system. As an example, in certain use cases (e.g., enterprise), a MEC app 2826 may need to consume a MEC service locally, and it may be efficient to deploy a MEC host locally equipped with the needed set of APIs. In another example, deploying a MEC server 2802 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. In some other aspects, a bandwidth management API may be present both at the access level edge and also in more remote edge locations, in order to set up transport networks (e.g., for CDN-based services).

Additionally or alternatively, MEC system 2800 can be deployed in a Network Function Virtualization (NFV) environment. In these implementations, the MEC platform 2832 is deployed as a VNF and is communicatively connected to a MEC platform manager—NFV via an Mm5 interface, MEC app—VNFs via Mp1 interface(s), a VNF data plane via an Mp2 interface, NFV infrastructure (NFVI) via an Nf-Vn interface, and one or more VNF managers (VNFMs) via Ve-Vnfm-vnf interface(s). The MEC platform 2832 can be communicatively coupled to another MEC platform 2832 via an Mp3 interface. Furthermore, the MEC apps 2826 can appear like VNFs (e.g., MEC app—VNFs) towards ETSI NFV MANO components. This allows re-use of ETSI NFV MANO functionality. The full set of MANO functionality may be unused and certain additional functionality may be needed. The virtualization infrastructure is deployed as an NFVI and its virtualized resources are managed by the VIM 2808. For that purpose, one or more of the procedures defined by ETSI NFV Infrastructure specifications can be used (see e.g., ETSI GS NFV-INF 003 V2.4.1 (2018-02), ETSI GS NFV-INF 004 V2.4.1 (2018-02), ETSI GS NFV-INF 005 V3.2.1 (2019-04), and ETSI GS NFV-IFA 009 V1.1.1 (2016-07) (collectively "[ETSINFV]")). The VNF MEC apps are managed like individual VNFs, allowing that a MEC-in-NFV deployment can delegate certain orchestration and LCM tasks to the NFV orchestrator (NFVO) and VNFMs as defined by ETSI NFV MANO. Various other aspects of the MEC deployment in an NFV environment are discussed in [MEC003].

Figure 29:
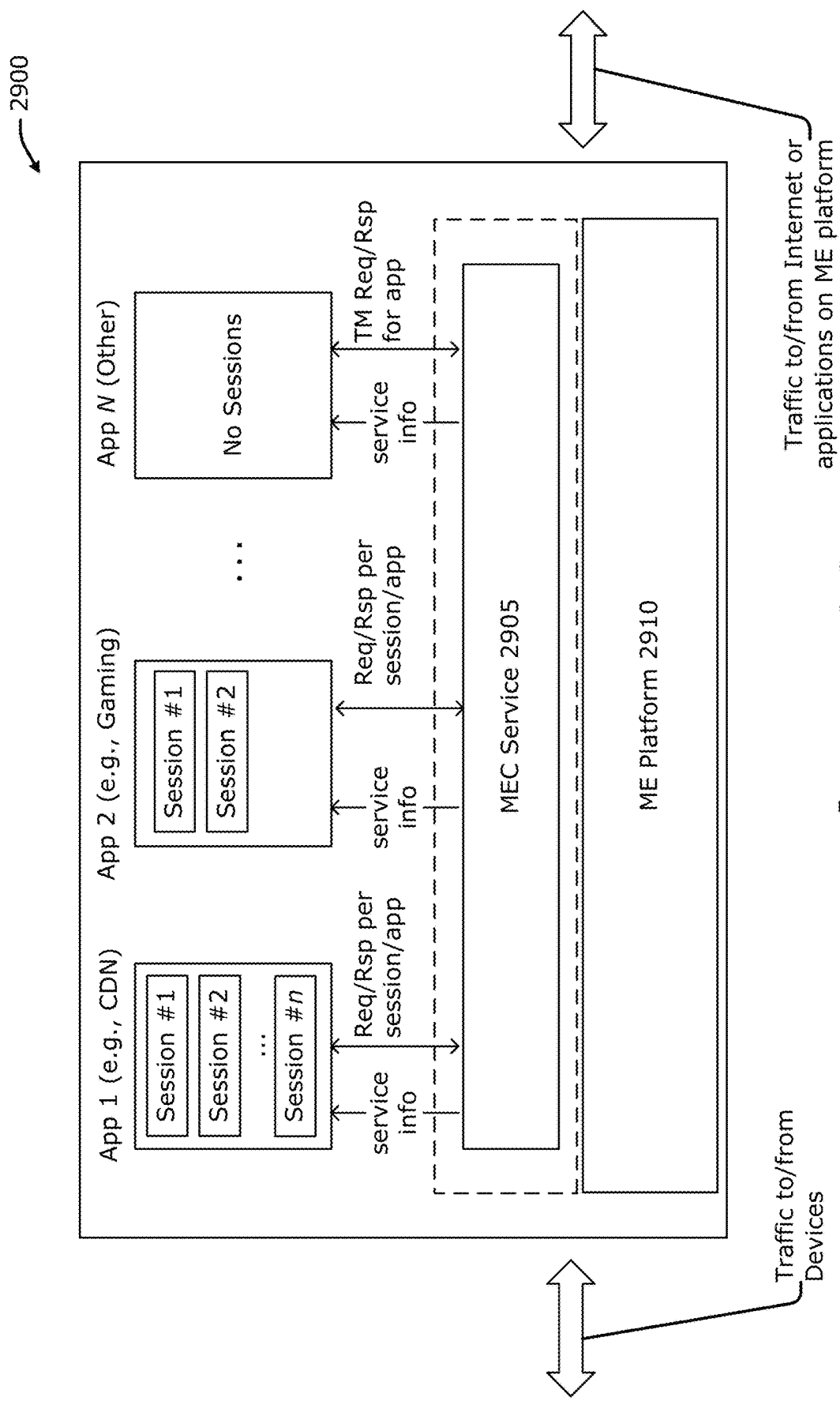
FIG. 29 illustrates an example MEC service architecture.

FIG. 29 illustrates an example MEC service architecture 2900. MEC service architecture 2900 includes the MEC service 2905, ME platform 2910 (corresponding to MEC platform 2932), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 2910) and consumers (e.g., UEs 101, user apps instantiated by individual UEs 2901, other servers/services, network functions, application functions, etc.). Each session represents an interactive information exchange between two or more elements, such as a client-side app and its corresponding server-side app, a user app instantiated by a UE 2901 and a MEC app instantiated by the ME platform 2910, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 2901 and a DN that provides a PDU connectivity service, which is a service that provides for the exchange of PDUs between a UE 2901 and a Data Network. Furthermore, each session may be associated with a session identifier (ID) which is data the uniquely identifies a session, and each App (or App instance) may be associated with an App ID (or App instance ID) which is data the uniquely identifies an App (or App instance).

The MEC service 2805 provides one or more MEC services 2836 to MEC service consumers (e.g., Apps 1 to N). The MEC service 2805 may optionally run as part of the platform (e.g., ME platform 2810) or as an application (e.g., ME app). Different Apps 1 to N, whether managing a single instance or several sessions (e.g., CDN), may request specific service info per their requirements for the whole application instance or different requirements per session. The MEC service 2805 may aggregate all the requests and act in a manner that will help optimize the BW usage and improve Quality of Experience (QoE) for applications.

The MEC service 2805 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of [MEC009]). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 2838 in FIG. 28). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI. The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

5. Hardware Components

Figure 30:
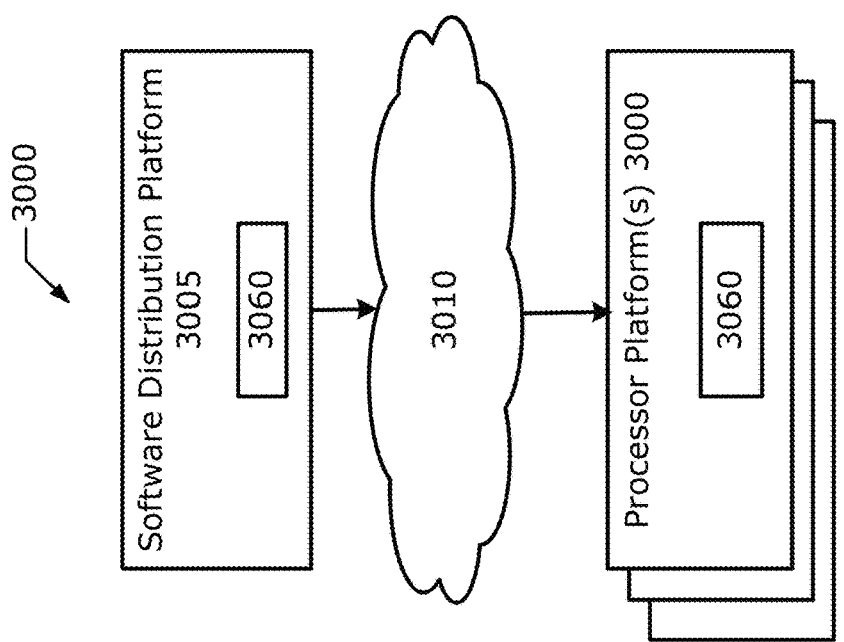
FIG. 30 illustrates an example software distribution platform.

FIG. 30 illustrates a software distribution platform 3005 to distribute software 3060, such as the example computer readable instructions 3260 of FIG. 32, to one or more devices, such as example processor platform(s) 3000 and/or example connected edge devices 3262 (see e.g., FIG. 32) and/or any of the other computing systems/devices discussed herein. The example software distribution platform 3005 may be implemented by any computer server, data facility, cloud service, etc., capable of storing and transmitting software to other computing devices (e.g., third parties, the example connected edge devices 3262 of FIG. 32). Example connected edge devices may be customers, clients, managing devices (e.g., servers), third parties (e.g., customers of an entity owning and/or operating the software distribution platform 3005). Example connected edge devices may operate in commercial and/or home automation environments. In some examples, a third party is a developer, a seller, and/or a licensor of software such as the example computer readable instructions 3260 of FIG. 32. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 30, the software distribution platform 3005 includes one or more servers and one or more storage devices. The storage devices store the computer readable instructions 3060, which may correspond to the example computer readable instructions 3260 of FIG. 32, as described above. The one or more servers of the example software distribution platform 3005 are in communication with a network 3010, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 3060 from the software distribution platform 3005. For example, the software 3060, which may correspond to the example computer readable instructions 3260 of FIG. 32, may be downloaded to the example processor platform(s) 3000, which is/are to execute the computer readable instructions 3060 to implement Radio apps.

In some examples, one or more servers of the software distribution platform 3005 are communicatively connected to one or more security domains and/or security devices through which requests and transmissions of the example computer readable instructions 3060 must pass. In some examples, one or more servers of the software distribution platform 3005 periodically offer, transmit, and/or force updates to the software (e.g., the example computer readable instructions 3260 of FIG. 32) to ensure improvements, patches, updates, etc. are distributed and applied to the software at the end user devices.

In FIG. 30, the computer readable instructions 3060 are stored on storage devices of the software distribution platform 3005 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 3005 are in a first format when transmitted to the example processor platform(s) 3000. In some examples, the first format is an executable binary in which particular types of the processor platform(s) 3000 can execute. However, in some examples, the first format is uncompiled code that requires one or more preparation tasks to transform the first format to a second format to enable execution on the example processor platform(s) 3000. For instance, the receiving processor platform(s) 3000 may need to compile the computer readable instructions 3060 in the first format to generate executable code in a second format that is capable of being executed on the processor platform(s) 3000. In still other examples, the first format is interpreted code that, upon reaching the processor platform(s) 3000, is interpreted by an interpreter to facilitate execution of instructions.

Figure 31:
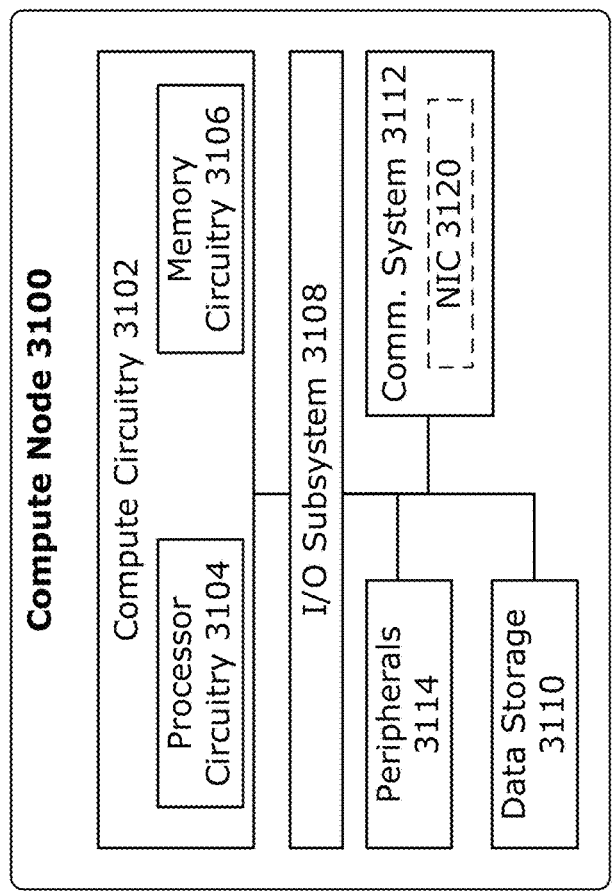
FIGS. 31 and 32 depict example components of various compute nodes in edge computing system(s).

FIGS. 31 and 32 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 31, an edge compute node 3100 includes a compute engine (also referred to herein as "compute circuitry") 3102, an input/output (I/O) subsystem 3108, data storage 3110, a communication circuitry subsystem 3112, and, optionally, one or more peripheral devices 3114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 3100 may be embodied as any type of engine, device, or collection of devices capable of performing various compute functions. The compute node 3100 may correspond to the V-ITS-Ss 121, 122 and/or NANs 131, 132 of FIG. 1; V-ITS-Ss 621, 622 and/or NAN 610 of FIG. 6; vehicle 1710, the IVS 1701, VRU ITS-S 1717 NAN 1730, edge compute node 1740, and/or remote/cloud servers 1760 of FIG. 17; V-ITS-S 1901 of FIG. 19; personal computing system 2000 of FIG. 20; roadside infrastructure system 2100 of FIG. 21; processor platform(s) 3000 and/or distribution platform 3005 of FIG. 30; and/or some other computing system discussed herein.

In some examples, the compute node 3100 may be embodied as a single device such as an integrated circuit, an embedded system, an FPGA, a System-on-Chip (SoC), or other integrated system or device. The compute node 3100 includes or is embodied as a processor 3104 and a memory 3106. The processor 3104 may be embodied as any type of processor capable of performing the functions described herein (e.g., executing an application). For example, the processor 3104 may be embodied as a multi-core processor(s), a microcontroller, or other processor or processing/controlling circuit.

In some examples, the processor 3104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 3104 may work in coordination with each other to execute many types of operations and instructions within and on behalf of the compute node 3100.

The memory 3106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 3106 may be integrated into the processor 3104. The main memory 3106 may store various software and data used during operation such as one or more applications, data operated on by the application(s), libraries, and drivers.

The compute circuitry 3102 is communicatively coupled to other components of the compute node 3100 via the I/O subsystem 3108, which may be embodied as circuitry and/or components to facilitate input/output operations with the compute circuitry 3102 (e.g., with the processor 3104 and/or the main memory 3106) and other components of the compute circuitry 3102. For example, the I/O subsystem 3108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 3108 may form a portion of an SoC and be incorporated, along with one or more of the processor 3104, the main memory 3106, and other components of the compute circuitry 3102, into the compute circuitry 3102.

The one or more illustrative data storage devices/disks 3110 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 3110 may include a system partition that stores data and firmware code for the data storage device/disk 3110. Individual data storage devices/disks 3110 may also include one or more operating system partitions that store data files and executables for operating systems depending on, for example, the type of compute node 3100.

The communication circuitry 3112 may be embodied as any communication circuit, device, or collection thereof, capable of enabling communications over a network between the compute circuitry 3102 and another compute device (e.g., an edge gateway node or the like). The communication circuitry 3112 may be configured to use any one or more communication technology (e.g., wired or wireless communications) and associated protocols (e.g., a cellular networking protocol such a 3GPP 4G or 5G standard, a wireless local area network protocol such as IEEE 802.11/ WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 3112 includes a network interface controller (NIC) 3120, which may also be referred to as a host fabric interface (HFI). The NIC 3120 may be embodied as one or more add-in-boards, daughter cards, network interface cards, controller chips, chipsets, or other devices that may be used by the compute node 3100 to connect with another compute device. In some examples, the NIC 3120 may be embodied as part of a system-on-a-chip (SoC) that includes one or more processors, or included on a multichip package that also contains one or more processors. In some examples, the NIC 3120 may include a local processor (not shown) and/or a local memory (not shown) that are both local to the NIC 3120. In such examples, the local processor of the NIC 3120 may be capable of performing one or more of the functions of the compute circuitry 3102 described herein. Additionally, or alternatively, in such examples, the local memory of the NIC 3120 may be integrated into one or more components of the client compute node at the board level, socket level, chip level, and/or other levels.

Additionally, in some examples, a respective compute node 3100 may include one or more peripheral devices 3114. Such peripheral devices 3114 may include any type of peripheral device found in a compute device or server such as audio input devices, a display, other input/output devices, interface devices, and/or other peripheral devices, depending on the particular type of the compute node 3100. In further examples, the compute node 3100 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 32 illustrates an example of components that may be present in an edge computing node 3250 for implementing the techniques (e.g., operations, processes, methods, and methodologies) described herein. The edge computing node 3250 may correspond to the V-ITS-Ss 121, 122 and/or NANs 131, 132 of FIG. 1; V-ITS-Ss 621, 622 and/or NAN 610 of FIG. 6; vehicle 1710, the IVS 1701, VRU ITS-S 1717 NAN 1730, edge compute node 1740, and/or remote/cloud servers 1760 of FIG. 17; V-ITS-S 1901 of FIG. 19; personal computing system 2000 of FIG. 20; roadside infrastructure system 2100 of FIG. 21; processor platform(s) 3000 and/or distribution platform 3005 of FIG. 30; and/or some other computing system discussed herein. This edge computing node 3250 provides a closer view of the respective components of node 3100 when implemented as or as part of a computing device (e.g., as a mobile device, a base station, server, gateway, etc.). The edge computing node 3250 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3250, or as components otherwise incorporated within a chassis of a larger system.

The edge computing node 3250 includes processing circuitry in the form of one or more processors 3252. The processor circuitry 3252 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3252 may include one or more hardware accelerators (e.g., same or similar to acceleration circuitry 3264), which may be microprocessors, programmable processing devices (e.g., FPGA, ASIC, etc.), or the like. The one or more accelerators may include, for example, computer vision and/or deep learning accelerators. In some implementations, the processor circuitry 3252 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3252 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 3252 may be coupled with or may include memory/storage and may be configured to execute instructions stored in the memory/storage to enable various applications or operating systems to run on the platform 3250. The processors (or cores) 3252 is configured to operate application software to provide a specific service to a user of the platform 3250. Additionally or alternatively, the processor(s) 3252 may be a special-purpose processor(s)/controller (s) configured (or configurable) to operate according to the elements, features, and implementations discussed herein.

As examples, the processor(s) 3252 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm®

Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3252 may be a part of a system on a chip (SoC), System-in-Package (SiP), a multi-chip package (MCP), and/or the like, in which the processor(s) 3252 and other components are formed into a single integrated circuit, or a single package, such as the Edison™ or Galileo™ SoC boards from Intel® Corporation. Other examples of the processor(s) 3252 are mentioned elsewhere in the present disclosure.

The processor(s) 3252 may communicate with system memory 3254 over an interconnect (IX) 3256. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3258 may also couple to the processor 3252 via the IX 3256. In an example, the storage 3258 may be implemented via a solid-state disk drive (SSDD) and/or high-speed electrically erasable memory (commonly referred to as "flash memory"). Other devices that may be used for the storage 3258 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3254 and/or storage circuitry 3258 may also incorporate three-dimensional (3D) cross-point (XPOINT) memories from Intel® and Micron®.

In low power implementations, the storage 3258 may be on-die memory or registers associated with the processor 3252. However, in some examples, the storage 3258 may be implemented using a micro hard disk drive (HDD). Further, any number of new technologies may be used for the storage 3258 in addition to, or instead of, the technologies described, such resistance change memories, phase change memories, holographic memories, or chemical memories, among others.

The components of edge computing device 3250 may communicate over an interconnect (IX) 3256. The IX 3256 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3256 may be a proprietary bus, for example, used in a SoC based system.

The IX 3256 couples the processor 3252 to communication circuitry 3266 for communications with other devices, such as a remote server (not shown) and/or the connected edge devices 3262. The communication circuitry 3266 is a hardware element, or collection of hardware elements, used to communicate over one or more networks (e.g., cloud 3263) and/or with other devices (e.g., edge devices 3262). The collection of hardware elements include hardware devices such as baseband circuitry 326x, switches, filters, amplifiers, antenna elements, and the like to facilitate OTA communications)

The transceiver 3266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 3266 (or multiple transceivers 3266) may communicate using multiple standards or radios for communications at a different range. For example, the communication circuitry 3266 may include short-range RAT circuitry 326y to communicate with relatively close devices (e.g., within about 10 meters) based on BLE, or another low power radio, to save power. More distant connected edge devices 3262 (e.g., within about 50 meters) may be reached over ZigBee® circuitry 326y and/or other intermediate power radios 326y. Both communications techniques may take place over a single radio 326y at different power levels or may take place over separate transceivers 326y, for example, a local transceiver 326y using BLE and a separate mesh transceiver 326y using ZigBee®.

A wireless network transceiver 326z may be included to communicate with devices or services in the edge cloud 3263 via local or wide area network protocols. The wireless network transceiver 326z may be an LPWA transceiver that follows the IEEE 802.15.4, or IEEE 802.15.4g standards, among others. The edge computing node 3250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 326z, as described herein. For example, the transceiver 326z may include a cellular transceiver that uses spread spectrum (SPA/SAS) communications for implementing high-speed communications. Further, any number of other protocols may be used, such as Wi-Fi® networks for medium speed communications and provision of network communications. The transceiver 326z may include radios that are compatible with any number of 3GPP specifications, such as LTE and 5G/NR communication systems, discussed in further detail at the end of the present disclosure.

According to various embodiments, the baseband circuitry 326x operates, inter alia, one or more protocol stacks (e.g., a user/data plane protocol stack and a control plane protocol stack). These protocol stacks may include multiple layers, wherein one of those layers is a MAC layer that provides MAC services. The MAC services include, inter alia, a data service that provides peer logical link control (LLC) sublayer entities with the ability to exchange protocol data units (PDUs) that are referred to as "MAC sublayer Service Data Units" or "MSDUs" when sent to the MAC sublayer. To support this service, the local MAC operated by the baseband circuitry 326x uses the underlying PHY-level services to transport an MSDU to a peer MAC entity (operated by another device/system), where it is delivered to the peer LLC sublayer. Such asynchronous MSDU transport is performed on a connectionless basis. There are two LLC sublayer protocols used (see e.g., IEEE 802-2014, "IEEE Standard for Local and Metropolitan Area Networks: Overview and Architecture" (30 Jun. 2014)); LLC Protocol Discrimination (LPD) (see e.g., ISO/IEC 8802-2:1998), and EtherType Protocol Discrimination (EPD) (see e.g., IEEE 802.3-2018, "IEEE Standard for Ethernet" 14 Jun. 2018)). LPD is used for transmission of all IEEE 802.11 MSDUs with the exception of the 5.9 GHz bands where EPD is used (see e.g., sections E.2.3 and E.2.4 in [IEEE80211]).

During transmission, an MSDU goes through some or all of the following processes: MSDU rate limiting, aggregate MSDU (A-MSDU) aggregation, frame delivery deferral during power save mode, sequence number assignment, integrity protection, fragmentation, encryption, frame formatting, and aggregate MAC protocol data unit (A-MPDU) aggregation. When transparent Fast Session Transfer (FST) is used, an MSDU first goes through an additional transparent FST entity that contains a demultiplexing process that forwards the MSDU down to the selected TX MSDU Rate Limiting process, and thence MAC data plane processing as described in the previous sentence. IEEE 802.1X-2020, "IEEE Standard for Local and metropolitan area networks—Port-Based Network Access Control" (28 Feb. 2020) ("[IEEE802.1X]") may block the MSDU at the Controlled Port before the preceding processing occurs. Otherwise, at some point, the data frames that contain all or part of the MSDU are queued per AC/TS.

During reception, a received data frame goes through processes of possible A-MPDU deaggregation, MPDU header and cyclic redundancy code (CRC) validation, duplicate removal, decryption, possible reordering if the block ack mechanism is used, replay detection, defragmentation, integrity checking, possible A-MSDU deaggregation, and possible MSDU rate limiting. Then, one or more MSDUs are delivered to the MAC SAP or to the DS via the DSAF. When transparent FST is used, MSDUs originating from different PHY SAPs go through a final step of a transparent FST entity that contains a multiplexing process before delivering the MSDU. The [IEEE802.1X] Controlled/Uncontrolled Ports discard any received MSDU if the Controlled Port is not enabled and if the MSDU does not represent an [IEEE802.1X] frame.

When transparent FST is used, the same security keys, sequence counter, and PN counter are used by the MAC data plane to encrypt the MPDU prior to and following an FST, and the same security keys are used to check the integrity and perform the protection of MSDUs. When nontransparent FST is used, independent RSNAs, security keys, sequence counters, and PN counters have to be established for each MAC data plane to be used prior to and following an FST. When transparent FST is used, a single MAC SAP at each peer is presented to the higher layers of that peer for all of the frequency bands/channels that are identified by the same MAC address at that peer. When nontransparent FST is used, different MAC SAPs are presented to higher layers since different MAC addresses are used prior to and following an FST.

A STA (e.g., the edge compute node, 3250, the baseband circuitry 326x operating the MAC layer or the like) is able to properly construct frames for transmission and to decode a (potentially different) subset of the frames upon validation following reception. The particular subset of these frames that the STA constructs and decodes is determined by the functions supported by that particular STA, and includes the various frames discussed herein (see e.g., FIG. 12). The STA is able to validate every received frame using the FCS and to interpret certain fields from the MAC headers of all frames. The contents of each field and formats of different frame types (e.g., data frames, control frames, management frames, extension frames, etc.) are discussed herein and in [IEEE80211]. The STA (e.g., the edge compute node, 3250, the baseband circuitry 326x operating the MAC layer, or the like) also implements various physical and virtual CS mechanisms including the NAV and the NAV setting signals discussed herein.

A network interface controller (NIC) 3268 may be included to provide a wired communication to nodes of the edge cloud 3263 or to other devices, such as the connected edge devices 3262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3268 may be included to enable connecting to a second network, for example, a first NIC 3268 providing communications to the cloud over Ethernet, and a second NIC 3268 providing communications to other devices over another type of network.

Given the variety of types of applicable communications from the device to another component or network, applicable communications circuitry used by the device may include or be embodied by any one or more of components 3264, 3266, 3268, or 3270. Accordingly, in various examples, applicable means for communicating (e.g., receiving, transmitting, etc.) may be embodied by such communications circuitry.

The edge computing node 3250 may include or be coupled to acceleration circuitry 3264, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3264 may comprise logic blocks or logic fabric and other interconnected resources that may be programmed (configured) to perform various functions, such as the procedures, methods, functions, etc. discussed herein. In such implementations, the acceleration circuitry 3264 may also include memory cells (e.g., EPROM, EEPROM, flash memory, static memory (e.g., SRAM, anti-fuses, etc.) used to store logic blocks, logic fabric, data, etc. in LUTs and the like.

The IX 3256 also couples the processor 3252 to a sensor hub or external interface 3270 that is used to connect additional devices or subsystems. The additional/external devices may include sensors 3272, actuators 3274, and positioning circuitry 3275.

The sensor circuitry 3272 includes devices, modules, or subsystems whose purpose is to detect events or changes in its environment and send the information (sensor data) about the detected events to some other a device, module, subsystem, etc. Examples of such sensors 3272 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3274, allow platform 3250 to change its state, position, and/or orientation, or move or control a mechanism or system. The actuators 3274 comprise electrical and/or mechanical devices for moving or controlling a mechanism or system, and converts energy (e.g., electric current or moving air and/or liquid) into some kind of motion. The actuators 3274 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3274 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3250 may be configured to operate one or more actuators 3274 based on one or more captured events and/or instructions or control signals received from a service provider and/or various client systems The positioning circuitry 3275 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 3275 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 3275 may include a Micro-Technology for Positioning, Navigation, and Timing (Micro-PNT) IC that uses a master timing clock to perform position tracking/estimation without GNSS assistance. The positioning circuitry 3275 may also be part of, or interact with, the communication circuitry 3266 to communicate with the nodes and components of the positioning network. The positioning circuitry 3275 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3275 is, or includes an INS, which is a system or device that uses sensor circuitry 3272 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 3250 without the need for external references.

In some optional examples, various input/output (I/O) devices may be present within or connected to, the edge computing node 3250, which are referred to as input circuitry 3286 and output circuitry 3284 in FIG. 32. The input circuitry 3286 and output circuitry 3284 include one or more user interfaces designed to enable user interaction with the platform 3250 and/or peripheral component interfaces designed to enable peripheral component interaction with the platform 3250. Input circuitry 3286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3284 may be included to show information or otherwise convey information, such as sensor readings, actuator position(s), or other like information. Data and/or graphics may be displayed on one or more user interface components of the output circuitry 3284. Output circuitry 3284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3250. The output circuitry 3284 may also include speakers or other audio emitting devices, printer(s), and/or the like. Additionally or alternatively, the sensor circuitry 3272 may be used as the input circuitry 3284 (e.g., an image capture device, motion capture device, or the like) and one or more actuators 3274 may be used as the output device circuitry 3284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3276 may power the edge computing node 3250, although, in examples in which the edge computing node 3250 is mounted in a fixed location, it may have a power supply coupled to an electrical grid, or the battery may be used as a backup or for temporary capabilities. The battery 3276 may be a lithium ion battery, or a metal-air battery, such as a zinc-air battery, an aluminum-air battery, a lithium-air battery, and the like.

A battery monitor/charger 3278 may be included in the edge computing node 3250 to track the state of charge (SoCh) of the battery 3276, if included. The battery monitor/charger 3278 may be used to monitor other parameters of the battery 3276 to provide failure predictions, such as the state of health (SoH) and the state of function (SoF) of the battery 3276. The battery monitor/charger 3278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 3278 may communicate the information on the battery 3276 to the processor 3252 over the IX 3256. The battery monitor/charger 3278 may also include an analog-to-digital (ADC) converter that enables the processor 3252 to directly monitor the voltage of the battery 3276 or the current flow from the battery 3276. The battery parameters may be used to determine actions that the edge computing node 3250 may perform, such as transmission frequency, mesh network operation, sensing frequency, and the like.

A power block 3280, or other power supply coupled to a grid, may be coupled with the battery monitor/charger 3278 to charge the battery 3276. In some examples, the power block 3280 may be replaced with a wireless power receiver to obtain the power wirelessly, for example, through a loop antenna in the edge computing node 3250. A wireless battery charging circuit, such as an LTC4020 chip from Linear Technologies of Milpitas, California, among others, may be included in the battery monitor/charger 3278. The specific charging circuits may be selected based on the size of the battery 3276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3258 may include instructions 3282 in the form of software, firmware, or hardware commands to implement the techniques described herein. Although such instructions 3282 are shown as code blocks included in the memory 3254 and the storage 3258, it may be understood that any of the code blocks may be replaced with hardwired circuits, for example, built into an application specific integrated circuit (ASIC).

In an example, the instructions 3282 provided via the memory 3254, the storage 3258, or the processor 3252 may be embodied as a non-transitory, machine-readable medium 3260 including code to direct the processor 3252 to perform electronic operations in the edge computing node 3250. The processor 3252 may access the non-transitory, machine-readable medium 3260 over the IX 3256. For instance, the non-transitory, machine-readable medium 3260 may be embodied by devices described for the storage 3258 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 3260 may include instructions to direct the processor 3252 to perform a specific sequence or flow of actions, for example, as described with respect to the flowchart(s) and block diagram(s) of operations and functionality depicted above. the terms "machine-readable medium" and "computer-readable medium" are interchangeable. the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 31 and 32 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 31 and 32 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 31 and 32 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

6. Example Implementations

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 includes a method of operating a first station implementing a first Radio Access Technology (RAT), the method comprising: setting, by the first station, a Network Allocation Vector (NAV) setting signal, the NAV setting signal indicating a first RAT transmission interval during which a set of second stations are to not communicate, wherein at least a subset of the second stations implement a second RAT that is different than the first RAT; transmitting or broadcasting the NAV setting signal to the set of second stations; and transmitting a first RAT signal after transmission or broadcast of the NAV setting signal and during the first RAT transmission interval.

Example 2 includes the method of example 1 and/or some other example(s) herein, wherein setting the NAV setting signal indicates that the first RAT will occupy a shared channel during the first RAT transmission interval.

Example 3 includes the method of examples 1-2 and/or some other example(s) herein, wherein the NAV setting signal is to cause the set of second stations to set their respective NAVs based on content of the NAV setting signal.

Example 4 includes the method of examples 1-3 and/or some other example(s) herein, further comprising: generating a datagram to indicate the first RAT transmission interval.

Example 5 includes the method of examples 1-4 and/or some other example(s) herein, further comprising: scanning neighbouring channels allocated to the second RAT using a channel sensing mechanism or a listen-before-talk (LBT) mechanism; and wherein the transmitting or broadcasting comprises transmitting or broadcasting the datagram in one, several, or all of unused ones of the neighbouring channels.

Example 6 includes the method of example 5 and/or some other example(s) herein, wherein the first station is among a set of first stations that implement the first RAT, and the method further comprises: detecting transmission of another NAV setting signal in the neighbouring channels by another first station in the set of first stations; and one of: transmitting the first RAT signal immediately after detecting the other NAV setting signal; or transmitting the first RAT signal at a point in time during another first RAT transmission interval indicated by the other NAV setting signal.

Example 7 includes the method of example 5 and/or some other example(s) herein, wherein the first station is among a set of first stations that implement the first RAT, and the method further comprises: transmitting or broadcasting the NAV setting signal only when the first station is a highest priority station among the set of first stations; and transmitting or broadcasting the NAV setting signal when the first station is not the highest priority station among the set of first stations.

Example 8 includes the method of examples 6-7 and/or some other example(s) herein, wherein the generating the datagram comprises: determining a length of the first RAT transmission interval; and generating the datagram to include a value of the length of the first RAT transmission interval plus a guard period.

Example 9 includes the method of example 8 and/or some other example(s) herein, wherein one or more signals are to be transmitted during the at least one guard period, wherein the one or more signals include one or more of random data signals, one or more pilot symbols, one or more reference signals, and user data signals.

Example 10 includes the method of examples 8-9, wherein the determining the length of the first RAT transmission interval comprises: determining the length of the first RAT transmission interval based on a ratio of a first number of first stations in the set of first stations in a predetermined geographical area at a predetermined time to the second number is a number of second stations in the set of second stations in the predetermined geographical area at the predetermined time.

Example 11 includes the method of examples 8-9, wherein the determining the length of the first RAT transmission interval comprises: determining the length of the first RAT transmission interval based on a ratio of a first Channel Busy Ratio (CBR) for the first RAT in a predetermined geographical area at a predetermined time to a total CBR in the predetermined geographical area at the predetermined time, the total CBR being based on the first CBR and a second CBR for the second RAT.

Example 12 includes the method of examples 8-11 and/or some other example(s) herein, wherein the length of the first RAT transmission interval is a positive integer multiple value selected from a group comprising: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any two or more of the SIFS, the PIFS, the DIFS, the EIFS, and the AIFS; a Third Generation Partnership Project (3GPP) Long Term Evolution (LTE) symbol duration; and a 3GPP Fifth Generation (5G) symbol duration.

Example 13 includes the method of examples 10-12 and/or some other example(s) herein, wherein the length of the first RAT transmission interval is one of: 1 millisecond (ms) when a percentage of first stations in the set of first stations below 15%; 2 ms when the percentage of first stations is between 15% and 25%; 3 ms when the percentage of first stations is between 25% and 35%; 4 ms when the percentage of first stations is between 35% and 45%; 5 ms when the percentage of first stations is between 45% and 55%; 6 ms when the percentage of first stations is between 55% and 65%; 7 ms when the percentage of first stations is between 65% and 75%; 8 ms when the percentage of first stations is between 75% and 85%; 9 ms when the percentage of first stations is above than 85%; and 10 ms when the percentage of first stations is about 100%.

Example 14 includes the method of examples 8-13 and/or some other example(s) herein, wherein the value included in the datagram is between 0 and 32,767 microseconds (µs).

Example 15 includes the method of examples 3-14 and/or some other example(s) herein, wherein the datagram is a Medium Access Control (MAC) frame.

Example 16 includes the method of example 15 and/or some other example(s) herein, wherein the MAC frame is an Institute of Electrical and Electronics Engineers (IEEE) 802.11 control frame.

Example 17 includes the method of examples 15-16 and/or some other example(s) herein, wherein the generating the datagram comprises: generating the datagram to include at least one duration field.

Example 18 includes the method of example 17 and/or some other example(s) herein, wherein the at least one duration field has a length of 2 bits or 3 bits.

Example 19 includes the method of examples 17-18 and/or some other example(s) herein, wherein the generating the datagram further comprises: generating the datagram to include a frame control field and a frame check sequence (FCS) field.

Example 20 includes the method of example 19 and/or some other example(s) herein, wherein the generating the datagram further comprises: generating the datagram to include a receive address (RA) field.

Example 21 includes the method of examples 16-20 and/or some other example(s) herein, wherein the IEEE control frame is a control frame selected from a group comprising: an acknowledgment (Ack) frame, a beamforming report poll frame, a BlockAck frame, a clear-to-send (CTS) frame, a CTS-to-AP frame, a CTS-to-self frame, contention free (CF)-End frame, CF-End+CF-Ack frame, a directional multi-gigabit (DMG) CTS frame, a DMG Denial to Send (DTS) frame, a grant frame, a grant ack frame, a poll frame, a request to send (RTS) frame, a service period request (SPR) frame, a sector sweep feedback (SSW-Feedback) frame, and a very high throughput (VHT) null data packet (NDP) announcement frame.

Example 22 includes the method of examples 1-21 and/or some other example(s) herein, further comprising: determining a plurality of RAT transmission intervals and a plurality of gap durations between the plurality of RAT transmission intervals for each RAT of the plurality of RATs, wherein: one or more RAT transmission intervals of the plurality of RAT transmission intervals are different from other ones of the plurality of RAT transmission intervals, one or more gap durations of the plurality of gap durations are different from other ones of the plurality of gap durations, and the plurality of RAT transmission intervals includes the first RAT transmission interval and at least one second RAT transmission interval; and transmitting or broadcasting a message indicating the plurality of RAT transmission intervals and the plurality of gap durations.

Example 23 includes the method of example 22 and/or some other example(s) herein, wherein the plurality of gap durations includes a set of first gap durations and a set of second gap durations, wherein each first gap duration of the set of first gap durations takes place after respective first RAT transmission intervals, and each second gap duration of the set of second gap durations takes place after respective second RAT transmission intervals.

Example 24 includes the method of example 23 and/or some other example(s) herein, wherein each first gap duration of the set of first gap durations is selected from a group comprising 1 µs, 0.8 µs, 0.6 µs, and 0.4 µs.

Example 25 includes the method of examples 23-24 and/or some other example(s) herein, wherein each second gap duration of the set of second gap durations is selected from a group comprising 800 μs, 600 μs, 400 μs, and 200 μs.

Example 26 includes the method of examples 23-25 and/or some other example(s) herein, further comprising: reducing a length of each first gap duration of the set of first gap durations based on an amount of first stations implementing the first RAT in a service area; and reducing a length of each second gap duration of the set of second gap durations based on an amount of second stations implementing the second RAT in the service area.

Example 27 includes the method of examples 23-26 and/or some other example(s) herein, further comprising: reducing a length of each gap duration of the plurality of gap durations after a number of superframes are transmitted or received.

Example 28 includes the method of example 27 and/or some other example(s) herein, wherein the number of superframes is 1, 2, or 3 superframes.

Example 29 includes the method of examples 1-28 and/or some other example(s) herein, wherein the first RAT is a cellular V2X (C-V2X) RAT or a wireless local area network (WLAN) V2X (W-V2X) RAT, and the second RAT is a non-V2X RAT.

Example 30 includes the method of examples 1-28 and/or some other example(s) herein, wherein the first RAT is a first Vehicle-to-Everything (V2X) RAT, the first station is a first vehicle Intelligent Transport System Station (V-ITS-S) or a first roadside Intelligent Transport System Station (R-ITS-S), the second RAT is a second V2X RAT, and each of the set of second stations are second V-ITS-Ss.

Example 31 includes the method of example 30 and/or some other example(s) herein, wherein the first V2X RAT is one of a first C-V2X RAT or a first W-V2x RAT, and the second V2X RAT is one of a second C-V2X RAT or a second W-V2X RAT.

Example 32 includes the method of example 31 and/or some other example(s) herein, wherein: the C-V2X RAT and the other C-V2X RAT include one or more of Third Generation Partnership Project (3GPP) Long Term Evolution (LTE) V2X communication and 3GPP Fifth Generation (5G) V2X communication; and the W-V2X RAT and the other W-V2X RAT include one or more of Wireless Access in Vehicular Environments (WAVE), Dedicated Short Range Communication (DSRC), Intelligent Transport Systems in the 5 GHz frequency band (ITS-G5), the IEEE 802.11p, IEEE 802.11bd, and IEEE 802.16.

Example 33 includes the method of examples 30-31 and/or some other example(s) herein, wherein the R-ITS-S is one of a roadside unit (RSU), an evolved nodeB (eNB), a next generation eNB (ng-eNB), a next generation nodeB (gNB), a gNB-Central Unit (CU) in a CU/Distributed Unit (DU) split architecture, or an ng-eNB-CU in a CU/DU split architecture.

Example 34 includes the method of examples 1-33 and/or some other example(s) herein, wherein the first RAT and the second RAT operate within a same channel or a same frequency band.

Example 35 includes the method of examples 1-34 and/or some other example(s) herein, wherein the first RAT and the second RAT operate within different neighbouring channels or different neighbouring frequency bands.

Example 36 includes the method of examples 1-35 and/or some other example(s) herein, wherein the first RAT is configured to operate within a first bandwidth and the second RAT is configured to operate within a second bandwidth, wherein the first bandwidth is same as the second bandwidth or the first bandwidth is different than the second bandwidth.

Example 37 includes one or more computer readable media comprising instructions, wherein execution of the instructions by processor circuitry is to cause the processor circuitry to perform the method of any one of examples 1-36.

Example 38 includes a computer program comprising the instructions of example 37.

Example 39 includes an Application Programming Interface defining functions, methods, variables, data structures, and/or protocols for the computer program of example 37.

Example 40 includes an apparatus comprising circuitry loaded with the instructions of example 37.

Example 41 includes an apparatus comprising circuitry operable to run the instructions of example 37.

Example 42 includes an integrated circuit comprising one or more of the processor circuitry of example 37 and the one or more computer readable media of example 37.

Example 43 includes a computing system comprising the one or more computer readable media and the processor circuitry of example 37.

Example 44 includes an apparatus comprising means for executing the instructions of example 37.

Example 45 includes a signal generated as a result of executing the instructions of example 37.

Example 46 includes a data unit generated as a result of executing the instructions of example 37.

Example 47 includes the data unit of example 46, wherein the data unit is a datagram, network packet, data frame, data segment, a PDU, a service data unit (SDU), a message, or a database object.

Example 48 includes a signal encoded with the data unit of example 46 or 47.

Example 49 includes an electromagnetic signal carrying the instructions of example 37.

Example 50 includes an apparatus comprising means for performing the method of any one of examples 1-36.

7. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labelled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module. Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

The term "compute node" or "compute device" at least in some embodiments refers to an identifiable entity that implements one or more computing operations, whether part of a larger system, distributed collection of systems, or a standalone apparatus. the term "edge compute node" or "edge node" at least in some embodiments refers to a compute node that performs edge computing operations, whether part of a larger system, distributed collection of systems, or a standalone apparatus. In some examples, an edge node may be referred to as an "edge device" or "edge system", whether in operation as a client, server, or intermediate entity. Specific implementations of a compute node may be incorporated into a server, base station, gateway, road side unit, on premise unit, UE or end consuming device, or the like.

The term "computer system" at least in some embodiments refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or "WM" at least in some embodiments refers to the medium used to implement the transfer of signals, data, protocol data units (PDUs), service data units (SDUs), etc., between peer physical layer (PHY) entities of a wireless communication network. The term "protection mechanism" at least in some embodiments refers to any procedure that attempts to update a network allocation vector (NAV) of all receiving STAs prior to the transmission of a frame that might or might not be detected as valid network activity by the physical layer (PHY) entities at those receiving STAs.

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "access point" or "AP" at least in some embodiments refers to an entity that contains one station (STA) and provides access to the distribution services, via a WM for associated STAs. An AP comprises a STA and a distribution system access function (DSAF). the term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. In some aspects, NFV processing and data storage will occur at the edge data centers that are connected directly to the local cellular site, within the infrastructure edge.

The term "virtualized NF" (or VNF) indicates a software-based NF operating on multi-function, multi-purpose compute resources (e.g., x86, ARM processing architecture) which are used by NFV in place of dedicated physical equipment. In some aspects, several VNFs will operate on an edge data center at the infrastructure edge.

The term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are physical or virtualized objects that communicate on a network and may include sensors, actuators, and other input/output components, such as to collect data or perform actions from a real world environment. IoT devices are usually low-power devices without heavy compute or storage capabilities. IoT devices may include low-powered devices that are embedded or attached to everyday things, such as buildings, vehicles, packages, etc., to provide an additional level of artificial sensory perception of those things. "Edge IoT devices" may be any kind of IoT devices deployed at a network's edge.

The term "cluster" at least in some embodiments refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies (RATs).

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including C-V2X), Dedicated Short Range Communications (DSRC) communication systems such as Intelligent-Transport-Systems (ITS) including the European ITS-G5, ITS-GSB, ITS-GSC, etc. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. Additionally or alternatively, the terms "channel" and/or "link" refer to a physical path including one or more traversals of a WM that is usable to transfer signals and/or data between two elements or nodes. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or data flows, or to guarantee a certain level of performance to a data flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The term "localized network" may refer to a local network that covers a limited number of connected vehicles in a certain area or region. The term "distributed computing" may refer to computation resources that are geographically distributed within the vicinity of one or more localized networks' terminations. The term "local data integration platform" may refer to a platform, device, system, network, or element(s) that integrate local data by utilizing a combination of localized network(s) and distributed computation.

The terms "instantiate," "instantiation," and the like at least in some embodiments refers to the creation of an instance. An "instance" also at least in some embodiments refers to a concrete occurrence of an object, which may occur, for example, during execution of program code. Additionally or alternatively, loading or instantiation may only be done on installed applications such as radio applications (RAs). Semantically this means that the loaded application/RA instance is available for the user for activation and its parameters may be managed, but the application is not yet executing. Unloading an application/RA instance means it cannot be activated before it has been instantiated again; this may be used to save resources, for instance. The term "network coding" at least in some embodiments refers to a technique in which transmitted data is encoded and decoded to improve network performance.

The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a pre-defined order.

The term "datagram" at least in some embodiments refers to a basic transfer unit associated with a packet-switched network; a datagram may be structured to have header and payload sections. The term "datagram" at least in some embodiments may be referred to as a "data unit" or the like.

The term "subframe" at least in some embodiments refers to a time interval during which a signal is signaled. In some implementations, a subframe is equal to 1 millisecond (ms). The term "time slot" at least in some embodiments refers to an integer multiple of consecutive subframes. The term "superframe" at least in some embodiments refers to a time interval comprising two time slots.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions.

The term "artificial intelligence" or "AI" at least in some embodiments refers to intelligence demonstrated by machines and/or a system or device that perceives its environment and takes actions that maximize its chances of achieving a goal. Additionally or alternatively, the term "artificial intelligence", "AI", "artificial intelligence system", or "AI system" at least in some embodiments refers to software and/or hardware that is developed with one or more AI techniques and approaches, and can generate outputs for a given set of objectives (or goals) such as content, predictions, recommendations, inferences, and/or decisions influencing the environments they interact with. The term "artificial intelligence techniques and approaches" or "AI techniques and approaches" at least in some embodiments refers to (a) machine learning approaches, including supervised, unsupervised, and/or reinforcement learning using a wide variety of methods including deep learning; (b) logic- and knowledge-based approaches, including knowledge representation, inductive (logic) programming, knowledge bases, inference and deductive engines, (symbolic) reasoning, and expert systems; and/or (c) statistical approaches, Bayesian estimation, search and optimization methods and/or objective functions.

The term "machine learning" or "ML" at least in some embodiments refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" at least in some embodiments refers to different concepts than the term "ML model," these terms as discussed herein may be used interchangeably for the purposes of the present disclosure.

The terms "beamforming" and "beam steering" at least in some embodiments refer to a spatial filtering mechanism used at a transmitter (Tx) to improve the received signal power, signal-to-noise ratio (SNR), or some other signalling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signalling metric at the intended Rx.

The term "basic service set" or "BSS" at least in some embodiments refers to a set of STAs that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

The term "coordination function" at least in some embodiments refers to a logical function that determines when a STA is permitted to transmit PDUs via a WM. The term "distributed coordination function" or "DCF" at least in some embodiments refers to a class of coordination function(s) where the same coordination function logic is active in every STA in a basic service set (BSS) whenever the network is in operation. The term "distribution service" at least in some embodiments refers to a service that, by using association information, delivers medium access control (MAC) service tuples within a distribution system (DS). The term "distribution system" or DS" at least in some embodiments refers to a system used to interconnect a set of basic service sets (BSSs) and integrated local area networks (LANs) to create an extended service set (ESS).

The term "clear channel assessment (CCA) function" at least in some embodiments refers to a logical function in the physical layer (PHY) that determines the current state of use of a WM.

The term "ego" as in "ego station" or "ego ITS-S" at least in some embodiments at least in some embodiments refers to an entity/element (e.g., a STA or ITS-S) that is under consideration. The term "neighbours" at least in some embodiments at least in some embodiments refers to other entities/elements different than the ego entity/element, and may refer to such other entities/elements within a predetermined or predefined distance to the ego entity/element.

The term "Geo-Area" at least in some embodiments refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x, y) assumes the canonical form of the geometric shapes: The Cartesian coordinate system has its origin in the center of the shape. Its abscissa is parallel to the long side of the shapes. Point P is defined relative to this coordinate system.

The term "Interoperability" at least in some embodiments refers to the ability of ITS-Ss utilizing one communication system or RAT to communicate with other ITS-Ss utilizing another communication system or RAT. The term "Coexistence" at least in some embodiments refers to sharing or allocating radiofrequency resources among ITS-Ss using either communication system or RAT.

The term "ITS data dictionary" at least in some embodiments refers to a repository of DEs and DFs used in the ITS applications and ITS facilities layer. The term "ITS message" at least in some embodiments refers to messages exchanged at ITS facilities layer among ITS stations or messages exchanged at ITS applications layer among ITS stations.

The term "Collective Perception" or "CP" at least in some embodiments refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs. The term "Collective Perception basic service" (also referred to as CP service (CPS)) at least in some embodiments refers to a facility at the ITS-S facilities layer to receive and process CPMs, and generate and transmit CPMs. The term "Collective Perception Message" or "CPM" at least in some embodiments refers to a CP basic service PDU. The term "Collective Perception data" or "CPM data" at least in some embodiments refers to a partial or complete CPM payload. The term "Collective Perception protocol" or "CPM protocol" at least in some embodiments refers to an ITS facilities layer protocol for the operation of the CPM generation, transmission, and reception. The term "CP object" or "CPM object" at least in some embodiments refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" at least in some embodiments refers to a current representation of the immediate environment of an ITS-S, including all perceived objects perceived by either local perception sensors or received by V2X. The term "object", in the context of the CP Basic Service, at least in some embodiments refers to the state space representation of a physically detected object within a sensor's perception range. The term "object list" at least in some embodiments refers to a collection of objects temporally aligned to the same timestamp.

The term "ITS Central System" at least in some embodiments refers to an ITS system in the backend, for example, traffic control center, traffic management center, or cloud system from road authorities, ITS application suppliers or automotive OEMs (see e.g., clause 4.5.1.1 of [EN302665]). The term "personal ITS-S" at least in some embodiments refers to an ITS-S in a nomadic ITS sub-system in the context of a portable device (e.g., a mobile device of a pedestrian). The term "vehicle" may refer to road vehicle designed to carry people or cargo on public roads and highways such as AVs, busses, cars, trucks, vans, motor homes, and motorcycles; by water such as boats, ships, etc.; or in the air such as airplanes, helicopters, UAVs, satellites, etc.

The term "sensor measurement" at least in some embodiments refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, etc.) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" at least in some embodiments refers to the concept of sharing, by means of a V2X RAT, an intended movement or series of intended movements of an ITS-S based on perception sensors, planned trajectories, and the like, wherein an ITS-S broadcasts information about its current intended maneuvers. The term "Maneuver Coordination basic service" (also referred to as Maneuver Coordination Service (MCS)) at least in some embodiments refers to a facility at the ITS-S facilities layer to receive and process MCMs, and generate and transmit MCMs. The term "Maneuver Coordination Message" or "MCM" at least in some embodiments refers to an MC basic service PDU. The term "Maneuver Coordination data" or "MCM data" at least in some embodiments refers to a partial or complete MCM payload. The term "Maneuver Coordination protocol" or "MCM protocol" at least in some embodiments refers to an ITS facilities layer protocol for the operation of the MCM generation, transmission, and reception. The term "MC object" or "MCM object" at least in some embodiments refers to aggregated and interpreted abstract information gathered by perception sensors about other traffic participants and obstacles, as well as information from applications and/or services operated or consumed by an ITS-S.

The term "piggyback" or "piggybacking", in the context of computer communications and/or networking, at least in some embodiments refers to attaching, appending, or hooking a first data unit to a second data unit that is to be transmitted next or sometime before the first data unit; in this way, the first data unit gets a "free ride" in the datagram, data packet, or frame carrying the second data unit.

The term "network address" at least in some embodiments refers to an identifier for a node or host in a computer network, and may be a unique identifier across a network and/or may be unique to a locally administered portion of the network. Examples of network addresses include telephone numbers in a public switched telephone number, a cellular network address (e.g., international mobile subscriber identity (IMSI), mobile subscriber ISDN number (MSISDN), Subscription Permanent Identifier (SUPI), Temporary Mobile Subscriber Identity (TMSI), Globally Unique Temporary Identifier (GUTI), Generic Public Subscription Identifier (GPSI), etc.), an internet protocol (IP) address in an IP network (e.g., IP version 4 (Ipv4), IP version 6 (IPv6), etc.), an internet packet exchange (IPX) address, an X.25 address, an X.21 address, a port number (e.g., when using Transmission Control Protocol (TCP) or User Datagram Protocol (UDP)), a media access control (MAC) address, an Electronic Product Code (EPC) as defined by the EPCglobal Tag Data Standard, Bluetooth hardware device address (BD_ADDR), a Universal Resource Locator (URL), an email address, a Tunnel Endpoint Identifier (TEID), and/or the like.

The term "Tunnel Endpoint Identifier" or "TEID" at least in some embodiments refers to an identifier that unambiguously identifies a tunnel endpoint in the receiving GTP-U protocol entity for a given UDP/IP endpoint. The receiving end side of a GTP tunnel locally assigns the TEID value the transmitting side has to use. The TEID values are exchanged between tunnel endpoints using control plane message. The term "GTP-U Tunnel" at least in some embodiments refers to a set of nodes with a TEID, an IP address and a UDP port number; a GTP-U tunnel is necessary to enable forwarding packets between GTP-U entities and are used to carry encapsulated transport PDUs (T-PDUs) and signalling messages between a given pair of GTP-U Tunnel endpoints.

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "security threat" at least in some embodiments refers to a potential violation of security. Examples of security threats include loss or disclosure of information, modification of assets, destruction of assets, and the like. A security threat can be intentional like a deliberate attack or unintentional due to an internal failure or malfunctions. Alteration of data/assets may include insertion, deletion, and/or substitution breaches. The term "protected location" at least in some embodiments refers to a memory location outside of the hardware root of trust, protected in against attacks on confidentiality and in which from the perspective of the root of trust, integrity protection is limited to the detection of modifications. The term "shielded location" at least in some embodiments refers to a memory location within the hardware root of trust, protected against attacks on confidentiality and manipulation attacks including deletion that impact the integrity of the memory, in which access is enforced by the hardware root of trust.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert. The term "integrity" at least in some embodiments refers to a mechanism that assures that data has not been altered in an unapproved way. Examples of cryptographic mechanisms that can be used for integrity protection include digital signatures, message authentication codes (MAC), and secure hashes.

The term "flow" and/or "data flow" refer to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. A flow may only be established when there is already an association present. Typically, both sides of the association may initiate a flow, and both sides may terminate it. The maximum amount of flows in an association may be limited by the radio system specifications. It may be possible to move a flow from one association to another, even across radio applications.

The term "distributed computations" at least in some embodiments refers to a model in which components located on networked computers communicate and coordinate their actions by passing messages interacting with each other in order to achieve a common goal.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. The term "microservice architecture" at least in some embodiments refers to a variant of the service-oriented architecture (SOA) structural style wherein applications are arranged as a collection of loosely-coupled services (e.g., fine-grained services) and may use lightweight protocols.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the present disclosure, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to operate as a first station, comprising:
processor circuitry coupled with first Radio Access Technology (RAT) circuitry, the processor circuitry arranged to set a Network Allocation Vector (NAV) setting signal, wherein the NAV setting signal indicates a first RAT transmission interval during which a set of second stations are to not communicate, and at least a subset of the second stations implement a second RAT that is different from the first RAT; and
the first RAT circuitry is arranged to:
transmit or broadcast the NAV setting signal to the set of second stations; and
transmit a first RAT signal after transmission or broadcast of the NAV setting signal and during the first RAT transmission interval;
wherein, to set the NAV setting signal, the processor circuitry is arranged to:
determine a length of the first RAT transmission interval; and
generate a datagram to indicate the first RAT transmission period, wherein the datagram includes a value of the length of the first RAT transmission interval plus a guard period.

2. The apparatus of claim 1, wherein the NAV setting signal indicates that the first RAT will occupy a shared channel during the first RAT transmission interval, and the NAV setting signal is to cause the set of second stations to set their respective NAVs based on content of the NAV setting signal.

3. The apparatus of claim 1, wherein:
the processor circuitry is further arranged to scan neighboring channels allocated to the second RAT using a channel-sensing mechanism or a listen-before-talk (LBT) mechanism; and
the first RAT circuitry is arranged to transmit or broadcast the datagram in one, several, or all of unused ones of the neighboring channels.

4. The apparatus of claim 3, wherein the first station is among a set of first stations that implement the first RAT, and wherein:
the processor circuitry is further arranged to detect transmission of another NAV setting signal in the neighboring channels by another first station in the set of first stations; and
the first RAT circuitry is arranged to:
transmit the first RAT signal immediately after detection of the other NAV setting signal, or
transmit the first RAT signal during another first RAT transmission interval indicated by the other NAV setting signal.

5. The apparatus of claim 3, wherein the first station is among a set of first stations that implement the first RAT, and the first RAT circuitry is arranged to:
transmit or broadcast the NAV setting signal only when the first station is a highest priority station among the set of first stations; and
not transmit or broadcast the NAV setting signal when the first station is not the highest priority station among the set of first stations.

6. The apparatus of claim 1, wherein one or more signals are to be transmitted during the at least one guard period, wherein the one or more signals include one or more random data signals, one or more pilot symbols, one or more reference signals, or user data signals.

7. The apparatus of claim 1, wherein the first station is among a set of first stations that implement the first RAT, and to determine the length of the first RAT transmission interval, the processor circuitry is arranged to:
determine the length of the first RAT transmission interval based on:
a ratio of a first number of first stations in the set of first stations in a predetermined geographical area at a predetermined time to the second number is a number of second stations in the set of second stations in the predetermined geographical area at the predetermined time; or
a ratio of a first Channel Busy Ratio (CBR) for the first RAT in a predetermined geographical area at a predetermined time to a total CBR in the predetermined geographical area at the predetermined time, the total CBR being based on the first CBR and a second CBR for the second RAT.

8. The apparatus of claim 1, wherein the length of the first RAT transmission interval is a positive integer multiple value selected from a group comprising: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any two or more of the SIFS, the PIFS, the DIFS, the EIFS, and the AIFS; a Third Generation Partnership Project (3GPP) Long Term Evolution (LTE) symbol duration; and a 3GPP Fifth Generation (5G) symbol duration.

9. The apparatus of claim 1, wherein the length of the first RAT transmission interval is one of 1 millisecond (ms) when a percentage of first stations in the set of first stations is below 15%; 2 ms when the percentage of first stations is between 15% and 25%; 3 ms when the percentage of first stations is between 25% and 35%; 4 ms when the percentage of first stations is between 35% and 45%; 5 ms when the percentage of first stations is between 45% and 55%; 6 ms when the percentage of first stations is between 55% and 65%; 7 ms when the percentage of first stations is between 65% and 75%; 8 ms when the percentage of first stations is between 75% and 85%; 9 ms when the percentage of first stations is above 85%; and 10 ms when the percentage of first stations is about 100%.

10. The apparatus of claim 1, wherein the value included in the datagram is between 0 and 32,767 microseconds (µs).

11. The apparatus of claim 1, wherein the datagram is a Medium Access Control (MAC) control frame.

12. The apparatus of claim 11, wherein the datagram comprises at least one duration field, and the at least one duration field has a length of 2 bits or 3 bits.

13. The apparatus of claim 12, wherein the datagram further comprises a frame control field and a frame check sequence (FCS) field.

14. The apparatus of claim 13, wherein the datagram further comprises a receive address (RA) field.

15. The apparatus of claim 11, wherein the MAC control frame is a control frame selected from a group comprising: an acknowledgment (Ack) frame, a beamforming report poll frame, a BlockAck frame, a clear-to-send (CTS) frame, a CTS-to-AP frame, a CTS-to-self frame, contention free (CF)-End frame, CF-End+CF-Ack frame, a directional multi-gigabit (DMG) CTS frame, a DMG Denial to Send (DTS) frame, a grant frame, a grant Ack frame, a poll frame, a request to send (RTS) frame, a service period request (SPR) frame, a sector sweep feedback (SSW-Feedback) frame, and a very high throughput (VHT) null data packet (NDP) announcement frame.

16. The apparatus of claim 1, wherein the first RAT is a Vehicle-to-Everything (V2X) RAT, and the second RAT is a non-V2X RAT.

17. The apparatus of claim 1, wherein the first RAT is a first Vehicle-to-Everything (V2X) RAT, the first station is a first vehicle Intelligent Transport System Station (V-ITS-S), the second RAT is a second V2X RAT, and each of the set of second stations are second V-ITS-Ss.

18. The apparatus of claim 17, wherein:
the first V2X RAT is one of a Third Generation Partnership Project (3GPP) Long Term Evolution (LTE) V2X RAT, a 3GPP Fifth Generation (5G) V2X RAT, a Wireless Access in Vehicular Environments (WAVE) RAT, a Dedicated Short Range Communication (DSRC) RAT, an Intelligent Transport Systems in the 5 GHz frequency band (ITS-G5) RAT, an Institute of Electrical and Electronics Engineers (IEEE) 802.11p RAT, an IEEE 802.11bd RAT, an IEEE 802.16 RAT, an ultra high frequency (UHF) RAT, a very high frequency (VHF) RAT, and a Global System for Mobile Communications (GSM) RAT; and
the second V2X RAT is one of a 3GPP LTE V2X RAT, a 3GPP 5G V2X RAT, a WAVE RAT, a DSRC RAT, an ITS-G5 RAT, an IEEE 802.11p RAT, an IEEE 802.11bd RAT, an IEEE 802.16 RAT, a UHF RAT, a VHF RAT, and a GSM RAT.

19. One or more non-transitory computer-readable media (NTCRM) comprising instructions that, upon execution of the instructions by one or more processors of an electronic device, are to cause a first station to:
- set a Network Allocation Vector (NAV) setting signal, wherein the NAV setting signal indicates a first radio access technology (RAT) transmission interval during which a set of second stations are to not communicate, and at least a subset of the second stations implement a second RAT that is different from the first RAT;
- transmit or broadcast the NAV setting signal to the set of second stations; and
- transmit a first RAT signal after transmission or broadcast of the NAV setting signal and during the first RAT transmission interval;
- wherein, to set the NAV setting signal, the instructions are to cause the first station to:
  - determine a length of the first RAT transmission interval; and
  - generate a datagram to indicate the first RAT transmission period, wherein the datagram includes a value of the length of the first RAT transmission interval plus a guard period.

20. The one or more NTCRM of claim 19, wherein the NAV setting signal indicates that the first RAT will occupy a shared channel during the first RAT transmission interval, and the NAV setting signal is to cause the set of second stations to set their respective NAVs based on content of the NAV setting signal.

21. The one or more NTCRM of claim 19, wherein:
- the instructions are further to cause the first station to scan neighboring channels allocated to the second RAT using a channel sensing mechanism or a listen-before-talk (LBT) mechanism; and
- transmit or broadcast the datagram in one, several, or all of unused ones of the neighboring channels.

22. The one or more NTCRM of claim 19, wherein one or more signals are to be transmitted during the at least one guard period, wherein the one or more signals include one or more random data signals, one or more pilot symbols, one or more reference signals, or user data signals.

23. The one or more NTCRM of claim 19, wherein the first station is among a set of first stations that implement the first RAT, and to determine the length of the first RAT transmission interval, the instructions are to cause the first station to:
- determine the length of the first RAT transmission interval based on:
  - a ratio of a first number of first stations in the set of first stations in a predetermined geographical area at a predetermined time to the second number is a number of second stations in the set of second stations in the predetermined geographical area at the predetermined time; or
  - a ratio of a first Channel Busy Ratio (CBR) for the first RAT in a predetermined geographical area at a predetermined time to a total CBR in the predetermined geographical area at the predetermined time, the total CBR being based on the first CBR and a second CBR for the second RAT.

24. The one or more NTCRM of claim 19, wherein the length of the first RAT transmission interval is a positive integer multiple value selected from a group comprising: a short interframe space (SIFS) duration; a point coordination function interframe space (PIFS) duration; a distributed coordination function interframe space (DIFS) duration; an arbitration inter-frame spacing (AIFS) duration; an extended interframe space (EIFS) duration; a combination of any two or more of the SIFS, the PIFS, the DIFS, the EIFS, and the AIFS; a Third Generation Partnership Project (3GPP) Long Term Evolution (LTE) symbol duration; and a 3GPP Fifth Generation (5G) symbol duration.

25. The one or more NTCRM of claim 19, wherein the length of the first RAT transmission interval is one of 1 millisecond (ms) when a percentage of first stations in the set of first stations is below 15%; 2 ms when the percentage of first stations is between 15% and 25%; 3 ms when the percentage of first stations is between 25% and 35%; 4 ms when the percentage of first stations is between 35% and 45%; 5 ms when the percentage of first stations is between 45% and 55%; 6 ms when the percentage of first stations is between 55% and 65%; 7 ms when the percentage of first stations is between 65% and 75%; 8 ms when the percentage of first stations is between 75% and 85%; 9 ms when the percentage of first stations is above 85%; and 10 ms when the percentage of first stations is about 100%.

26. The one or more NTCRM of claim 19, wherein the value included in the datagram is between 0 and 32,767 microseconds ($\mu$s).

27. The one or more NTCRM of claim 19, wherein the datagram is a Medium Access Control (MAC) control frame.

28. The one or more NTCRM of claim 19, wherein the first RAT is a Vehicle-to-Everything (V2X) RAT, and the second RAT is a non-V2X RAT.

29. The one or more NTCRM of claim 19, wherein the first RAT is a first Vehicle-to-Everything (V2X) RAT, the first station is a first vehicle Intelligent Transport System Station (V-ITS-S), the second RAT is a second V2X RAT, and each of the set of second stations are second V-ITS-Ss.

* * * * *